(12) United States Patent
Shellef et al.

(10) Patent No.: US 10,607,611 B1
(45) Date of Patent: Mar. 31, 2020

(54) MACHINE LEARNING-BASED PREDICTION OF TRANSCRIBER PERFORMANCE ON A SEGMENT OF AUDIO

(71) Applicant: Verbit Software Ltd., Tel Aviv (IL)

(72) Inventors: Eric Ariel Shellef, Ramat Gan (IL); Yaakov Kobi Ben Tsvi, Ramat Hasharon (IL); Iris Getz, Ramat Hasharon (IL); Tom Livne, Herzliya (IL); Elisha Yehuda Rosensweig, Ra'anana (IL)

(73) Assignee: Verbit Software Ltd., Tel Aviv (IL)

( * ) Notice: Subject to any disclaimer, the term of this patent is extended or adjusted under 35 U.S.C. 154(b) by 0 days.

(21) Appl. No.: 16/595,279

(22) Filed: Oct. 7, 2019

Related U.S. Application Data

(60) Provisional application No. 62/896,617, filed on Sep. 6, 2019.

(51) Int. Cl.
*G10L 15/00* (2013.01)
*G10L 15/26* (2006.01)
(Continued)

(52) U.S. Cl.
CPC ............ *G10L 15/265* (2013.01); *G06F 40/20* (2020.01); *G10L 15/01* (2013.01); *G10L 15/063* (2013.01); *G10L 15/30* (2013.01)

(58) Field of Classification Search
CPC ......... G10L 15/00; G10L 15/01; G10L 15/02; G10L 15/075; G10L 15/14; G10L 15/16; G10L 15/18; G10L 15/183; G10L 15/19; G10L 15/20; G10L 15/22; G10L 15/26; G10L 15/28; G10L 15/32; G10L 2015/00; G10L 2015/02; G10L 2015/06; G10L 2015/063; G10L 2015/0631;
(Continued)

(56) References Cited

U.S. PATENT DOCUMENTS 6,832,189 B1 12/2004 Kanevsky et al.
6,980,953 B1 12/2005 Kanevsky et al.
(Continued)

OTHER PUBLICATIONS

Chan, W., Jaitly, N., Le, Q. V., & Vinyals, O. (2015). Listen, attend and spell. arXiv preprint arXiv:1508.01211.
(Continued)

*Primary Examiner* — Qi Han
(74) *Attorney, Agent, or Firm* — Active Knowledge Ltd.

(57) ABSTRACT

When transcribing large audio files, such as in the case of legal depositions, there are often many transcribers to choose from. Embodiments described herein enable calculation of expected accuracy of transcriptions by transcribers, which can be used to guide the selection of transcribers for specific tasks. In one embodiment, a computer receives a segment of an audio recording that includes speech of a person, and identifies an accent of the person and a topic of the segment. The computer generates feature values based on data that includes the accent and the topic, and utilizes a model to calculate, based on the feature values, an expected accuracy of a transcription of the segment by a certain transcriber. The model is generated based on training data that includes segments of previous audio recordings and values of accuracies of transcriptions, by the certain transcriber, of the segments.

20 Claims, 22 Drawing Sheets

(51) Int. Cl.
*G10L 15/01* (2013.01)
*G10L 15/30* (2013.01)
*G10L 15/06* (2013.01)
*G06F 40/20* (2020.01)

(58) Field of Classification Search
CPC ......... G10L 2015/0635; G10L 2015/22; G10L 2015/228
USPC ....... 704/235, 231, 236, 246, 250, 255, 257, 704/270, 276
See application file for complete search history.

(56) References Cited

U.S. PATENT DOCUMENTS

| | | | |
|---|---|---|---|
| 7,006,967 | B1 | 2/2006 | Kahn et al. |
| 7,016,844 | B2 | 3/2006 | Othmer et al. |
| 7,174,296 | B2 | 2/2007 | Bartosik |
| 7,236,932 | B1 | 6/2007 | Grajski |
| 7,292,975 | B2 | 11/2007 | Lovance et al. |
| 7,444,286 | B2 | 10/2008 | Roth et al. |
| 7,818,175 | B2 | 10/2010 | Carus et al. |
| 7,827,032 | B2 | 11/2010 | Braho et al. |
| 7,869,996 | B2 | 1/2011 | Carraux et al. |
| 7,895,039 | B2 | 2/2011 | Braho et al. |
| 8,155,960 | B2 | 4/2012 | Hakkani-Tur et al. |
| 8,249,870 | B2 | 8/2012 | Roy et al. |
| 8,306,816 | B2 | 11/2012 | Goldberg |
| 8,335,689 | B2 | 12/2012 | Wittenstein et al. |
| 8,352,264 | B2 | 1/2013 | White et al. |
| 8,407,052 | B2 | 3/2013 | Hager |
| 8,510,109 | B2 | 8/2013 | Terrell et al. |
| 8,554,558 | B2 | 10/2013 | McCarley et al. |
| 8,630,853 | B2 | 1/2014 | Koshinaka |
| 8,738,374 | B2 | 5/2014 | Jaroker |
| 9,002,702 | B2 | 4/2015 | Bostik et al. |
| 9,058,810 | B2 | 6/2015 | Gajic et al. |
| 9,117,450 | B2 | 8/2015 | Cook et al. |
| 9,190,057 | B2 | 11/2015 | Hoffmeister et al. |
| 9,245,522 | B2 | 1/2016 | Hager |
| 9,305,553 | B2 | 4/2016 | Meisel |
| 9,401,143 | B2 | 7/2016 | Senior et al. |
| 9,576,498 | B1 | 2/2017 | Zimmerman et al. |
| 9,613,619 | B2 | 4/2017 | Lev-Tov et al. |
| 9,652,999 | B2 | 5/2017 | Yoon et al. |
| 9,666,182 | B2 | 5/2017 | Hakkani-Tur et al. |
| 9,697,823 | B1 | 7/2017 | Kuo et al. |
| 9,710,819 | B2 | 7/2017 | Cloran et al. |
| 10,013,981 | B2 | 7/2018 | Ramprashad et al. |
| 10,074,360 | B2 | 9/2018 | Yoon |
| 10,147,428 | B1 | 12/2018 | Shastry et al. |
| 10,199,124 | B2 | 2/2019 | dos Santos |
| 2002/0152071 | A1 | 10/2002 | Chaiken et al. |
| 2003/0050777 | A1 | 3/2003 | Walker |
| 2004/0162722 | A1 | 8/2004 | Rex et al. |
| 2006/0190249 | A1 | 8/2006 | Kahn et al. |
| 2008/0033720 | A1* | 2/2008 | Kankar ............... G10L 15/1822 704/235 |
| 2009/0306981 | A1 | 12/2009 | Cromack et al. |
| 2011/0125533 | A1 | 5/2011 | Budacki et al. |
| 2012/0016671 | A1 | 1/2012 | Jaggi et al. |
| 2013/0317818 | A1 | 11/2013 | Bigham et al. |
| 2015/0039301 | A1 | 2/2015 | Senior et al. |
| 2015/0331941 | A1 | 11/2015 | Defouw et al. |
| 2016/0275943 | A1* | 9/2016 | Hakkani-Tur ........ G10L 15/065 |
| 2016/0365090 | A1 | 12/2016 | Nissan |
| 2016/0379626 | A1 | 12/2016 | Deisher et al. |
| 2016/0379638 | A1 | 12/2016 | Basye et al. |
| 2018/0336902 | A1 | 11/2018 | Cartwright et al. |
| 2018/0342240 | A1 | 11/2018 | Shellef et al. |
| 2019/0371335 | A1* | 12/2019 | Shastry .................. G10L 15/26 |

OTHER PUBLICATIONS

Chiu, Chung-Cheng, et al. "State-of-the-art speech recognition with sequence-to-sequence models." 2018 IEEE International Conference on Acoustics, Speech and Signal Processing (ICASSP). IEEE, 2018.

Cook, Gary D., and Anthony J. Robinson. "Utterance clustering for large vocabulary continuous speech recognition." Fourth European Conference on Speech Communication and Technology. 1995.

Jansen, Aren, Kenneth Church, and Hynek Hermansky. "Towards spoken term discovery at scale with zero resources." Eleventh Annual Conference of the International Speech Communication Association. 2010.

Kenny, Patrick, Gilles Boulianne, and Pierre Dumouchel. "Eigenvoice modeling with sparse training data." *IEEE transactions on speech and audio processing* 13.3 (2005): 345-354.

Lerato, Lerato, and Thomas Niesler. "Feature trajectory dynamic time warping for clustering of speech segments." EURASIP Journal on Audio, Speech, and Music Processing 2019.1 (2019): 6.

Park, Alex S., and James R. Glass. "Unsupervised pattern discovery in speech." IEEE Transactions on Audio, Speech, and Language Processing 16.1 (2008): 186-197.

Petrovska-Delacrétaz, Dijana, et al. "Detecting Acoustic Morphemes in Lattices for Spoken Language Understanding." Sixth International Conference on Spoken Language Processing. 2000.

Saraclar, Murat, and Richard Sproat. "Lattice-based search for spoken utterance retrieval." Proceedings of the Human Language Technology Conference of the North American Chapter of the Association for Computational Linguistics: HLT-NAACL 2004. 2004.

Watanabe, Shinji, et al. "Hybrid CTC/attention architecture for end-to-end speech recognition." IEEE Journal of Selected Topics in Signal Processing 11.8 (2017): 1240-1253.

* cited by examiner

MACHINE LEARNING-BASED PREDICTION OF TRANSCRIBER PERFORMANCE ON A SEGMENT OF AUDIO

CROSS-REFERENCE TO RELATED APPLICATIONS

This Application claims priority to U.S. Provisional Patent Application No. 62/896,617, filed Sep. 6, 2019.

BACKGROUND

Hybrid transcription of audio, which involves human transcribers reviewing and correcting transcriptions generated by automatic speech recognition (ASR) systems, has emerged as an efficient way to provide accurate transcription services in a timely manner. Hybrid transcription is especially suited for dealing with transcription of large audio files, such as transcribing recordings of legal depositions. Often there is a large pool of transcribers available to work with, but it is not always clear who to choose for a transcription job. If the wrong transcriber is chosen, such as a transcriber that is not familiar with an accent spoken in the audio and/or the subject matter of the audio, this may prolong the transcription process as well as result is less accurate transcriptions. Thus, there is a need for a way guide selection of appropriate transcribers to handle audio with specific characteristics.

SUMMARY

When transcribing large audio files, such as in the case of legal depositions, there are often many transcribers to choose from. Embodiments described herein introduce a machine learning-based approach that may be used to select the most appropriate transcribers for audio with specific characteristics, in order to obtain sufficiently accurate transcriptions.

One aspect of this disclosure involves a system configured to calculate an expected accuracy of a transcription by a certain transcriber. In one embodiment, a computer receives a segment of an audio recording that includes speech of a person. The computer identifies, based on the segment, an accent of the person, and identifies, based on a transcription of the segment generated using an automatic speech recognition (ASR) system, a topic of the segment. The computer generates feature values based on data that includes an indication of the accent and an indication of the topic, and utilizes a model to calculate, based on the feature values, a value indicative of an expected accuracy of a transcription of the segment by the certain transcriber. The model is generated based on training data that includes feature values generated based on segments of previous audio recordings, and values of accuracies of transcriptions, by the certain transcriber, of the segments. Optionally, the value indicative of the expected accuracy is indicative of an expected word error rate (WER) for the transcription of the segment were it transcribed by the certain transcriber.

Another aspect of this disclosure involves a method for calculating an expected accuracy of a transcription by a certain transcriber. In one embodiment, the method includes the following steps: receiving a segment of an audio recording, which includes speech of a person; identifying, based on the segment, an accent of the person; identifying, based on a transcription of the segment generated using an ASR system, a topic of the segment; generating feature values based on data that includes an indication of the accent and an indication of the topic; and utilizing a model to calculate, based on the feature values, a value indicative of an expected accuracy of a transcription of the segment by the certain transcriber. The model is generated based on training data that includes feature values generated based on segments of previous audio recordings, and values of accuracies of transcriptions, by the certain transcriber, of the segments. Optionally, the value indicative of the expected accuracy is indicative of an expected WER for the transcription of the segment were it transcribed by the certain transcriber.

Yet another aspect of this disclosure involves a non-transitory computer-readable medium having instructions stored thereon that, in response to execution by a system including a processor and memory, causes the system to perform operations that include: receiving a segment of an audio recording, which includes speech of a person; identifying, based on the segment, an accent of the person: identifying, based on a transcription of the segment generated using an ASR system, a topic of the segment; generating feature values based on data that includes an indication of the accent and an indication of the topic; and utilizing a model to calculate, based on the feature values, a value indicative of an expected accuracy of a transcription of the segment by the certain transcriber. The model is generated based on training data that includes feature values generated based on segments of previous audio recordings, and values of accuracies of transcriptions, by the certain transcriber, of the segments.

BRIEF DESCRIPTION OF THE DRAWINGS

The embodiments are herein described by way of example only, with reference to the following drawings:

FIG. 3 illustrates a suggestion, by the backend server, of likely accents for a transcriber to choose from:

FIG. 6 illustrates a suggestion, by the backend server, of likely topics for a transcriber to choose from;

DETAILED DESCRIPTION

Figure 1:
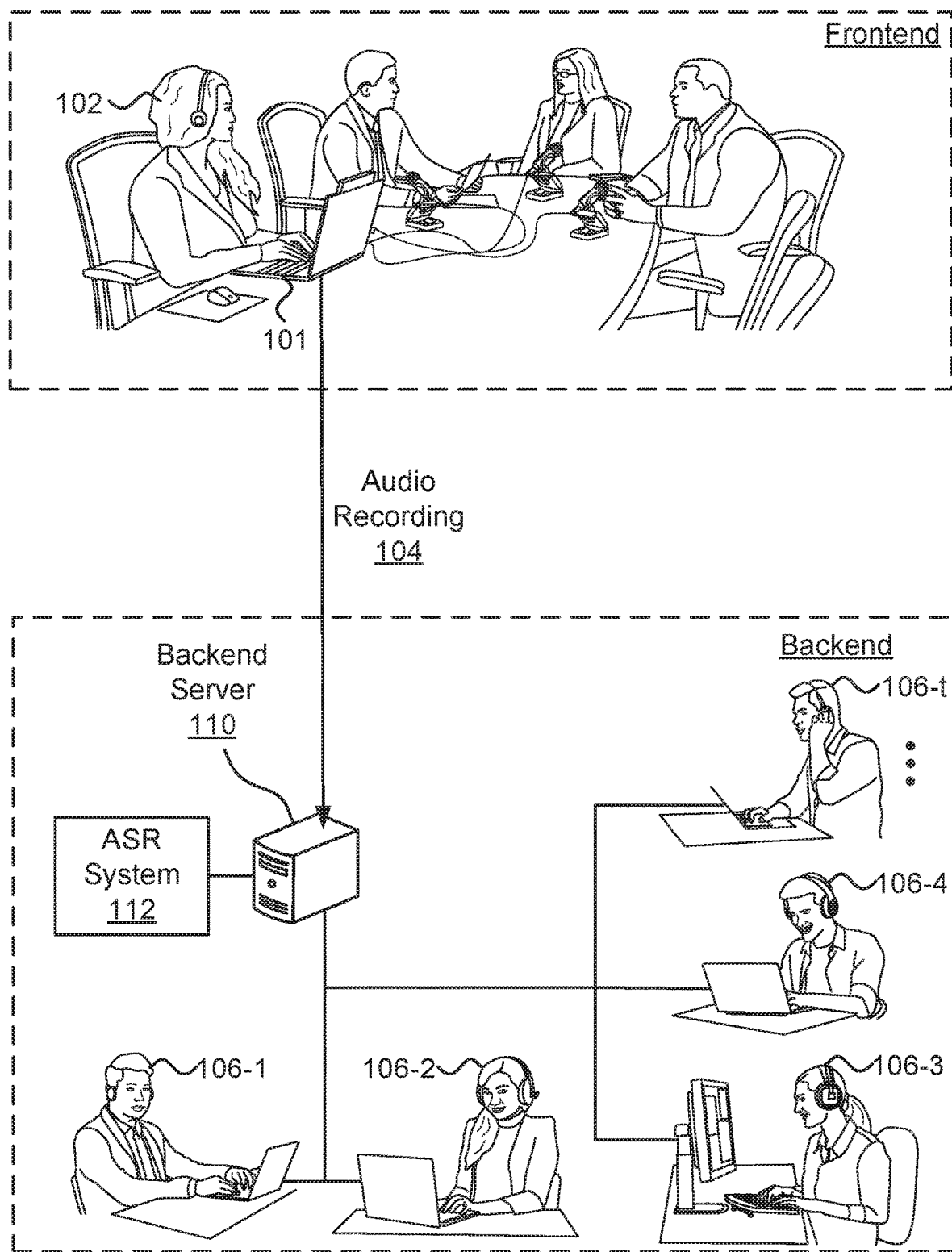
FIG. 1 illustrates an exemplary scenario in which hybrid transcription is utilized.

Various embodiments described herein relate to transcription of audio utilizing automatic speech recognition (ASR), possibly with the aid of a human transcriber that reviews transcriptions generated using ASR. In cases in which there is a human transcriber who reviews outputs of an ASR system, the transcription process may be referred to as "hybrid transcription". Herein, a human transcriber can also be referred to as a "transcriber", while a computer system that performs transcription will be typically referred to as an "ASR system".

Herein, when it is stated that a human transcriber "transcribes" audio it may involve various levels of activity and/or effort by the human transcriber. In some embodiments, transcribing involves listening to the audio and writing (e.g., by entering to a computer system) text that includes at least some of the words uttered in the audio. Additionally or alternatively, transcribing may involve listening to the audio in order to review an existing transcription of the audio (e.g., a transcription generated by an ASR system and/or a human transcriber). Reviewing can involve correcting transcription errors a transcriber finds in a transcription. Examples of transcription errors may include omitted phrases (phrases that were spoken but not put down in the transcription), added phrases (which appear in the transcription text but were in fact not uttered at the corresponding places in the audio), and substitutions (i.e., a person uttered a first phrase in the audio, but the transcription includes a second phrase at the corresponding position). Thus, a reference herein to "reviewing" a transcription by a transcriber involves the transcriber correcting an existing transcription, where the existing transcription may be an ASR-generated transcription, a transcription created by a transcriber, or a transcription already reviewed by a different transcriber (a "reviewed transcription"). A reference to a transcriber "transcribing" may mean reviewing an existing transcription (be it ASR-generated and/or a transcription reviewed by another transcriber) or creating a transcription without working off an initial version, such as an ASR-generated transcription.

Herein, the term "audio recording" is used to denote data that represents auditory information. Optionally, an audio recording is recorded using one or more microphones that convert acoustic energy to an audio signal that may be represented in a digital form. Such a conversion enables transmission of the audio information (e.g., over a computer network) and/or storage in computer-readable media (e.g., in a file on hard drive or in random access memory).

In some examples, an audio recording may be obtained using a single microphone (which may record one or more people speaking). Optionally, an audio recording obtained with a single microphone may be referred to as having a single channel (of audio). In other examples, an audio recording may be obtained using more than one microphone. For instance, an audio recording of proceedings being held in a room (e.g., a legal deposition) may be obtained using multiple microphones situated at different locations and/or oriented towards different directions. In some cases, some of the multiple microphones may be attached to specific people and/or in close proximity to specific people (enabling a better quality of recording of those people). Optionally, an audio recording obtained with multiple microphones may be referred to as having multiple channels (of audio). Optionally, when an audio recording has multiple channels, individual channels may be accessed and/or analyzed (e.g., a transcriber may listen to an individual channel or an ASR system may create a transcription of speech recorded on an individual channel). In some embodiments, when an audio recording includes multiple channels, the multiple channels may be mixed to produce a higher quality recording, in which recorded speech is clearer to a transcriber and/or becomes easier for an ASR system to transcribe.

Audio recordings may have various durations. Some audio recordings may be a few seconds long, while others may span multiple hours. Additionally, an audio recording may be a continuous recording or include multiple noncontiguous intervals. For example, a legal deposition may include multiple intervals which are "on the record", which are separated by times (e.g., breaks) that are "off the record". In this example, an audio recording may include a recording of times that were "on the record" (and may optionally include recordings of times that were off the record). Some audio recordings may be transmitted during a single session and/or stored at a single location (e.g., a single file or single allocated region of memory); while other audio recordings may be transmitted over multiple sessions and/or be stored at multiple locations. For example, in some cases, an audio recording may be transmitted over multiple sessions and/or be stored in multiple files (each storing a portion of the audio recording).

Herein, an audio recording may be referred to as being comprised of one or more segments of audio. A segment of audio is a portion of an audio recording, where the portion may even encompass the entire audio recording. Thus, some segments of audio may include a recording of a single channel, while others may include recordings of multiple channels (or a mixture thereof). Additionally, some segments of audio may include primarily speech of a single person, while other may include speech of multiple people.

Segmenting an audio recording to segments may offer several advantages, such as easing transmission and/or storage, and making it easier to process the audio recording in parallel, which can contribute to reducing the time required to transcribe the full audio recording by letting different transcribers and/or instances of an ASR system work on different segments simultaneously.

An audio recording may be segmented into segments in multiple ways. In some examples, the audio recording may be segmented based on its length, to include multiple segments of a similar length. In some embodiments, an audio recording may be segmented such that segments include speech of primarily the same speaker. Optionally, speaker identification algorithms may be utilized to determine who is speaking at each time in order to perform such segmentation. In other embodiments, an audio recording may be segmented such that segments include speech that is related to a certain topic and/or procedure (e.g., in a deposition different segments may correspond to swearing in, questions, answers, etc.). Optionally, in such cases segmentation of an audio recording may be done using ASR and/or natural language understanding (NLU) systems. In some embodiments, the boundaries of segments may be determined based on audio characteristics, such that segments may tend to start and/or end during portions in which there is no speech rather than start or end mid-sentence.

It is to be noted that while in some embodiments, segmenting an audio recording to segments may involve generating mostly disjoint segments, in other embodiments, at least some segments may overlap. In some examples, different segments of audio may be obtained by mixing the same recordings from multiple channels in different ways (e.g., to obtain different segments in which the speech of different people is more dominant).

Various embodiments described herein may represent a segment of audio using acoustic features derived from the audio signal of the segment. For example, a segment of audio may be represented as a time series of vectors of acoustic features, where each vector corresponds to a short window of the audio. For example, windows may be between 5 ms and 200 ms long, with 20 ms to 30 ms being values that are often used. The signal in a window may be processed in various ways to obtain acoustic features. In one example, fast Fourier transform (FFT) is performed on the audio in each window. From the FFT data for each window, various features may be extracted. For example, some acoustic features may be determined by binning according to filterbank energy coefficients, using a Mel-frequency cepstral component (MFCC) transform, using a perceptual linear prediction (PLP) transform, or using other techniques. In some implementations, the logarithm of the energy in each of various bands of the FFT may be used to determine acoustic features. The use of the use of the aforementioned features is exemplary only. In other embodiments, spectral energy transform and associated computations or any other types of acoustic and non-acoustic features can be used for computations described herein as being based on acoustic features.

Embodiments described herein utilize an ASR system to generate transcriptions of segment of audio (which may later be reviewed by human transcribers). Various implementations of ASR may be used by embodiments described herein. Some implementations of ASR systems may involve utilizing various models, such as acoustic models (utilized to identify phonemes), phonetic or lexical models (used to model pronunciations), and/or language models (which include the words and/or phrases that may be identified). Finding the transcription of a segment of audio may be done utilizing various algorithmic approaches, such hidden Markov models (HMMs), dynamic time warping (DTW), neural networks (and deep learning), and/or sequence-to-sequence models (seq2seq), to name a few.

A transcription of a segment of audio typically includes a text representation of at least some of the speech spoken in the segment of audio. Additionally, the transcription may include other information. In one example, the transcription may include linkage information between the text and audio in the segment, such as time stamps and/or a hyperlink that causes a portion of the segment to be played when text corresponding to it is clicked and/or selected. In another example, the transcription may include information regarding the portion of the audio corresponding to a certain portion of text, such as an indication of the audio quality (e.g., a signal-to-noise ratio) and/or an identification of a person who uttered a certain phrase. In still another example, different portions of a transcription may include an indication of confidence a transcriber and/or ASR system may have in their corresponding text (e.g., a confidence score for each phrase generated by the ASR system during transcription). In yet another example, a transcription may include additional properties that may be determined from analysis of the audio, such as indication of an accent being spoken, a topic of speech in the segment, and/or whether the speech belongs to a certain phase of proceedings (e.g., whether it is on or off the record in the case of a legal deposition).

Some embodiments described herein may involve calculation of intelligibility of a transcriptions of a segment of audio. In some embodiments, intelligibility of a transcription is a value indicative of an extent to which the text of the transcription is comprehensible. Generally, the more accurate a transcription, the higher its intelligibility. Calculating intelligibility may be done based on the transcription itself and/or a data structures used by an ASR system that generated the transcription (e.g., a lattice generated by the ASR system to represent possible transcriptions of a segment). There are various approaches known in the art for calculating intelligibility, some examples of approaches for calculating intelligibility are provided in Karbasi et al., "ASR-based Measures for Microscopic Speech Intelligibility Prediction", Proc. of the 1st Int. Conference on Challenges in Hearing Assistive Technology (CHAT-17), Stockholm, Sweden, 2017.

Though the field of automatic speech recognition (ASR) has seen many developments in recent years, the quality of fully automated transcriptions is often not adequate for many applications in which accuracy is of the utmost importance, such as transcription of legal depositions. Currently, manual transcription by transcribers can provide better accuracy than fully automated transcription with ASR systems. However, manual transcription is both heavily time-consuming and expensive. Hybrid transcription aims to leverage advantages of both these approaches. In hybrid transcription, a human transcriber goes over a transcription generated by an ASR system, and corrects errors found in the transcription. Thus, hybrid transcription can leverage the speed of automated transcription with a boost to accuracy from human reviewing.

Manual reviewing a transcription generated by an ASR system can be time consuming, possibly even takin 8-10 times duration of the audio or more, depending on the difficulty of the audio (e.g., noise, unfamiliar accents, or difficult subject matter). Therefore, in order to enable fast turnaround, such as in the case of same-day transcription of legal depositions, hybrid transcription often involves multiple transcribers working in parallel on segments of an audio recording. Additionally, some implementation of hybrid transcription may involve multiple layers of review by transcribers of different qualifications and/or expertise levels. Thus, for example, initial review may be done by less experienced transcribers who correct many of the obvious mistakes, while additional layers of review may involve more experienced transcribers who check the corrections made by the lower-level transcribers as well as tackle portions of audio in which the lower-level transcribers had difficulty. Since there are typically fewer transcribers that possess a high level of expertise, and these transcribers often command a higher fee, such a layered approach can be advantageous both in terms of reducing the turnaround time and the expense involved in transcribing long audio recordings, such as recordings of legal depositions.

FIG. 1 illustrates an exemplary scenario in which hybrid transcription is utilized, which may be the architectural setup of various embodiments described herein. FIG. 1 illustrates two primary regions, the "frontend" which is where audio is generated (a room holding a legal deposition in the figure), and a "backend", which is typically remote from the frontend and could span multiple locations, where the audio is transcribed.

At the frontend, there is a frontend server 101 (which may be a laptop or some other computing device). Using one or more microphones, an audio recording 104 is recorded, and transmitted by the frontend server 101 to the backend server 110. The frontend server 101 may be operated by a frontend operator 102 (e.g., a court reporter) who in some cases may perform actions such as manage the process of the recording, monitor the quality of the audio recording 104, as well as be in communication with elements in the backend, as described in some embodiments herein.

The backend involves a backend server 110, which may include one or more computers, possibly at different locations and/or in the cloud, which are collectively referred to herein as the backend server 110. The backend server 110 receives the audio recording 104, and will typically generate a transcription of the audio recording 104 (and/or of segments of the audio recording 104) utilizing ASR system 112. Optionally, the generated transcription is sent to the frontend server 101, e.g., in order to be presented as a "live" transcription. In some embodiments, ASR system 112 may be a standalone system, possibly involving separate hardware than the backend server 110. For example, the ASR system 112 may run on a server that is different from the backend server 110. In other embodiments, the ASR system 112 may be in part, or in its entirety, a module that runs on the backend server 110. For example, the ASR system 112 may be implemented as a software program that runs on the backend server 110.

In addition to generating a transcription of the audio recording 104, the backend server 110 also provides segments of the audio recording 104 as well as corresponding ASR-generated transcriptions of these recordings to one or more "backend" transcribers 106-1 to 106-$t$, where $t \geq 1$. These transcribers may be located at various locations, possibly in different countries around the world. Optionally, each of the transcribers 106-1 to 106-$t$ may receive a segment of audio of the audio recording 104, as well as a transcription of the segment generated by the ASR system 112, and review the transcription in order to make corrections thereto. Corrected transcriptions are collected by the backend server 110, which may decide how to further process them. Some of the corrected transcriptions may be collected and joined to form a full transcription of the audio recording 104, while other corrected transcriptions may be submitted to additional layers of review by more experienced transcribers as discussed above.

FIG. 1 illustrates a scenario in which hybrid transcriptions is used to create transcriptions of legal depositions. However, embodiments described herein may also be utilized in other scenarios in which accurate and/or rapid transcription may be useful, such as for creating transcriptions of courtroom legal proceedings, transcribing meetings (e.g., business or government meetings), transcribing recordings of audio from medical proceedings or consultations, transcribing educational lectures (including real-time transcription), close captioning live entertainment and recorded shows, and many more scenarios.

Figure 2:
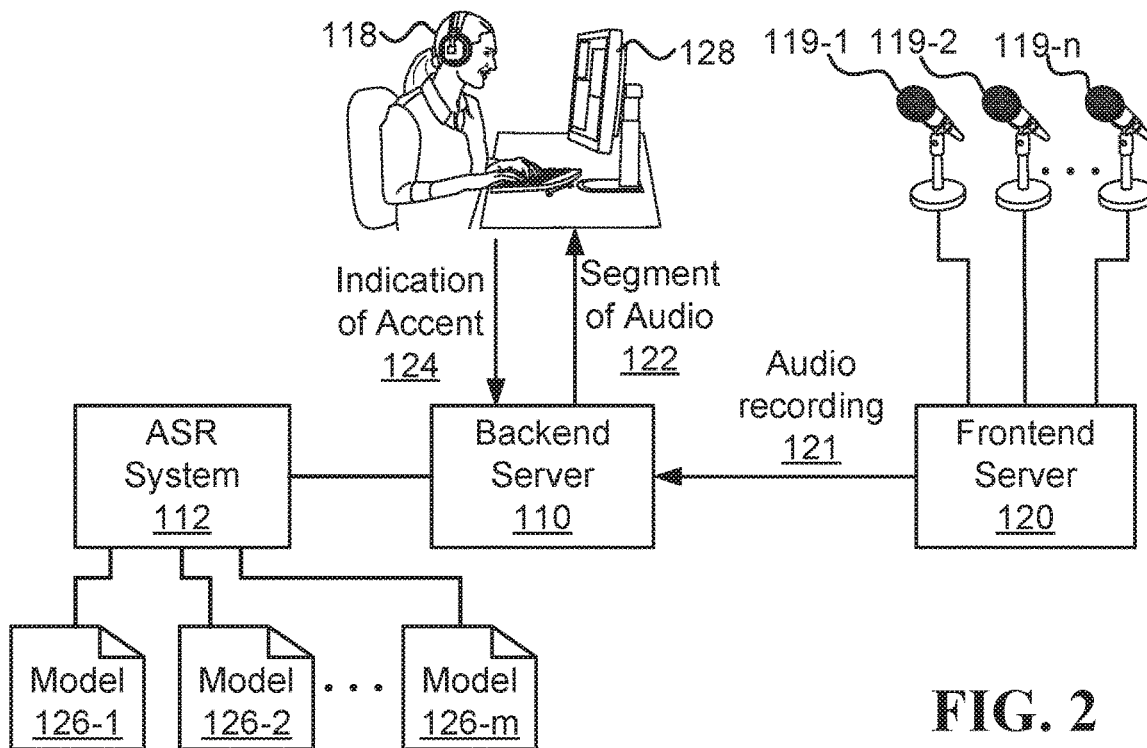
FIG. 2 illustrates one embodiment of a system configured to utilize human assistance to apprise an automatic speech recognition (ASR) system about a spoken accent.

FIG. 2 illustrates one embodiment of a system configured to utilize human assistance to apprise an ASR system about a spoken accent. In one embodiment, the system includes at least a frontend server 120 and the backend server 110. The system may optionally include other elements such as a user interface 128 and/or the one or more microphones 119-1 to 119-$n$. In one embodiment, the backend server 110 is configured to run one or more computer programs that cause it to perform operations described below (which may correspond to at least some of the steps of the method illustrated in FIG. 4).

The frontend server 120 is configured, in one embodiment, to transmit an audio recording 121 that includes speech of one or more people in a room. Optionally, the audio recording is done over a period spanning at least two hours. In one example, the audio recording 121 includes one or more channels of audio recorded using the one or more microphones 119-1 to 119-$n$ (where $n \geq 1$), which are in the room. Optionally, a deposition is being conducted in the room while the audio recording 121 is recorded. In one embodiment, the audio recording 121 includes two or more channels of audio. Optionally, the two or more channels are recorded utilizing respective two or more microphones, from among the microphones 119-1 to 119-$n$. Optionally, the two or more microphones are at least 40 cm away from each other.

In order to improve the quality and speed of a transcription of the audio recording 121, the backend server 110 may try to ascertain what accent is being spoken in at least some portion of the audio recording 121. An indication of what accent is being spoken can then be used to improve performance of the ASR system 112, as discussed below.

In order to receive an indication of the accent early on, in one embodiment, the backend server 110 performs the following operations. Optionally, these operation are performed during the first hour of the period during which the audio recording 121 is recorded. The backend server 110 segments at least a portion of the audio recording 121, which was recorded during the first twenty minutes of the period, to segments of audio. The backend server 110 provides to a transcriber 118 a certain segment 122 from among the segments of audio. Optionally, the certain segment 122 is at least 3 seconds long and/or is less than 10 minutes long. The backend server 110 receives, from the transcriber 118, after the transcriber 118 listened to the certain segment 122, an indication of an accent 124 of a person who spoke in the certain segment 122.

An accent as the term is used herein may refer to a mode of pronunciation of a language. In one example, an accent may correspond to a certain nation or nationality (e.g., a Chinese accent, a German accent, a British accent, etc.) In another example, an accent may correspond to a certain region or locality (e.g., a Cockney accent vs. Scottish accent).

In some embodiments, the backend server 110 may calculate a plurality of values corresponding to a plurality of accents, respectively, where each value corresponding to a certain accent is indicative of a probability that the person who spoke in the certain segment 122 had the certain accent. Optionally, the values are calculated utilizing a machine learning-based model (e.g., a model of a classifier). The backend server 110 may generate feature values indicative of acoustic properties of the certain segment 122, such as feature values derived from an iVector (eigenvoices) representation of utterances from the certain segment 122. Eigenvoices derived from utterances are a low dimensional vector indicating the coordinates of the utterances in a subspace acoustic model, as discussed in more detail in Kenny, et al., "Eigenvoice modeling with sparse training data." IEEE transactions on speech and audio processing 13.3 (2005): 345-354. Optionally, in order to calculate the values corresponding to the plurality of accents, a classifier is used, which was trained on data comprising segments of audio of various speakers speaking in various accents (where for each segment the spoken accent is known).

The backend server 110 may utilize the values corresponding to the plurality of accents to select one or more candidate accents for the accent of the person who spoke in the certain segment 122. For example, the one or more candidate accents all have corresponding calculated probabilities that reach a certain threshold. The backend server 110 may then provide the transcriber 118 with an indication of the one or more candidate accents, in order to assist the transcriber 118 in the selection. Optionally, for each of the one or more candidate accents, the backend server 110 provides an indication of the rank of the accent (among the one or more accents) and/or a probability calculated for the accent.

Figure 3:
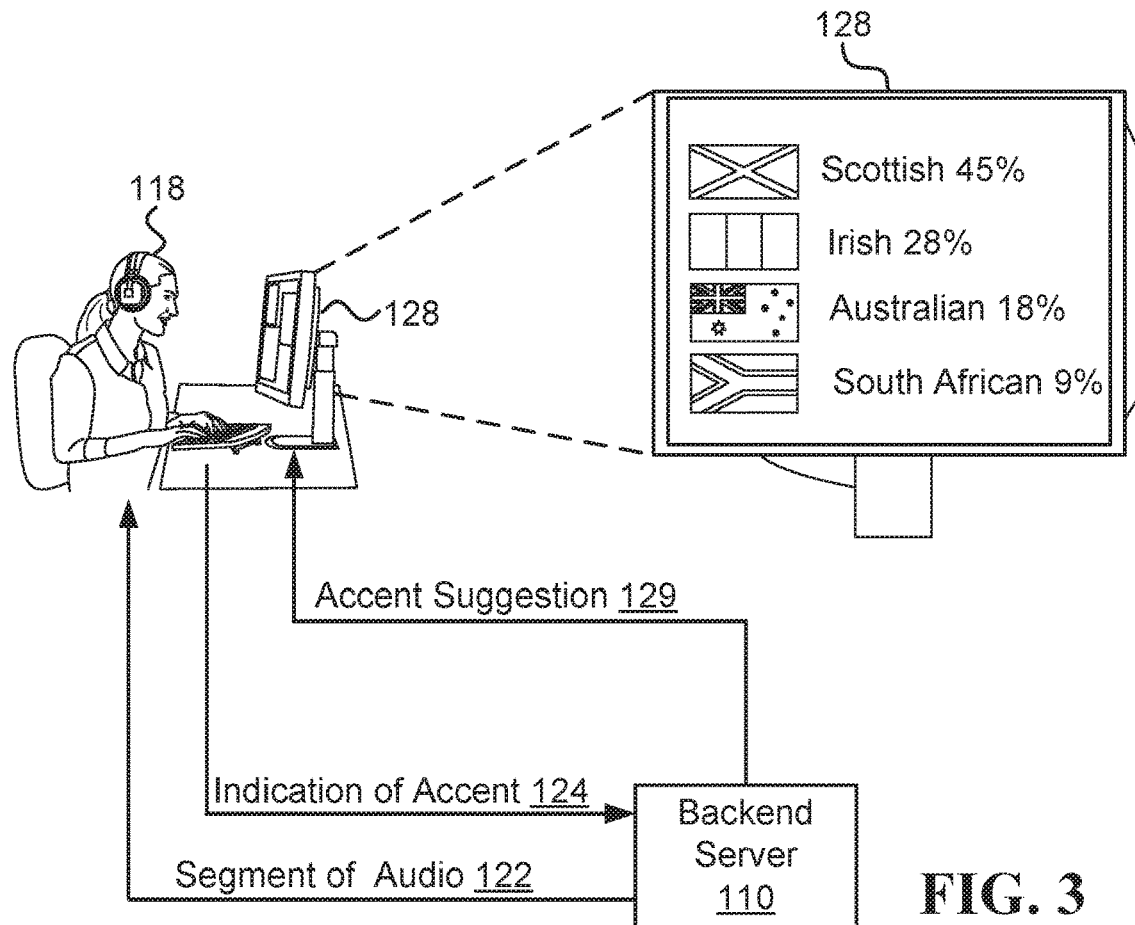

FIG. 3 illustrates a suggestion, by the backend server 110, of likely accents for the transcriber 118 to choose from. As described above, the backend server 110 selects likely accents for the certain segment 122. The likely accents are provided to the transcriber 118 as the accent suggestion 129, which is presented on the user interface 128 (e.g., a computer screen used by the transcriber 118). After listening to the certain segment 122, the transcriber 118 may select the likely accent and return it as the indication of the accent 124.

The certain segment 122 may be selected from among the segments of the audio recording 121 in various ways. In one embodiment, the backend server 110 may attempt to identify accents in the segments but it does not get a conclusive result. For example, the backend server 110 may analyze one or more of the segments that include speech of a certain speaker, in order to determine whether the certain speaker has a certain accent. Optionally, the backend server 110 does not make a confident identification for the certain segment 122 (e.g., confidence in an identification of the certain accent is below a threshold), and consequently provides the certain segment 122 to the transcriber 118 in order to identify the spoken accent. Optionally, the certain segment 122 is selected randomly from among the one or more segments that include speech of the certain speaker, or using some other criterion, such as the certain segment 122 has a desired length and/or the certain segment 122 audio with a good signal-to-noise ratio compared to the other segments among the one or mode segments.

In another embodiment, the backend server 110 determines confidence in transcriptions of the segments of the audio recording 121, which are generated by the ASR system 112. Optionally, the backend server 110 selects the certain segment 122 based on a confidence in a transcription of the certain segment 122 being below a threshold.

The indication of the accent 124 can be utilized to improve the output of the ASR system 112 when applied to additional segments of the audio, some of which are recorded later on during the period. In one embodiment, after receiving the indication of the accent 124, the backend server 110 performs the following (e.g., during the second hour of the period). The backend server 110 provides the indication of the accent 124 to the ASR system 112 to be utilized to generate a transcription of an additional portion of the audio recording 121, which was recorded after the first twenty minutes of the period. Additionally or alternatively, the ASR system 112 may utilize the indication of the accent 124 to generate transcriptions of segments that have already been transcribed by the ASR system 112 (to obtain more accurate transcriptions). The ASR system 112 may utilize the indication of the accent 124 in various ways in order to improve transcription of segments the audio recording 121.

In one embodiment, the ASR system 112 is configured to utilize the indication of the accent 124 to select a certain model, from among a plurality of models 126-1 to 126-$m$ (where $m \geq 2$), to be used to generate transcriptions. For example, the plurality of models 126-1 to 126-$m$ may include various phonetic models that reflect how words are pronounced when spoken in different accents. In another example, the plurality of model 126-1 to 126-$m$ may include various language models that reflect different probabilities of word usage for people speaking with different accents (which often come from having different cultural backgrounds and/or being brought up in different geographical regions). The ASR system 112 can then utilize the certain model to generate the transcription of the additional portion of the audio. Optionally, because of the use of the certain model, which is suitable for the accent indicated in the indication of the accent 124, the transcription of the additional portion of the audio is expected to be more accurate than a transcription generated by the ASR system 112 utilizing a model appropriate for a different accent (e.g., due to a misidentified accent) or utilizing a more general model appropriate for multiple different accents.

In another embodiment, the indication of the accent 124 is provided as input to a seq2seq network utilized by the ASR system 112 to generate transcriptions of segments of audio. Optionally, the seq2seq network was trained on data that includes speech of multiple people having multiple accents, along with indications of the spoken accents. Thus, through such training, the seq2seq network is capable of utilizing the indication of the accent 124 to make adjustments in its transcription process to accommodate for characteristics of the indicated accent (e.g., a specific pronunciation of some words or certain word usage probabilities).

As the aforementioned examples demonstrate, identifying an accent spoken in audio being transcribed can help improve the quality transcription of the audio. This in turn, can help reduce the turnaround time for completing a hybrid transcription of large audio files, such as a transcription of a deposition in which transcribers review transcriptions generated by the ASR system 112. Increasing the accuracy of the transcriptions generated by the ASR system 112 means that the transcribers spend less time correcting errors in the transcriptions of the ASR system 112, and therefore they can complete their reviews of the transcriptions in a shorter time.

Such a fast turnaround enables embodiments described herein to complete transcription of hours of audio within a short while (e.g., same-day transcription of depositions). In one embodiment, the backend server 110 completes a transcription of the audio recording 121 prior to a target completion time that is less than eight hours after the end of the period during which the audio recording 121 is taken. In this embodiment, the backend server 110 receives additional transcriptions of additional segments of the audio recording 121, which were recorded after the first twenty minutes of the period. The additional transcriptions are generated by the ASR system 112 utilizing the indication of the accent 124 (as described above). The backend server 110 provides the additional transcriptions and the additional segments to one or more transcribers, who review the additional transcriptions. The backend server 110 updates the additional transcriptions based on corrections made by the one or more transcribers. The backend server 110 then generates a transcription of the audio recording 121, which includes the speech of the one or more people in the room, during the period, based on data that includes the additional transcriptions of the additional segments of the audio. Optionally, the backend server 110 selects the one or more transcribers from a pool of a plurality of transcribers based on prior performance of at least some of the plurality of transcribers when reviewing transcriptions involving speech with the accent indicated in the indication of the accent 124. For example, the selected transcribers may have previously attained an error rate that is below a threshold when reviewing transcriptions of speech with the accent.

Detecting the spoken accent may be performed for more than one speaker and/or of speech on more than one channel of audio. Thus, the process described above, in which the transcriber 118 identifies the accent, may be done more than once with different segments and/or by more than one transcriber. Thus, the indication of the accent 124 may be applied for specific segments involving speech of a certain person and/or speech on a certain channel.

In one example, the certain segment 122 includes a recording from a certain channel of audio, from among the two or more channels, recorded by a certain microphone from among the two or more microphones, which is closer to a certain person than the other microphones from among the two or more microphones. Optionally, in this embodiment, the ASR system 112 utilizes the indication of the accent 124 to generate transcriptions of one or more segments that include audio from the certain channel. Optionally, the ASR system 112 may utilize a different indication of a different accent when generating transcriptions of other segments comprising audio from other channels.

In addition to providing in the indication of the accent 124, in some embodiments, the transcriber 118 may review a transcription of the certain segment 122 generated by the ASR system 112. Optionally, the backend server 110 receives, from the transcriber 118, one or more corrections to the transcription of the certain segment 122. In a case in which he one or more corrections include a phrase that did not appear in the transcription of the certain segment 122, the phrase may be utilized to expand a language model utilized by the ASR system 112 to generate transcriptions of additional portion of the audio recording.

Different transcribers may have different capabilities, and in particular, certain transcribers may be more adept to identify certain accents and/or to deal with segments of audio that have certain characteristics (e.g., certain topics, audio channel characteristics, etc.). It may be the case that identifying a specific accent in a specific segment of audio may be an easy task for one transcriber, while it may be a difficult task for another transcriber. Thus, for example, if there is knowledge that a certain transcriber has already dealt with segments of audio that include speech with a specific accent, it is likely that the certain transcriber may be called upon to identify whether segments of audio have speech with the specific accent.

Often, the backend server 110 may have a pool of transcribers to which it may turn in order to receive the indication of the accent 124. Selection of a certain transcriber may be done using a machine learning-based approach. In one embodiment, the backend server 110 calculates, utilizing a certain model and based on a transcription of the certain segment 122 generated by the ASR system 112, values indicative of suitability of various transcribers from the pool to transcribe the certain segment 122. Optionally, the feature values include one or more feature values that are based on the vocabulary used in the certain segment 122. Optionally, the feature values include one or more feature values that are indicative of a subject of speech in the certain segment 122. Optionally, the feature values include one or more feature values that are indicative of qualities of the speech in the certain segment 122, such as speed of the speech, level of annunciation, or a value of signal-to-noise of the audio in certain segment 122. Optionally, the feature values include one or more feature values that are indicative of an accent spoken in the certain segment 122 (e.g., as determined based on a classifier used to identify the accent).

The backend server 110 can utilize the values indicative of the suitability of the various transcribers to select a transcriber from among the various transcribers. Optionally, the selected transcriber is the transcriber 118, and a value indicative of a suitability of the transcriber 118 is greater than values indicative of suitability of most of the various transcribers. Optionally, the value indicative of the suitability of the transcriber 118 is greater than values indicative of suitability of all other transcribers from among the various transcribers. Optionally, the certain model used to select the transcriber 118 is generated based on training data that includes: (i) feature values generated from transcriptions by the transcriber 118 of one or more segments of audio that included speech in the accent indicated in the indication of the accent 124, and (ii) labels indicative of quality of the transcriptions of the one or more segments (e.g., as determined based on ground truth transcriptions of the one or more segments).

Figure 4:
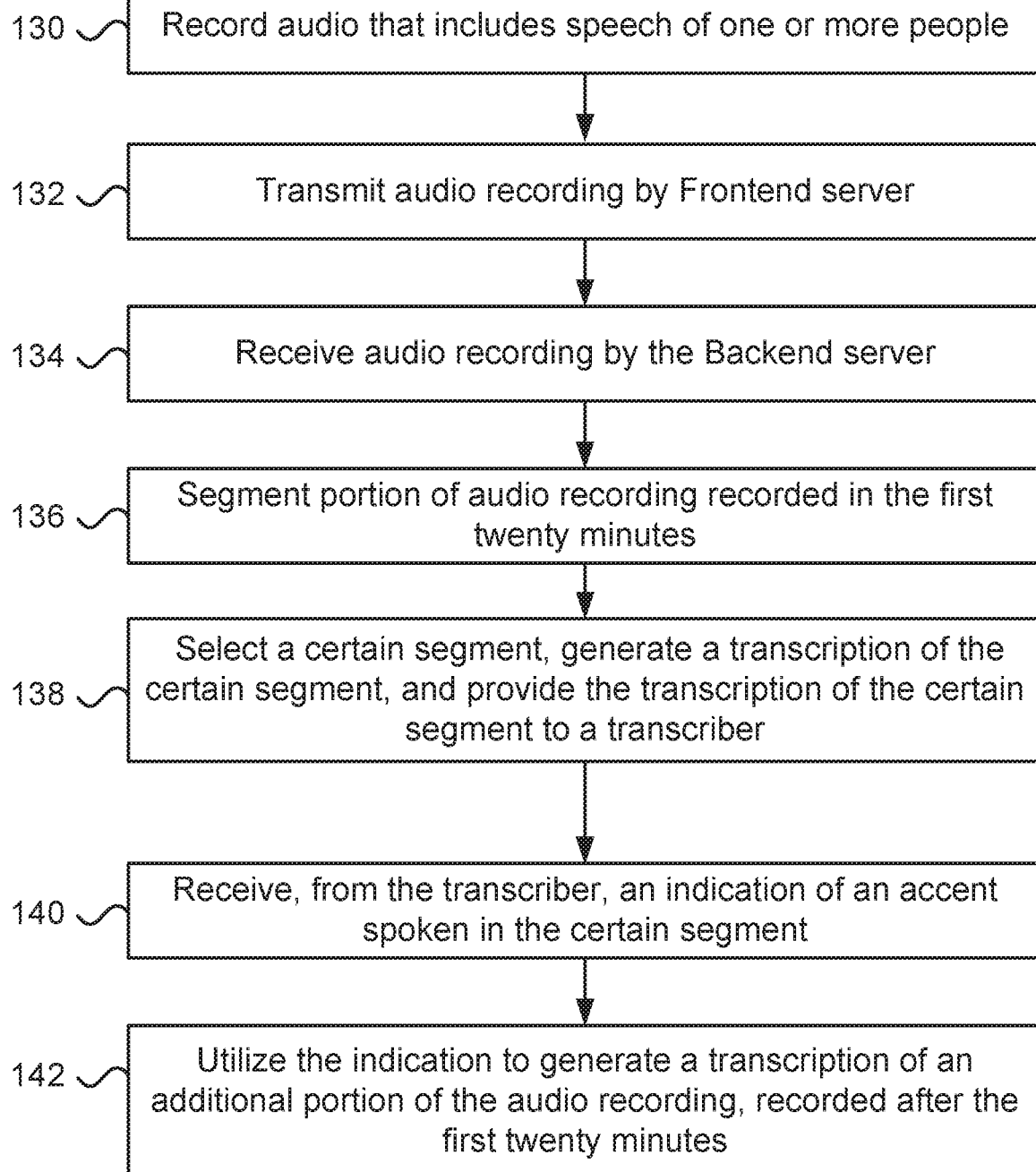
FIG. 4 illustrates steps involved in one embodiment of a method for utilizing human assistance to apprise an ASR system about a spoken accent.

FIG. 4 illustrates steps involved in one embodiment of a method for utilizing human assistance to apprise an ASR system about a spoken accent. The steps illustrated in FIG. 4 may be executed, in some embodiments, by systems modeled according to FIG. 2, which is described above. In some embodiments, instructions for implementing the method may be stored on a computer-readable medium, which may optionally be a non-transitory computer-readable medium. In response to execution by a computer system including a processor and memory (e.g., the backend server 110 described above), the instructions cause the computer system to perform operations of the method.

In one embodiment, the method for utilizing human assistance to apprise ASR system about a spoken accent includes at least the following steps:

In Step 134, receiving an audio recording comprising speech of one or more people. Optionally, the one or more people are in a room. Optionally, the audio recording is taken over a period spanning at least two hours.

In step 136, segmenting at least a portion of the audio recording, which was recorded during the first twenty minutes of the period, to segments.

In Step 140, receiving, from a transcriber, after the transcriber listened to a certain segment from among the segments, an indication indicative of an accent of a person who spoke in the certain segment. Optionally, the certain segment is provided to the transcriber responsive to confidence in an identification of the accent (e.g., by the backend server 110) being below a threshold.

And in Step 142, generating, by the ASR system 112 and utilizing the indication, a transcription of an additional portion of the audio recording, which was recorded after the first twenty minutes of the period. Optionally, utilizing the indication is done by selecting, based on the indication, a certain phonetic model, from among a plurality of phonetic models corresponding to a plurality of accents, and the ASR system 112 utilizes the certain phonetic model to generate the transcription of the additional portion of the audio. Additionally or alternatively, utilizing the indication may be done by providing an input that is based on the indication to a seq2seq network utilized by the ASR system 112 to generate the transcription.

The method described above may include, in some embodiments, optional Step 130, which involves recording the audio recording which includes speech of one or more people in a room, e.g., utilizing one or more of the microphones 119-1 to 119-n. Additionally the method may optionally include Step 132, which involves transmitting the audio recording, e.g., by the frontend server 120.

In another embodiment, the method may optionally involve a step of suggesting candidate accents to the transcriber. Optionally, this is done by performing the following optional steps: calculating a plurality of values corresponding to a plurality of accents, respectively, where each value corresponding to a certain accent is indicative of a probability that the person who spoke in the certain segment had the certain accent; selecting, based on the plurality of values, one or more candidate accents for the accent of the person who spoke in the certain segment; and providing the transcriber with an indication of the one or more candidate accents.

In one embodiment, the method may optionally include Step 138, which involves: selecting the certain segment from among the segments obtained in Step 136, generating the transcription of the certain segment, and providing the transcription of the certain segment to the transcriber. Optionally, this step may also involve receiving from the transcriber one or more corrections to the certain transcription, which comprise a phrase that did not appear in the transcription of the certain segment, and expanding a language model with the phrase. Optionally, the language model may be utilized to generate the transcription of the additional portion of the audio recording.

Identifying the accent spoken in audio being transcribed assists to improve the quality transcription of the audio, which can enable the transcription to be completed within a short while. In one embodiment, the method attains such fast turnaround of a transcription by performing the following prior to a target completion time that is less than eight hours after the end of the period: receiving additional transcriptions, generated by the ASR system 112 utilizing the indication, of additional segments of the audio recording, which were recorded after the first twenty minutes of the period: providing the additional transcriptions and the additional segments to one or more transcribers; updating the additional transcriptions based on corrections made by the one or more transcribers; and generating a transcription of the speech of the one or more people during the period based on data comprising the additional transcriptions of the additional segments of the audio.

Figure 5:
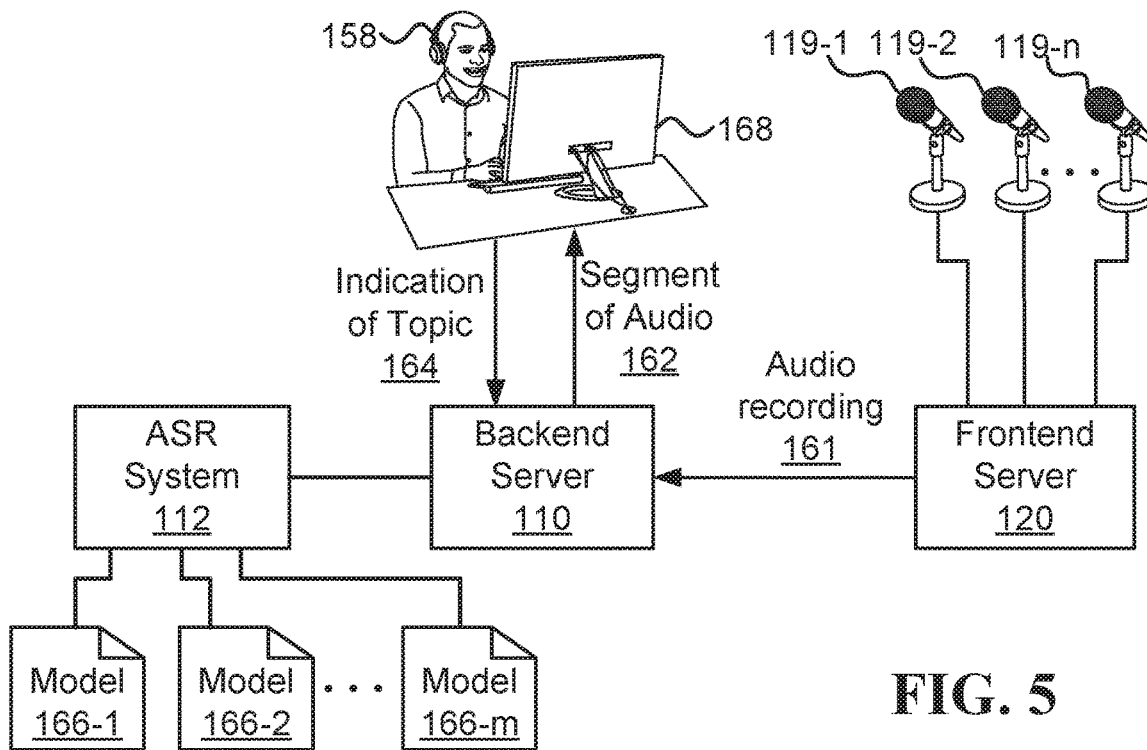
FIG. 5 illustrates one embodiment of a system configured to enable topic identification (by a transcriber) to assist an ASR system.

FIG. 5 illustrates one embodiment of a system configured to enable topic identification (by a transcriber) to assist an ASR system to more accurately transcribe audio. In one embodiment, the system includes at least the frontend server 120 and the backend server 110. The system may optionally include other elements, such as a user interface 168 and/or the one or more microphones 119-1 to 119-n. In one embodiment, the backend server 110 is configured to run one or more computer programs that cause it to perform operations described below (which may correspond to at least some of the steps of the method illustrated in FIG. 7).

The frontend server 120 is configured, in one embodiment, to transmit an audio recording 161 that includes speech of one or more people in a room. Optionally, the audio recording is done over a period spanning at least two hours. In one example, the audio recording 161 includes one or more channels of audio recorded using the one or more microphones 119-1 to 119-n (where n≥1), which are in the room. Optionally, a deposition is being conducted in the room while the audio recording 161 is recorded. In one embodiment, the audio recording 161 includes two or more channels of audio. Optionally, the two or more channels are recorded utilizing respective two or more microphones, from among the microphones 119-1 to 119-n. Optionally, the two or more microphones are at least 40 cm away from each other.

In order to improve the quality and speed of a transcription of the audio recording 161, the backend server 110 may try to ascertain what topic is being discussed in at least some portion of the audio recording 161. An indication of the topic of speech can then be used to improve performance of the ASR system 112, as discussed below.

In order to receive an indication of the topic early on, in one embodiment, the backend server 110 performs the following operations. Optionally, these operation are performed during the first hour of the period during which the audio recording 161 is recorded. The backend server 110 segments at least a portion of the audio recording 161, which was recorded during the first twenty minutes of the period, to segments of audio. The backend server 110 provides to a transcriber 158 a certain segment 162 from among the segments of audio and/or with a transcription of the certain segment 162, which was generated by the ASR system 112. Optionally, the certain segment 162 is at least 3 seconds long and/or is less than 10 minutes long. The backend server 110 receives an indication of a topic 164 of speech in the certain segment 162 from the transcriber 158, after the transcriber 158 listened to the certain segment 162 and/or read the transcription of the certain segment 162.

The topic of a segment of audio typically refers to the subject of most of the speech in the segment of audio. Usually, segments of audio that include speech about different topics will tend to have different semantic characteristics, such as topic-specific vocabularies and/or word distributions, a characteristic structure and/or complexity of sentences, etc. Different levels of granularity may be used to describe the topic of a segment of audio. In some embodiments, topics may refer to general high-level subjects, such as finance, law, medical, engineering, and the like. In other embodiments, topics may be finer grained. For example, the topic of audio from a trial may be assigned a topic that is related to the type of trial being conducted: civil, criminal, juvenile or traffic. In another example, audio that discusses a fact finding deposition about a development of a drug may be assigned a topic that corresponds to a stage in the development process, such as: discovery, product characterization, pharmacokinetics, preclinical toxicology and bioanalytical testing, and clinical trials.

Apprising the ASR system 112 about the topic can enable it, in some embodiments, to improve the accuracy of its transcription. For example, the word "agonist" may be frequently used when the topic pharmacology, but very seldomly used in other contests, such as civil trials, entertainment, etc. Thus, if the ASR system 112 is apprised about the topic being pharmacology, it is more like to transcribe an utterance of the word "agonist" correctly, and not mistake it with other similar sounding words like "activist" or "analyst", which are more frequently used in general speech, when the topic is not pharmacology.

To assist the transcriber 158 to identify a topic of speech in the certain segment 162, in some embodiments, the backend server 110 may calculate a plurality of values corresponding to a plurality of topics, respectively, where each value corresponding to a certain topic is indicative of a probability that the speech in the certain segment 162 primarily involves the certain topic. To this end, the backend server may utilize various topic classification known in the art. In one embodiment, the values are calculated utilizing a machine learning-based model (e.g., a model of a classifier). The backend server 110 generates feature values, from a transcription of the certain segment 162 generated by the ASR system 112. Optionally, the feature values are indicative of various semantic properties of the transcription. In one example, at least some of the feature values are indicative of frequencies of certain words in the transcription. In another example, at least some of the feature values are indicative of frequencies at which terms from various families of terms (e.g., there may be separate families for medical terms, legal terms, financial terms, etc.). The backend server 110 may utilize a machine learning-based model to calculate, based on the feature values, the aforementioned plurality of values.

The backend server 110 may utilize the plurality of values corresponding to the plurality of topics to select one or more candidate topics for the topic of speech in the certain segment 162. For example, the one or more candidate topics may all have corresponding calculated probabilities that reach a certain threshold. The backend server 110 may then provide the transcriber 158 with an indication of the one or more candidate topics, in order to assist the transcriber 158 in the selection. Optionally, for each of the one or more candidate topics, the backend server 110 provides an indication of the rank of the topic (among the one or more candidate topics) and/or the probability calculated for the topic.

Figure 6:
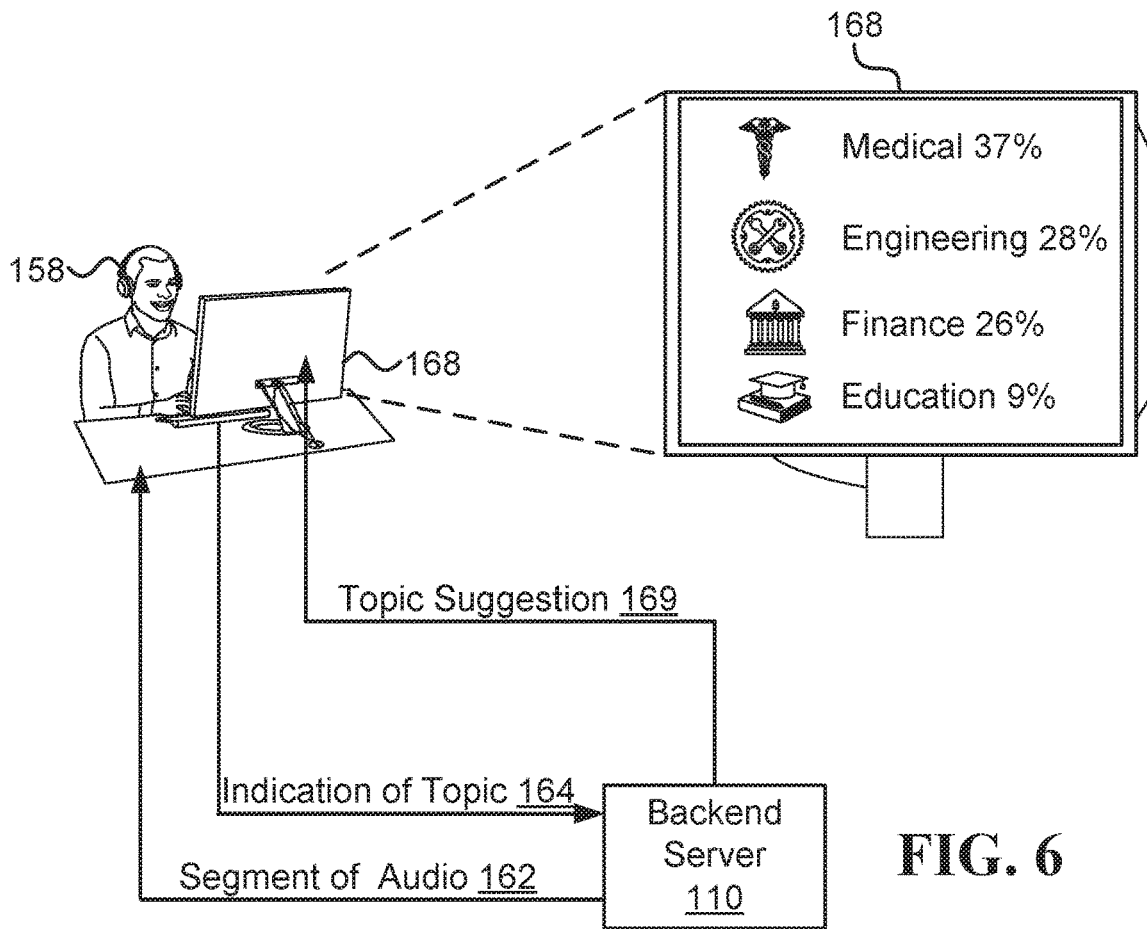

FIG. 6 illustrates a suggestion, by the backend server 110, of likely topics for the transcriber 158 to choose from. As described above, the backend server 110 selects likely topics for the certain segment 162. The likely topics are provided to the transcriber 158 as the topic suggestion 169, which is presented on the user interface 168 (e.g., a computer screen used by the transcriber 158). After listening to the certain segment 162 and/or reading a transcription of the certain segment 162, the transcriber 158 may select the likely topic and return it as the indication of the topic 164.

The certain segment 162 may be selected from among the segments of the audio recording 161 in various ways. In one embodiment, the backend server 110 may attempt to identify topics of the segments, based on transcriptions of the segments generated by the ASR system 112, and does not get a conclusive result. For example, the backend server 110 may analyze the segments in order to determine whether they involve speech on a certain topic. Optionally, the backend server 110 does not make a confident identification for the certain segment 162 (e.g., confidence in an identification of the certain topic is below a threshold), and consequently provides the certain segment 162 to the transcriber 158 in order to identify the topic. Optionally, the certain segment 162 is selected randomly from among the segments, or using some other criterion, such as the certain segment 162 has a desired length, the certain segment 162 has audio with a good signal-to-noise ratio compared to the other segments, and/or a transcription of the certain segment 162 was generate (by the ASR system 112) with sufficient confidence.

In one embodiment, the backend server 110 analyzes transcriptions of the segments of the audio recording 161, generated by the ASR system 112, and selects the certain segment 162 based on a word distribution in a transcription of the certain segment 162 being more similar to a general word distribution of words in the transcriptions of the segments, compared to similarities of word distributions in transcriptions of most the segments to the general word distribution. For example, the backend server 110 may calculate a probability density function of words in each of the transcriptions, and a general probability density function for words in all of the segments. The backend server 110 may then select the certain segment 162 because is probability density function is most similar to the general probability density function.

The indication of the topic 164 can be utilized to improve the products of the ASR system 112, when applied to additional segments of the audio, some of which are recorded later on during the period. In one embodiment, after receiving the indication of the topic 164 (e.g., during the second hour of the period), the backend server 110 performs the following. The backend server 110 provides the indication of the topic 164 to the ASR system 112 to be utilized to generate a transcription of an additional portion of the audio recording 161, which was recorded after the first twenty minutes of the period. Additionally or alternatively, the ASR system 112 may utilize the indication of the topic 164 to generate transcriptions of segments that have already been transcribed by the ASR system 112 (to produce more accurate transcriptions). The ASR system 112 may utilize the indication of the topic 164 in various ways in order to improve transcription of segments the audio recording 161.

In one embodiment, the ASR system 112 is configured to utilize the indication of the topic 164 to select a certain model, from among a plurality of models 166-1 to 166-$m$ (where m_2), to be used to generate transcriptions. For example, the plurality of models 166-1 to 166-$m$ may include various language models that reflect vocabularies and/or word frequencies when speech is about different topics. The ASR system 112 can then utilize the certain model to generate the transcription of the additional portion of the audio. Optionally, because of the use of the certain model, which is suitable for the topic indicated in the indication of the topic 164, the transcription of the additional portion of the audio is expected to be more accurate than a transcription that is generated by the ASR system 112 utilizing a model appropriate for a different topic (e.g., due to a misidentified topic) or utilizing a more general model appropriate for multiple topics.

In another embodiment, the indication of the topic 164 is provided as input to a seq2seq network utilized by the ASR system 112 to generate transcriptions of segments of audio. Optionally, the seq2seq network was trained on data that includes speech of multiple people speaking about various topics. Thus, through such training, the seq2seq network is capable of utilizing the indication of the topic 164 to make adjustments in its transcription process to accommodate for characteristics of the indicated topic (e.g., adjust for different word probabilities that correspond to the indicated topic).

As the aforementioned examples demonstrate, identifying a topic of speech in audio that needs to be transcribed can help improve the quality transcription of the audio. This in turn, can help reduce the turnaround time for completing hybrid transcription of large audio files (as described above in the case of the use of the indication of the topic 164).

In one embodiment, the backend server 110 completes a transcription of the audio recording 161 prior to a target completion time that is less than eight hours after the end of the period during which the audio recording 161 is taken. In this embodiment, the backend server 110 receives additional transcriptions of additional segments of the audio recording 161, which were recorded after the first twenty minutes of the period. The additional transcriptions are generated by the ASR system 112 utilizing the indication of the topic 164 (as described above). The backend server 110 provides the additional transcriptions and the additional segments to one or more transcribers, who review the additional transcriptions. The backend server 110 updates the additional transcriptions based on corrections made by the one or more transcribers. The backend server 110 then generates a full transcription of the audio recording 161, which includes the speech of the one or more people in the room, during the period, based on data that includes the additional transcriptions of the additional segments of the audio. Optionally, the backend server 110 selects the one or more transcribers from a pool of a plurality of transcribers based on prior performance of at least some of the plurality of transcribers when reviewing transcriptions involving speech related to the topic indicated in the indication of the topic 164. For example, the selected transcribers may have previously attained an error rate that is below a threshold when reviewing transcriptions of speech about that topic.

In addition to providing in the indication of the topic 164, in some embodiments, the transcriber 158 may review a transcription of the certain segment 162 generated by the ASR system 112. Optionally, the backend server 110 receives, from the transcriber 158, one or more corrections to the transcription of the certain segment 162. In a case in which he one or more corrections include a phrase that did not appear in the transcription of the certain segment 162, the phrase may be utilized to expand a language model utilized by the ASR system 112 to generate transcriptions of additional portion of the audio recording.

Different transcribers may have different capabilities, and in particular, certain transcribers may be more adept to deal with segments of audio that have certain characteristics (e.g., certain topics, audio channel characteristics, accents, etc.). It may be the case that identifying a specific topic in a specific segment of audio may be an easy task for one transcriber, while a difficult task for another transcriber. Thus, for example, if there is knowledge that a certain transcriber has already dealt with segments that include speech with a specific topic, it is likely that the certain transcriber may be called upon to identify whether segments of audio have speech about the specific topic.

Often, the backend server 110 may have a pool of transcribers to which it may turn in order to receive the indication of the topic 164. Selection of a certain transcriber may be done using a machine learning-based approach. In one embodiment, the backend server 110 calculates, utilizing a certain model and based on a transcription of the certain segment 162 generated by the ASR system 112, values indicative of suitability of various transcribers from the pool to transcribe the certain segment 162. Optionally, the feature values include one or more feature values that are based on the vocabulary used in the certain segment 162. Optionally, the feature values include one or more feature values that are indicative of a subject of speech in the certain segment 162. Optionally, the feature values include one or more feature values that are indicative of qualities of the speech in the certain segment 162, such as speed of the speech, level of annunciation, or a value of signal-to-noise of the audio in certain segment 162. Optionally, the feature values include one or more feature values that are indicative of an accent spoken in the certain segment 162 (e.g., as determined based on a classifier used to identify the accent).

The backend server 110 can utilize the values indicative of the suitability of the various transcribers to select a transcriber from among the various transcribers. Optionally, the selected transcriber is the transcriber 158, and a value indicative of a suitability of the transcriber 158 is greater than values indicative of suitability of most of the various transcribers. Optionally, the value indicative of the suitability of the transcriber 158 is greater than values indicative of suitability of all other transcribers from among the various transcribers. Optionally, the certain model used to select the transcriber 158 is generated based on training data that includes: (i) feature values generated from transcriptions by the transcriber 158 of one or more segments of audio that included speech about the topic indicated in the indication of the topic 164, and (ii) labels indicative of quality of the transcriptions of the one or more segments. (e.g., as determined based on ground truth transcriptions of the one or more segments).

Figure 7:
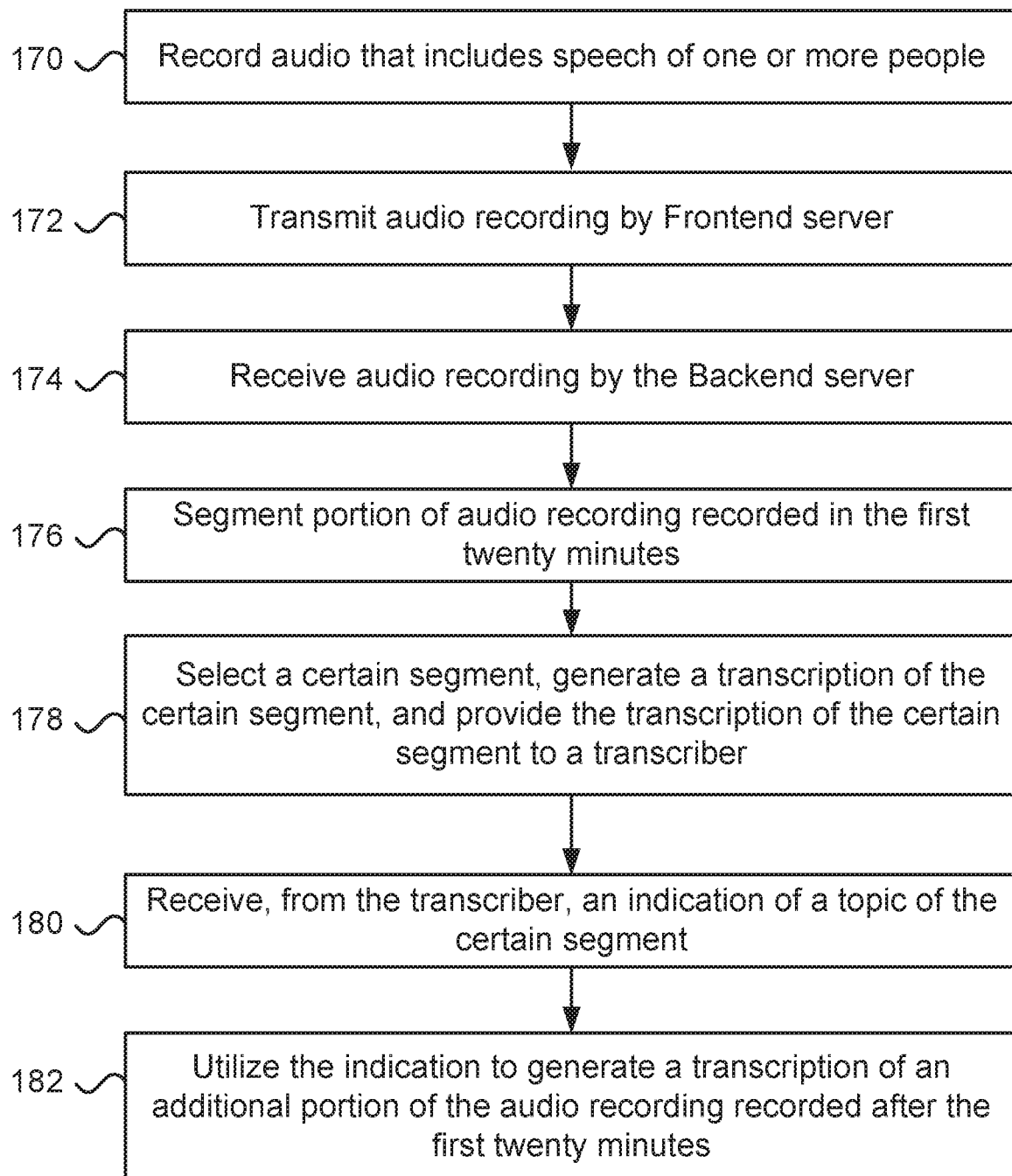
FIG. 7 illustrates steps involved in one embodiment of a method for enabling topic identification to assist an ASR system.

FIG. 7 illustrates steps involved in one embodiment of a method for enabling topic identification to assist an ASR system. The steps illustrated in FIG. 7 may be executed, in some embodiments, by systems modeled according to FIG. 5, which is described above. In some embodiments, instructions for implementing the method may be stored on a computer-readable medium, which may optionally be a non-transitory computer-readable medium. In response to execution by a computer system including a processor and memory (e.g., the backend server 110 described above), the instructions cause the computer system to perform operations of the method.

In one embodiment, the method for enabling topic identification to assist an ASR system includes at least the following steps:

In Step 174, receiving an audio recording that includes speech of one or more people in a room over a period spanning at least two hours.

In step 176, segmenting at least a portion of the audio recording, which was recorded during the first twenty minutes of the period, to segments.

In Step 180, receiving an indication indicative of a topic of the certain segment from a transcriber, from a transcriber, after the transcriber listened to the certain segment and/or read a transcription of the certain segment. Optionally, the certain segment is provided to the transcriber responsive to confidence in an identification of its topic (e.g., by the backend server 110) being below a threshold.

And in Step 182, generating, by the ASR system 112 and utilizing the indication, a transcription of an additional portion of the audio recording, which was recorded after the first twenty minutes of the period. Optionally, utilizing the indication is done by selecting, based on the indication, a certain language model, from among a plurality of language models corresponding to a plurality of topics, and the ASR system 112 utilizes the certain language model to generate the transcription of the additional portion of the audio. Additionally or alternatively, utilizing the indication may be done by providing an input that is based on the indication to a seq2seq network utilized by the ASR system 112 to generate the transcription.

The method described above may include, in some embodiments, optional Step 170, which involves recording the audio recording that includes speech of the one or more people in the room, e.g., utilizing one or more of the microphones 119-1 to 119-n. Additionally the method may optionally include step 172, which involves transmitting the audio recording, e.g., by the frontend server 120.

In one embodiment, the method may optionally include Step 178, which involves: selecting the certain segment from among the segments obtained in Step 176, generating the transcription of the certain segment, and providing the transcription of the certain segment to the transcriber. Optionally, this step may also involve receiving from the transcriber one or more corrections to the certain transcription, which include a phrase that did not appear in the transcription of the certain segment, and expanding a language model with the phrase. Optionally, the language model may be utilized to generate the transcription of the additional portion of the audio recording.

In another embodiment, the method may optionally involve a step of suggesting candidate topics to the transcriber. Optionally, this is done by performing the following optional steps: calculating a plurality of values corresponding to a plurality of topics, respectively, where each value corresponding to a certain topic is indicative of a probability that speech in the certain segment involved the certain topic; selecting, based on the plurality of values, one or more candidate topics for the speech in the certain segment; and providing the transcriber with an indication of the one or more candidate topics.

Identifying the topic of speech in audio being transcribed assists to improve the quality transcription of the audio, which can enable the transcription to be completed within a short while. In one embodiment, the method attains such fast turnaround of a transcription by performing the following prior to a target completion time that is less than eight hours after the end of the period: receiving additional transcriptions, generated by the ASR system 112 utilizing the indication, of additional segments of the audio recording, which were recorded after the first twenty minutes of the period: providing the additional transcriptions and the additional segments to one or more transcribers; updating the additional transcriptions based on corrections made by the one or more transcribers; and generating a transcription of the speech of the one or more people during the period based on data comprising the additional transcriptions of the additional segments of the audio.

In one embodiment, the method optionally includes the following steps: analyzing transcriptions of the segments generated by the ASR system 112, and selecting the certain segment based on a word distribution in a transcription of the certain segment being more similar to a general word distribution of words in the transcriptions of the segments compared to similarities of word distributions in transcriptions of most the segments to the general word distribution.

Figure 8A:
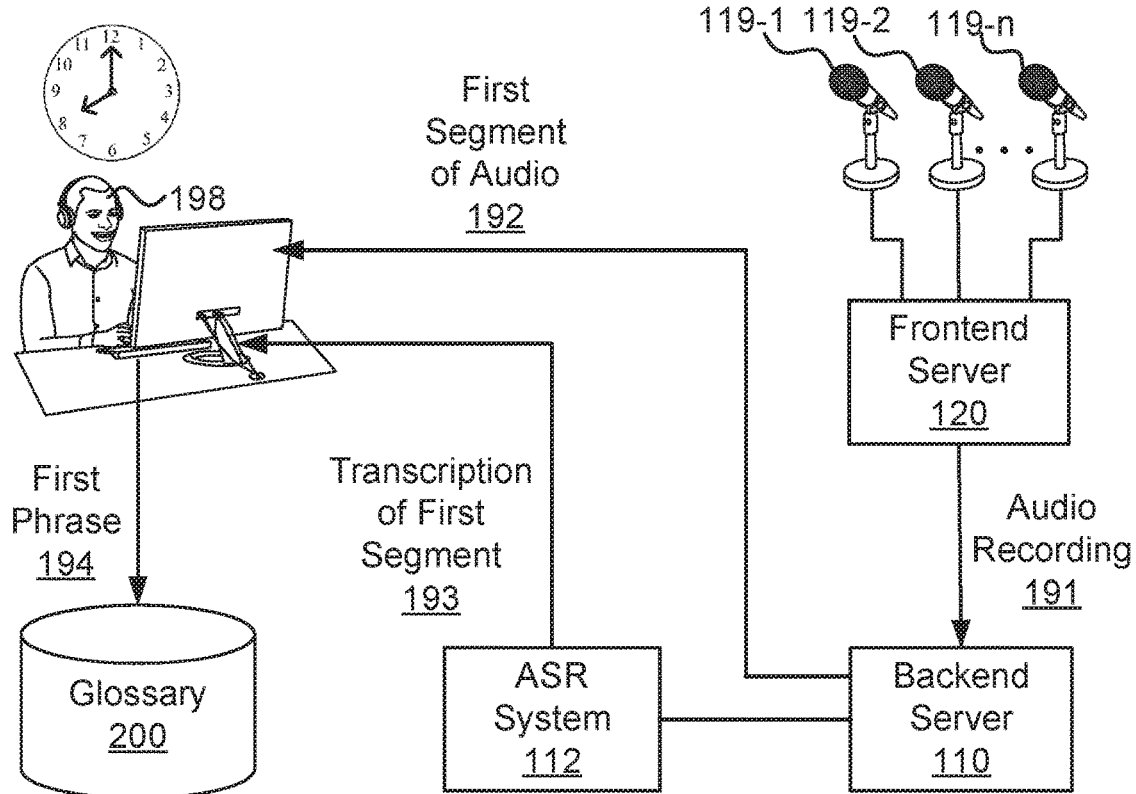
FIG. 8a and FIG. 8b illustrate one embodiment of a system configured to curate a glossary and utilize the glossary for rapid transcription of audio.
Figure 8B:
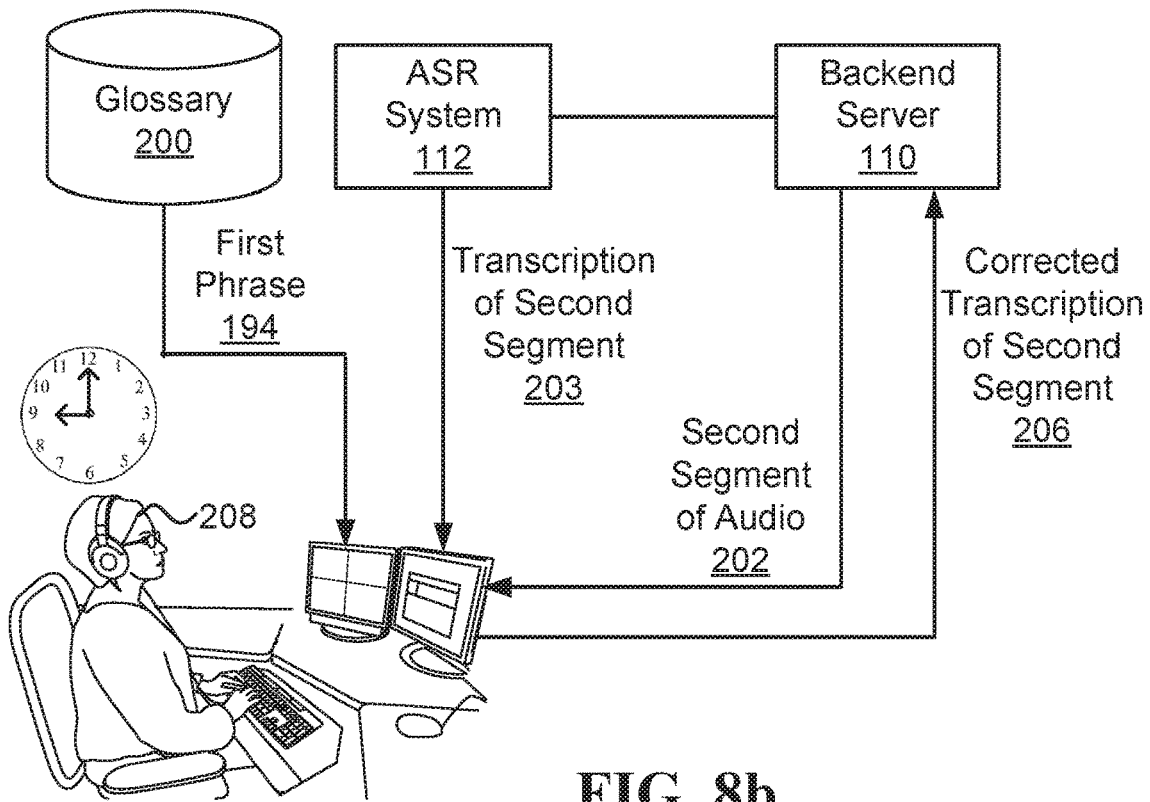

FIG. 8a and FIG. 8b illustrate one embodiment of a system configured to curate a glossary and utilize the glossary for rapid transcription of audio. In one embodiment, the system includes at least the frontend server 120 and the backend server 110. The system may optionally include other elements such as user interfaces and/or the one or more microphones 119-1 to 119-n. In one embodiment, the backend server 110 is configured to run one or more computer programs that cause it to perform operations described below (which may correspond to at least some of the steps of the method illustrated in FIG. 9).

The frontend server 120 is configured, in one embodiment, to transmit an audio recording 191 that includes speech of one or more people in a room. Optionally, the audio recording 191 is taken over a period spanning at least two hours. In one example, the audio recording 191 includes one or more channels of audio recorded using the one or more of microphones 119-1 to 119-n (where n≥1), which are in the room. Optionally, a deposition is being conducted in the room while the audio recording 191 is recorded. In one embodiment, the audio recording 191 includes two or more channels of audio. Optionally, the two or more channels are recorded utilizing respective two or more microphones, from among the microphones 119-1 to 119-n. Optionally, the two or more microphones are at least 40 cm away from each other.

In order to improve the quality and speed of a transcription of the audio recording 191, in some embodiments, the backend server 110 provides a mechanism in which transcribers may quickly start building and/or augmenting a glossary 200, which includes phrases (e.g., names or terms) that are used in the speech of the audio recording 191. The glossary 200 is made available to additional transcribers in order to assist them to correctly resolve utterances in the audio. Thus, having the glossary 200 can help these transcribers quickly resolve some of the phrases they encounter in segments of audio they transcribe, which contributes to the speed and accuracy of their transcribing, as well as to the overall consistency of the resulting transcription of the audio recording 191.

The glossary 200 may be any form of file and/or database that may be accessed and shared among multiple transcribers. Entering phrases into the glossary 200 may be done in different ways. In one embodiment, each of the transcribers may access and modify entries in the glossary. In another embodiment, transcribers may suggest entries to the glossary 200, and these may get voted on and/or approved by one or more senior transcribers. It is to be noted that the glossary 200 may include additional previous terms, that were entered prior to when the audio recording 191 was recorded.

The glossary 200 may include various types of information. In one embodiment, the glossary 200 includes examples of pronunciation of a certain phrase that was entered in the glossary 200. For example, the glossary 200 may include audio samples in which the certain phrase was uttered (from the audio recording 191 and/or some other audio recording). In another embodiment, the glossary 200 may include portions of transcriptions of segments of audio that include the certain phrase. In yet another embodiment, the glossary 200 may include additional resources related to the certain phrase, such as webpages, supplementary documents, etc., which support the inclusion of the certain phrase in the glossary 200 (e.g., the documents may include examples where the phrase is used in a related context or an example of a certain spelling used for a name).

FIG. 8a illustrates how the glossary 200 may have phrases added to it early on, at the initial stages of a transcription job, such as starting to work on a transcription of a legal deposition shortly after the deposition started. In order to enable a quick entry of phrases into the glossary 200, in some embodiments, the backend server 110 is configured to perform the following during the first hour of the period during which the audio recording 191 is obtained. The backend server 110 segments at least a portion of the audio recording 191, which was recorded during the first twenty minutes of the period during which the audio recording 191 is taken, to segments of audio. The backend server 110 then generates, utilizing the ASR system 112, a first transcription 193 of a first segment 192, from among the segments. The first segment 192 and the first transcription 193 are provided to a transcriber 198, who reviews the first transcription 193. The transcriber 198 identifies that the first segment 192 includes a first phrase 194, which was not present in the first transcription 193. The first phrase 194 might be missing for various reasons, such as the ASR system 112 mistakenly transcribed an utterance of the first phrase 194 as some other phrase, or the ASR system 112 might have evaluated the utterance of the first phrase 194 to be unintelligible, and consequently did not provide a transcription of it. Optionally, a review by the transcriber 198 of the first transcription 193 results in a corrected transcription of the first segment 192, which is provided to the backend server 110.

The first phrase 194 may then be added to the glossary 200, which may be done in various ways. In one embodiment, the transcriber 198 enters the first phrase 194 into the glossary 200 and/or instructs the backend server 110 to add the first phrase 194 to the glossary 200. In another embodiment, the backend server 110 may independently add the first phrase 194 into the glossary 200. Optionally, the backend server 110 adds the first phrase 194 after analyzing the corrected transcription of the first segment 192 and determining a semantic role of the first phrase 194 warrants its addition to the glossary 200. For example, the backend server 110 may determine (e.g., based on semantic analysis) that the first phrase 194 is a name of a person or place which is relevant to the content of the corrected transcription of the first segment 192 and/or that the first phrase 194 appears in the corrected transcription of the first segment 192 numerous times.

FIG. 8b illustrates how the glossary 200 may be utilized to improve the transcription accuracy, shortly after phrases are entered into the glossary 200. For example, the glossary 200 may be used to transcribe segments of audio of a legal deposition, while the deposition is still in progress. In order to benefit from the glossary 200, in some embodiments, the backend server 110 is configured to perform the following after the first hour of the period. The backend server 110 generates, utilizing the ASR system 112, a second transcription 203 of a second segment 202 of the audio recording 191, which are provided to a transcriber 208. Optionally, the transcriber 208 is not the same person as the transcriber 198. Optionally, the second segment 202 was recorded before the first segment 192.

The transcriber 208 utilizes the glossary 200 in a review of the second transcription 203. In one example, the transcriber 208 utilizes the glossary 200 to substitute a second phrase that is in the second transcription 203, with the first phrase 194, which appears in the glossary 200. Optionally, the second phrase does not appear in the glossary 200.

Optionally, the first phrase 194 did not appear anywhere the second transcription 203 (prior to when the transcriber 208 made the substitution).

The first segment 192 may be selected from among the segments of the audio recording 191 in various ways. In one embodiment, the backend server 110 uses a machine learning-based approach, in which the backend server 110 generates transcriptions of the segments of the audio recording 191 that were recorded at the beginning of the period during which the audio recording 191 was recorded (the segments from the first twenty minutes mentioned above). Utilizing a certain model, the backend server 110 calculates values indicative of an expected contribution to formation of a glossary of transcription by a transcriber of each of the segments. For example, the values indicative of the expected contribution may indicate, for each of the segment, how many phrases are likely to be added after a transcriber reviews the segment and/or how many times phrases added from a review by the transcriber will later be utilized by other transcribers when the transcribe additional segments of the audio recording 191. Optionally, the values indicative of the expected contribution are calculated based on feature values generated by the backend server 110 to represent each of the segments.

There are various types of feature values that may be generated to be used for the aforementioned calculation of the values indicative of the contribution of each segment to the formation of a glossary. In one example, the feature values representing a segment of audio may include one or more feature values generated based on a transcription of the segment generated by the ASR system 112, and include values indicative of various semantic properties of the transcription, such as the number of names and/or low-probability words that appear in the transcription. In another example, the feature values may include one or more feature values indicative of how many names and/or low-probability words are in the transcription of the segment, but are not in the current state of glossary the segment is intended to be used to augment. In yet another example, one or more feature values may be indicative of the number of unresolved utterances in the segment (e.g., based on observing low-confidence regions in a lattice generated by the ASR system 112 when transcribing the segment).

Herein, describing a word or phrase as having "a low-probability", being rare, seldomly used, and the like, is intended to indicate that on average, over a large corpus of speech and/or text involving various subjects, the word or phrase are not encountered much. That is, the probability of observing a word or phrase with a low-probability is below a threshold. Optionally, the threshold is set such that there are at least a certain number of words (e.g., 500, 1000, 10000, or some other number), that have a probability that is above the threshold.

The values indicative of the contribution of each segment to the formation of the glossary can then be used to select which segment from among the segments to provide to the transcriber 198, in order for the transcriber 198 to review (and optionally use to augment the glossary 200 with additional phrases). In one embodiment, the fact that the first segment 192 is selected means that the value indicative of the expected contribution to formation of the glossary 200 of a review of the first transcription 193 of the first segment 192 is greater than the values of the expected contribution of most of the segments. Optionally, the value indicative of the expected contribution to formation of the glossary 200 of the review of the first transcription 193 is greater than the values of the expected contribution of all the other segments.

In some embodiments, the certain model used to calculate the values indicative of the contribution of each segment to the formation of a glossary is generated based on data that includes transcriptions generated by the ASR system 112 of previous segments of audio, and corrections to these transcriptions by transcribers. Thus, the data may reflect, for the transcriptions, to what extent their review by the transcribers added phrases to a glossary being formed to assist in transcription of the audio from which the previous segments were taken. Optionally, the previous segments are from audio from involving the same topic as the topic of the audio recording 191.

In some embodiments, a plurality of models, for calculating the values indicative of the contribution to the formation of a glossary, may be generated for different topics of audio. In such embodiments, the backend server 110 may identify, based on a transcription a segment, a topic of the segment, and then select the certain model, from among the plurality of models, based on the topic. Optionally, each model, from among the plurality of models, corresponds to a topic from among a plurality of topics, and each model is generated based on data that includes: (i) transcriptions by the ASR system 112 of previous segments of audio that include speech related to the topic, and (ii) corrections to these transcriptions by transcribers.

Another criterion that may be used to select the first segment 192 from among the segments of the audio recording 191 which were recorded during the first twenty minutes of the period, is to detect certain utterances that were repeated, which may be, for example, names or key terms, but were not likely transcribed correctly. Having a transcriber review these transcriptions can enable addition of phrases that are likely to appear in other segments to the glossary 200.

In one embodiment, the backend server 110 is utilizes transcriptions generated by the ASR system 112 to identify a certain utterance that is uttered in more than one of the segments, and whose transcription has low confidence in corresponding transcriptions of the more than one of the segments. For example, regions in lattices constructed by the ASR system 112 for transcription of these segments, which correspond to the utterances, may have low-confidence and/or may not include a strong candidate that stands out from among multiple options. Additional discussion regarding identifying repeated utterances that are not adequately resolved by the ASR system 112 are provided in the discussion regarding embodiments illustrated in FIG. 18. In one embodiment, the backend server 110 selects the first segment 192 based on the first segment 192 including such a repeated unresolved utterance.

As mentioned elsewhere herein, different transcribers may have different capabilities, and may be more adept to deal with segments of audio that have certain characteristics. Thus, it may be beneficial in some embodiments to select a transcriber to review transcriptions at an early stage in order to increase the utility from the glossary. Optionally, the selection of the transcriber 198 may be done using a machine learning-based approach, as follows. In some embodiments, the backend server 110 generates feature values based on at least one of: the first transcription 193 and the first segment 192. The backend server 110 then utilizes a specific model to calculate, based on the feature values, suitability-values indicative of suitability of various transcribers to transcribe the first segment 192. The backend server 110 then utilizes the suitability-values to select the transcriber 198 from among the various transcribers. Optionally, the suitability-value of the transcriber 198 is greater than suitability-values of most of the various transcribers. Optionally, the suitability-value of the transcriber 198 is highest among the suitability-values. Additional details regarding the process of selecting a transcriber that is suitable for transcribing a certain segment of audio are provided herein in the discussion regarding embodiments modeled according to the system illustrated in FIG. 22.

The glossary 200 may enable additional transcribers to transcribe additional segments of audio more accurately and more quickly, since they are less likely to make mistakes and/or spend a lot of time trying to resolve phrases that may be specific to the audio at hand, such as names and/or specific technical terms. This in turn, can help reduce the turnaround time for completing a hybrid transcription of large audio files.

In one embodiment, the backend server 110 completes a transcription of the audio recording 191 prior to a target completion time that is less than eight hours after the end of the period during which the audio recording 191 is taken. In this embodiment, the backend server 110 receives additional transcriptions of additional segments of the audio recording 191, which were recorded after the first twenty minutes of the period. Optionally, the additional transcriptions are generated utilizing the ASR system 112. The backend server 110 provides the additional segments, the additional transcriptions, and the glossary 200 to multiple transcribers, who review the additional transcriptions. The backend server 110 receives corrected transcriptions, generated by the multiple transcribers after they listened to the additional segments and consequently made changes to the additional transcriptions. At least some of the changes involve substituting a phrase in a transcription with the first phrase 194. The backend server 110 then generates a transcription of the audio recording 191, which includes the speech of the one or more people in the room, during the period, based on data that includes the additional transcriptions of the additional segments of the audio.

In addition to improving transcription of human transcribers, curation of the glossary 200 can be utilized to improve the performance of the ASR system 112. In one embodiment, the backend server 110 utilizes certain segments of the audio recording 191, in which the first phrase 194 was uttered and certain transcriptions of the certain segments, which were reviewed by one or more transcribers (e.g., the transcriber 198 and possibly other transcribers), to update a phonetic model utilized by the ASR system 112 to reflect a pronunciation of the first phrase 194. Thus, the ASR system 112 may learn from the curation of the glossary 200 how certain low-probability phrases are pronounced (e.g., names or technical terms), in order to be able to identify these certain low-probability phrases when it encounters them again.

Figure 9:
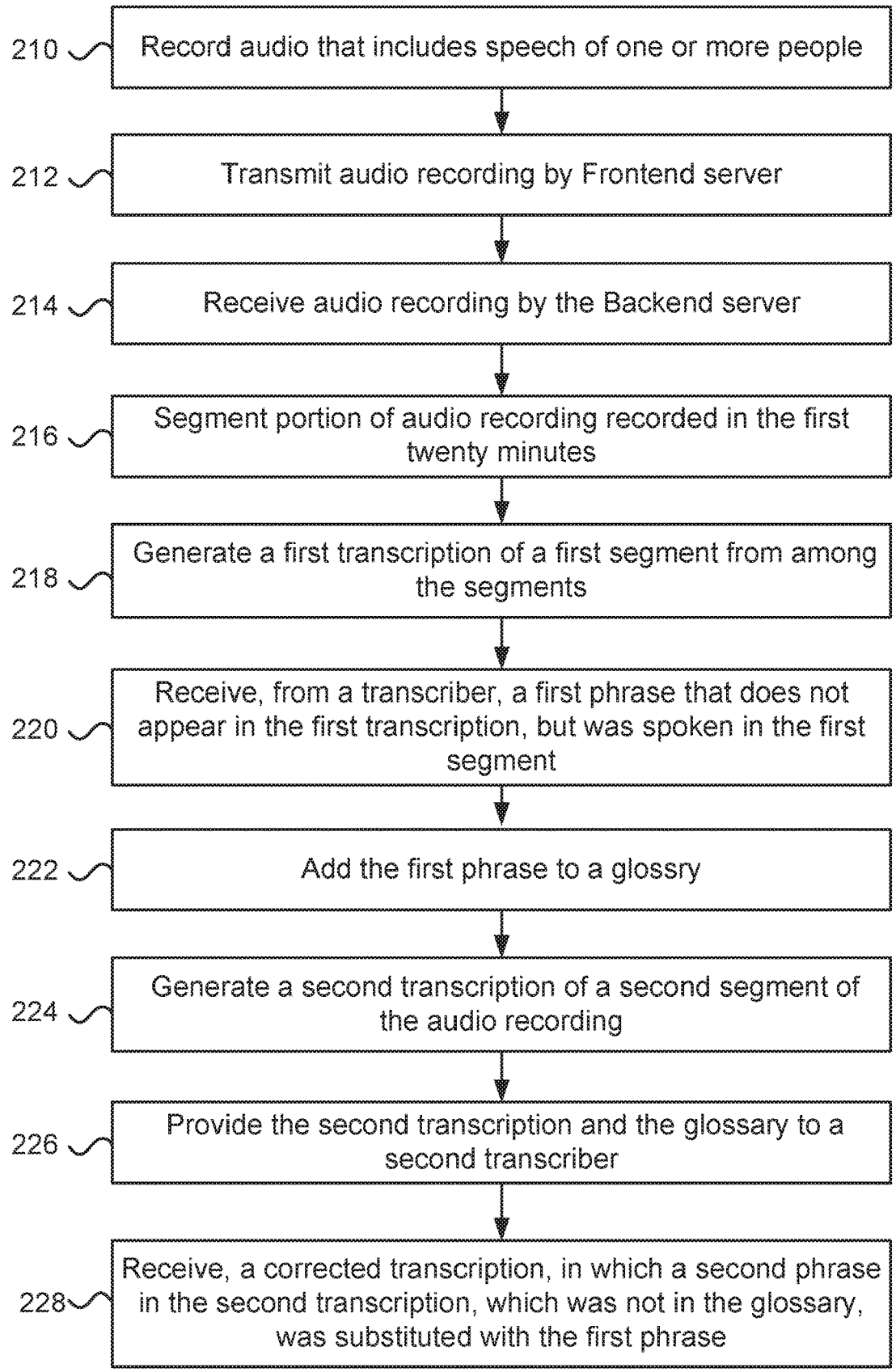
FIG. 9 illustrates steps involved in one embodiment of a method for curating and utilizing a glossary for rapid transcription of audio.

FIG. 9 illustrates steps involved in one embodiment of a method for curating and utilizing a glossary for rapid transcription of audio. The steps illustrated in FIG. 9 may be executed, in some embodiments, by systems modeled according to FIG. 8a and FIG. 8b, which are described above. In some embodiments, instructions for implementing the method may be stored on a computer-readable medium, which may optionally be a non-transitory computer-readable medium. In response to execution by a computer system including a processor and memory (e.g., the backend server 110 described above), the instructions cause the computer system to perform operations of the method.

In one embodiment, the method for curating and utilizing a glossary for rapid transcription of audio includes at least the following steps:

In Step 214, receiving an audio recording comprising speech of multiple people in a room over a period spanning at least two hours.

In Step 216, segmenting at least a portion of the audio recording, which was recorded during the first twenty minutes of the period, to segments.

In Step 218, generating, utilizing the ASR system 112, a first transcription of a first segment from among the segments.

In Step 220, receiving, from a first transcriber, a first phrase that does not appear in the first transcription, but was spoken in the first segment.

In Step 222, adding the first phrase to the glossary 200.

In Step 224, generating, utilizing the ASR system 112, a second transcription of a second segment of the audio recording.

In Step 226, providing the second transcription and the glossary 200 to a second transcriber.

And in Step 228, receiving a corrected transcription, in which the second transcriber substituted a second phrase in the second transcription, which was not in the glossary, with the first phrase.

The method described above may include, in some embodiments, optional Step 210, which involves recording the audio recording that includes speech of the one or more people in the room, e.g., utilizing one or more of the microphones 119-1 to 119-n. Additionally the method may optionally include step 212, which involves transmitting the audio recording, e.g., by the frontend server 120.

Selecting the first segment may be done in various ways. In one embodiment, the selection may be done utilizing a machine learning-based method. In this embodiment, the method of FIG. 9 may optionally include the following steps: generating transcriptions of the segments utilizing the ASR system 112; calculating, utilizing a certain model, values indicative of an expected contribution to formation of a glossary by transcription by a transcriber of each of the segments, and utilizing the values to select the first segment. Optionally, the value indicative of the expected contribution to formation of a glossary of transcription of the first segment is greater than the values of the expected contribution of most of the segments. Optionally, the certain model is generated based on data that includes transcriptions by the ASR system 112 of previous segments of audio and corrections to said transcriptions by transcribers. Optionally, the method may include the following steps: identifying, based on a transcription of the first segment, a topic of the first segment, and selecting the certain model, from among a plurality of models, based on the topic. Optionally, each model, from among the plurality of models, corresponds to a topic from among a plurality of topics, and each model is generated based on data that includes: (i) transcriptions by the ASR system 112 of previous segments of audio comprising speech related to the topic, and (ii) corrections to said transcriptions by transcribers.

In another embodiment, selection of the first segment is done utilizing the following steps: transcribing the segments utilizing the ASR system; identifying a certain utterance that is uttered in more than one of the segments, whose transcription has low confidence in corresponding transcriptions of the more than one of the segments; and selecting the first segment based on the first segment including the certain utterance.

Deciding which phrases to include in the glossary 200 may optionally be done using a machine learning-based approach. In one embodiment, the method of FIG. 9 may optionally include the following steps: generating feature values based on the first phrase and the first transcription, utilizing a model to calculate, based on the feature values, an importance score for the first phrase, and adding the first phrase to the glossary responsive to the importance score reaching a threshold. Optionally, at least one of the feature values is indicative of one or more of the following: a prevalence of the first phrase in the transcription of the first segment, and a ratio between (i) the prevalence of the first phrase in the transcription of the first segment, and a general prevalence of use of the first phrase. Optionally, the model is generated based on data that includes: previous transcriptions of other segments of audio and glossaries formed for use of transcribers who transcribed the other segments of audio.

Selecting the first transcriber may be done utilizing a machine learning-based approach. In one embodiment, the method of FIG. 9 may optionally include the following steps: (i) generating feature values based on at least one of: the first transcription and the first segment, (ii) utilizing a specific model to calculate, based on the feature values, suitability-values indicative of suitability of various transcribers to transcribe the first segment, and (iii) utilizing the suitability-values to select the first transcriber from among the various transcribers. Optionally, a suitability-value of the first transcriber is greater than suitability-values of most of the various transcribers.

Creating and using the glossary 200, as described herein, can assist to improve the quality of transcription of the audio recording, which can enable the transcription of the audio recording to be completed within a short while. In one embodiment, the method attains such fast turnaround of a transcription by performing the following prior to a target completion time that is less than eight hours after the end of the period: generating, utilizing the ASR system 112, transcriptions of additional segments of the audio recording; providing the additional segments and the glossary to multiple transcribers; receiving corrected transcriptions, generated by the multiple transcribers after they listened to the additional segments and consequently made changes to the additional transcriptions, where at least some of the changes involve substituting a phrase in a transcription with the first phrase; and generating a transcription of the speech of the multiple people during the period based on data comprising the additional corrected transcriptions.

The following embodiments describe a system configured to select operating parameters for automatic speech recognition (ASR) based on a ground truth transcription. The general principle implemented by embodiments described herein is to evaluate, early on, various possible operational parameters, by comparing accuracy of the various transcriptions of a certain segment of an audio recording with a "ground truth" transcription of the certain segment. The ground truth transcription is obtained by having a human transcriber transcribe the certain segment. Once an optimal set of operational parameters is selected, it may be applied to the transcription of additional segments of the audio recording. This can both increase the speed and accuracy of transcriptions of the additional segments by human transcribers in a hybrid transcription approach that involves human transcribers reviewing and correcting transcriptions generated by ASR systems.

Figure 10A:
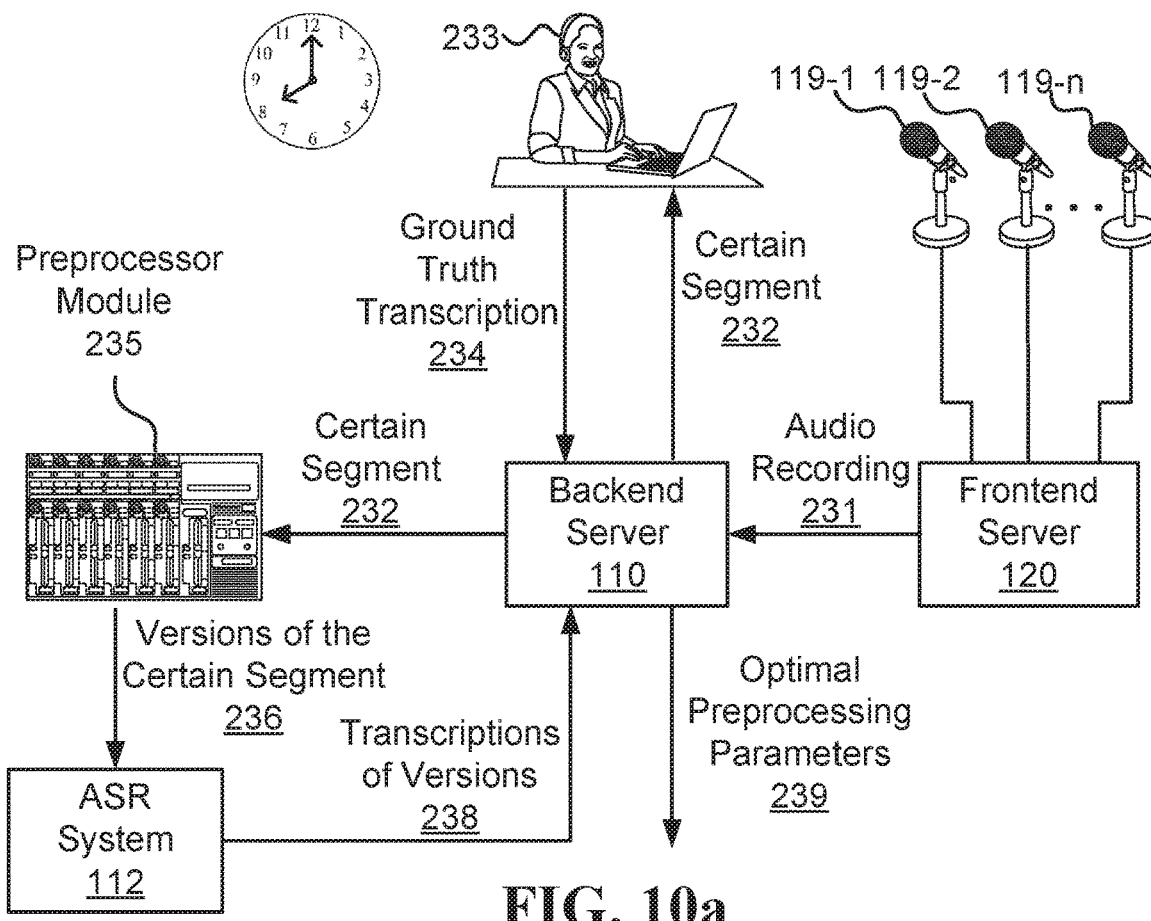
FIG. 10a illustrates an embodiment of a system that selects operational parameters that include certain audio preprocessing procedures.
Figure 10B:
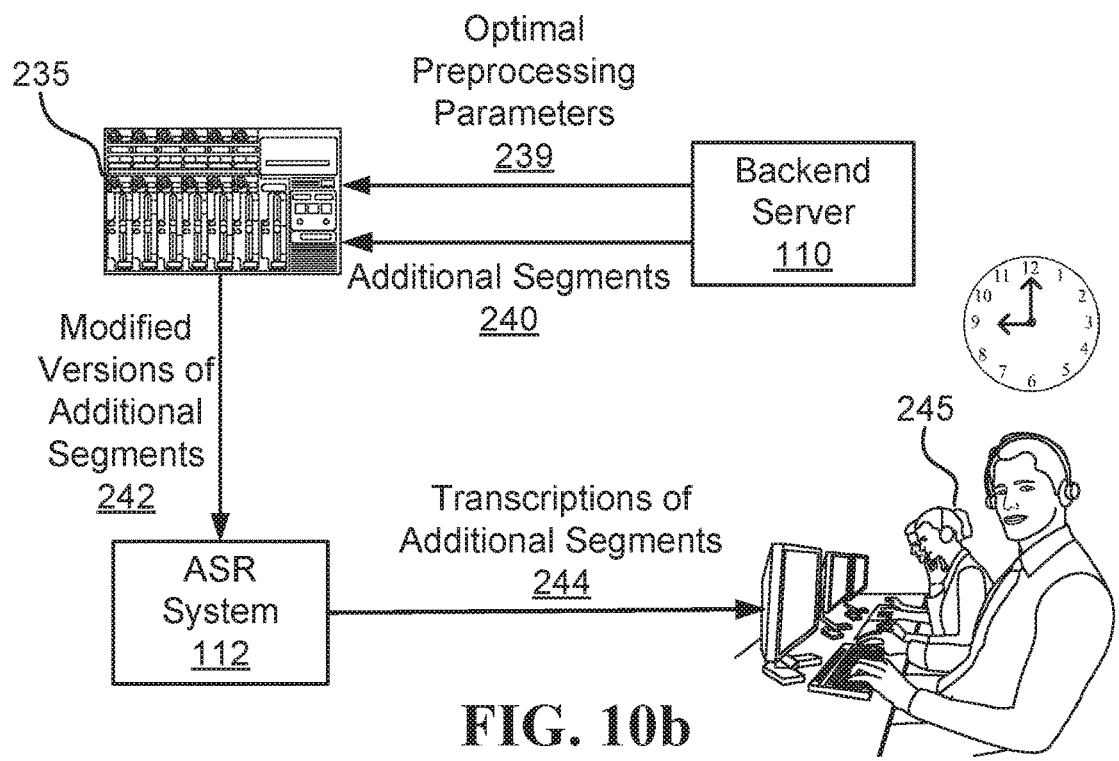
FIG. 10b illustrates utilization of optimal preprocessing parameters to generate transcriptions of the additional segments, which are provided to transcribers for review.
Figure 11A:
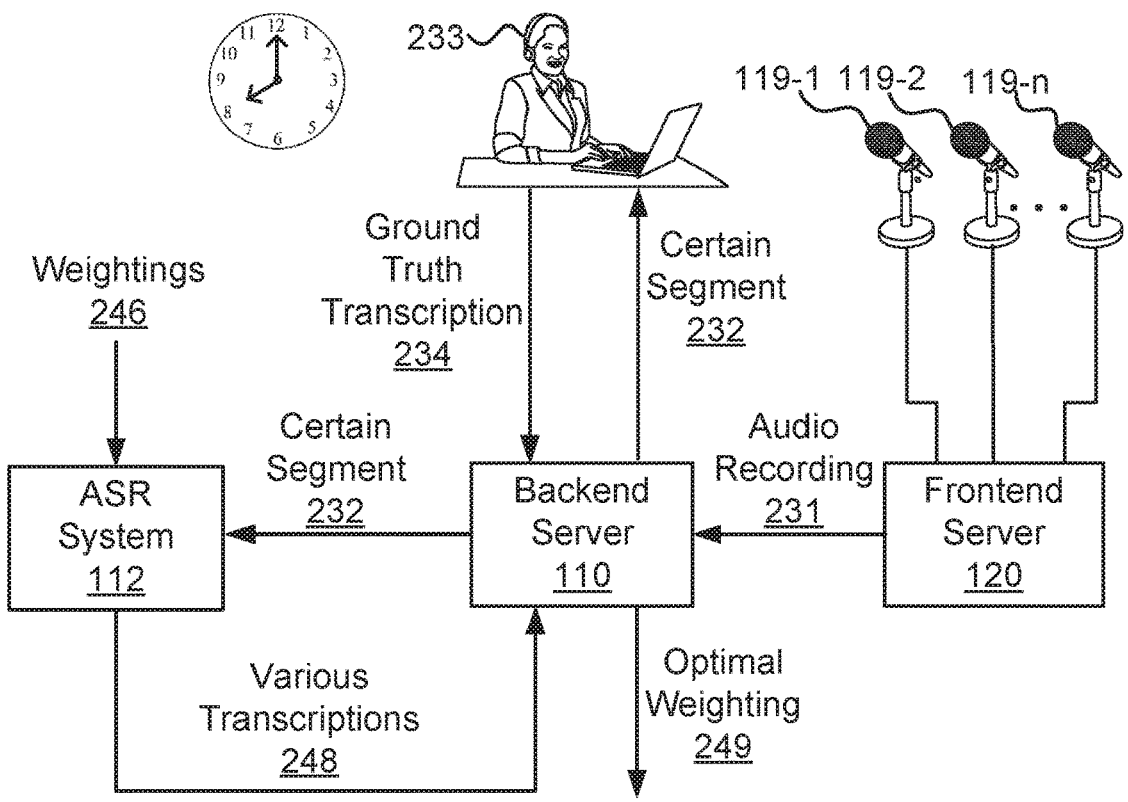
FIG. 11a illustrates an embodiment of a system that selects operational parameters that include weighting of models utilizes by the ASR system when transcribing the audio.
Figure 11B:
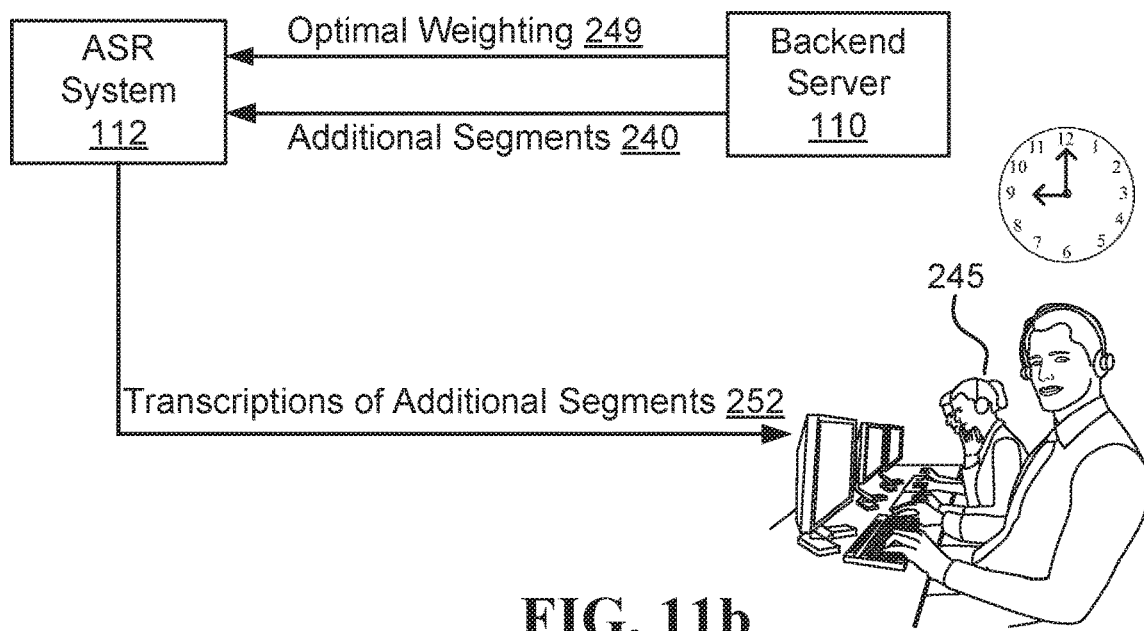
FIG. 11*b* illustrates the ASR system utilizing the optimal weighting to generate transcriptions of the additional segments, which are provided to the transcribers for review.

Various types of operational parameters may be selected using the aforementioned process. FIG. 10a illustrates an embodiment of a system that may be utilized to select operational parameters that include certain audio preprocessing procedures, which may involve selection of one or more of the following: using a certain digital signal processing (DSP) function, applying audio a certain audio filter, and applying a certain set of equalizer settings. FIG. 11a illustrates an embodiment of a system that may be utilized to select operational parameters that include a certain weighting of models utilizes by the ASR system when transcribing the audio. For example, the operational parameters may include a certain combination of weights for an acoustic model and a language model that are utilized by the ASR system. Once the operational parameters are selected, they may be applied to the transcription of additional segments of audio, as illustrated in FIG. 10b and FIG. 11b.

In one embodiment, the system configured to select operating parameters for ASR based on a ground truth transcription includes at least the frontend server 120 and the backend server 110. The system may optionally include other elements such as user interfaces and/or the one or more microphones 119-1 to 119-n. In one embodiment, the backend server 110 is configured to run one or more computer programs that cause it to perform operations described below (which may correspond to at least some of the steps of the method illustrated in FIG. 12).

The frontend server 120 is configured, in one embodiment, to transmit an audio recording 231 that includes speech of one or more people in a room. Optionally, the audio recording 231 is taken over a period spanning at least two hours. In one example, the audio recording 231 includes one or more channels of audio recorded using the one or more microphones 119-1 to 119-n (where n 1), which are in the room. Optionally, a deposition is being conducted in the room while the audio recording 231 is recorded. In one embodiment, the audio recording 231 includes two or more channels of audio. Optionally, the two or more channels are recorded utilizing respective two or more microphones, from among the microphones 119-1 to 119-n. Optionally, the two or more microphones are at least 40 cm away from each other.

In order to improve the quality and speed of a transcription of the audio recording 231, in some embodiments, the backend server 110 utilizes the following approach to select early on operational parameters that may be utilized later in the transcription of some, if not most, of the segments of the audio recording 231. To this end, in one embodiment, the backend server 110 performs the following within the first hour of the period (during which the audio recording 231 is taken).

The backend server 110 selects a certain segment 232 of the audio recording 231, which was recorded during the first twenty minutes of the period. The certain segment 232 is provided to a transcriber 233 who transcribes it to generate ground truth transcription 234. Optionally, transcribing the certain segment 232 involves the transcriber 233 listening to the certain segment 232 and correcting a transcription of the certain segment 232 that was generated by the ASR system 112.

The backend server 110 also evaluates a plurality of sets of operating parameters that are used to generate a plurality of respective transcriptions of the certain segment 232. Optionally, evaluating the plurality of sets of operating parameters involves operating the ASR system 112, which is tasked with transcribing the certain segment a plurality of times, each time using a different set of operating parameters from among a plurality of sets of operating parameters. Depending on the embodiment and type of operating parameters evaluated, this may be done in different ways.

In one embodiment, which is illustrated in FIG. 10a, the backend server 110, utilizes a preprocessor module 235 to generate a plurality of versions 236 of the certain segment 232. Optionally, each of the plurality of versions 236 is generated by providing the preprocessor module 235 with a set of operating parameters from among the plurality of sets of operating parameters. For example, each set may include one or more DSP functions that are applied to the certain segment 232, one or more filters (e.g., low-pass, high-pass, or band-pass filters) applied to the certain segment 232, and/or having the certain segment 232 modified using certain equalizer settings.

The ASR system 112 generates transcriptions 238 of the plurality of versions 236. The ASR system 112 may have different degrees of success when it generates the transcriptions 238. Some of the versions of the certain segment 232 may become clearer and easier for the algorithms used by the ASR system 12 to transcriber correctly. While other versions may have become less clear and more difficult for the ASR system 112 to transcribe correctly. Assessment of the accuracy of each of the transcriptions 238 may be performed by the backend server 110 by comparing each of the transcriptions 238 with the ground truth transcription 234. The backend server 110 can then select, based on the accuracies, optimal preprocessing parameters 239, and use them as part of the operational parameters for generating additional transcriptions of additional segment of the audio recording 231. Optionally, the optimal preprocessing parameters 239 are preprocessing parameters that were used to generate a certain transcription, from among the transcriptions 238, which had a highest accuracy with respect to the ground truth transcription 234.

In another embodiment, which is illustrated in FIG. 11a, the backend server 110 provides the certain segment 232 to the ASR system 112, which utilizes weightings 246 to weight different models it utilizes to generate transcriptions 248 of the certain segment 232. In one example, the weightings 246 are indicative of how much weight to give an acoustic model and how much weight to give a language model when selecting text to correspond to an utterance in certain segment 232. Assessment of the accuracy of each of the transcriptions 248 may be performed by the backend server 110 by comparing each of the transcriptions 248 with the ground truth transcription 234. The backend server 110 can then select, based on the accuracies, an optimal weighting 249, and use the optimal weighting 249 as part of the operational parameters for generating additional transcriptions of additional segment of the audio recording 231. Optionally, the optimal weighting 249 is a weighting of models that was used to generate a certain transcription, from among the transcriptions 248, which had a highest accuracy with respect to the ground truth transcription 234.

In yet another embodiment, in which the audio recording 231 includes two or more channels of audio obtained using two or more microphones from among the microphones 119-1 to 119-n, the sets of operational parameters may include weightings of the two or more channels of audio that may be used to mix the audio into a single channel that is transcribed by the ASR system 112.

The sets of operating parameters that are evaluated may be, in some embodiments, predetermined sets, such as there being a certain group of sets that are suitable for different acoustic characteristics, which are evaluated to determine which set is suitable for the case of the audio recording 231. In one example, the sets of operational parameters include sets of parameters that were previously found to provide a high accuracy when the ASR system 112 was used to generate transcriptions of previous segments of audio. In other embodiments, the sets of operating parameters may be randomly selected from a distribution of different operational parameters that may be used.

In some embodiments, selection of an optimal set of operational parameters to use to generate transcriptions of additional segments of the audio recording 231 is done in a single iteration. That is, the plurality of sets of operational parameters are evaluated, and then the optimal set of operational parameters is selected from among them, and used to generate transcriptions of the additional segments. In other embodiments, the selection of the optimal set of operational parameters may be an iterative process in which sets of operational parameters are refined and retested. For example, genetic algorithms may be used to improve operational parameters, over several iterations of the process described above, until an optimal set of operational parameters is finally selected.

In embodiments in which the audio recording 231 includes multiple channels of audio, different operational parameters may be used when generating transcriptions of segments that include audio from different channels. In one embodiment, in which the audio recording 231 includes two or more channels, the certain segment 232 may include a recording from a first channel of audio, from among the two or more channels, recorded by a first microphone from among two or more microphones (e.g., a microphone from among two or more of the microphones 119-1 to 119-$n$). In this embodiment, the backend server 110 may select, for a second channel of audio from among the two or more channels, a second set of operating parameters, which is different from optimal set of operating parameters, based on a second transcription of a second segment of the audio recording, which includes a recording from the second channel of audio.

The backend server 110 can use the optimal set of operational parameters to generate more accurate transcriptions of additional segments 240 of the audio recording 231. In one embodiment, the optimal set of operational parameters includes optimal preprocessing parameters 239. FIG. 10b illustrates how the preprocessor module 235 utilizes the optimal preprocessing parameters 239 to generate transcriptions 244 of the additional segments 240, which are provided to transcribers 245 for review. In one embodiment, the optimal set of operational parameters includes optimal weighting 249. FIG. 11b illustrates how the ASR system 112 utilizes the optimal weighting 249 to generate transcriptions 252 of the additional segments 240, which are provided to the transcribers 245 for review. Since the optimal set of operational parameters were selected such that they are expected to improve the quality of transcriptions of the audio recording 231 generated by the ASR system 112 the transcriptions 244 and transcriptions 252 are likely be more accurate than transcriptions generated by the ASR system 112 utilizing operational parameters that are not optimal for the audio recording 231. The more accurate transcriptions that are generated by the ASR system 112 using the optimal set of operational parameters can contribute to a reduction in the cost and/or the turnaround time of hybrid transcription of the audio recording 231, since the transcribers 245 are likely to encounter fewer errors in the transcriptions that they will need to correct.

Selection of the certain segment 232, from among segments of the audio recording 231 recorded early during the period, may be done in different ways. In one embodiment, the backend server 110 selects the certain segment 232 from among a plurality of segments of the audio recording 231 based on analysis of vocabularies extracted from transcriptions of the segments. Optionally, the transcriptions were generated by the ASR system 112 using default operational settings. Optionally, a vocabulary extracted from a transcription includes a list of words that appeared in the transcription. In one embodiment, the certain segment 232 is selected based on the diversity of words its transcription possessed. For example, a diversity of words that are not stop words is greater in a transcription of the certain segment 232 compared to a diversity of words that are not top words in transcriptions of most of the plurality of segments. In another embodiment, the certain segment 232 is selected based the number of words it contains from a specific set of important words related to the subject of the audio. For example, a number of words that belong to a precompiled list of keywords is greater in a transcription of the certain segment compared to numbers of words that belong to the precompiled list of keywords in transcriptions of most of the plurality of segments. In this example, the precompiled list of keywords may be derived from supporting files related to the audio (e.g., supporting documents received prior to a deposition).

Using the optimal set of operational parameters may contribute to the ASR system 112 generating more accurate transcriptions. This in turn, can help reduce the turnaround time for completing a hybrid transcription of large audio files. In one embodiment, the backend server 110 completes a transcription of the audio recording 231 prior to a target completion time that is less than eight hours after the end of the period during which the audio recording 231 is taken. In this embodiment, the backend server 110 receives additional transcriptions of additional segments of the audio recording 231. These additional transcriptions are generated by transcribers after they listened to the additional segments. The backend server 110 then generates a transcription of the audio recording 231, which includes the speech of the one or more people in the room, during the period, based on data that includes the additional transcriptions of the additional segments of the audio.

Figure 12:
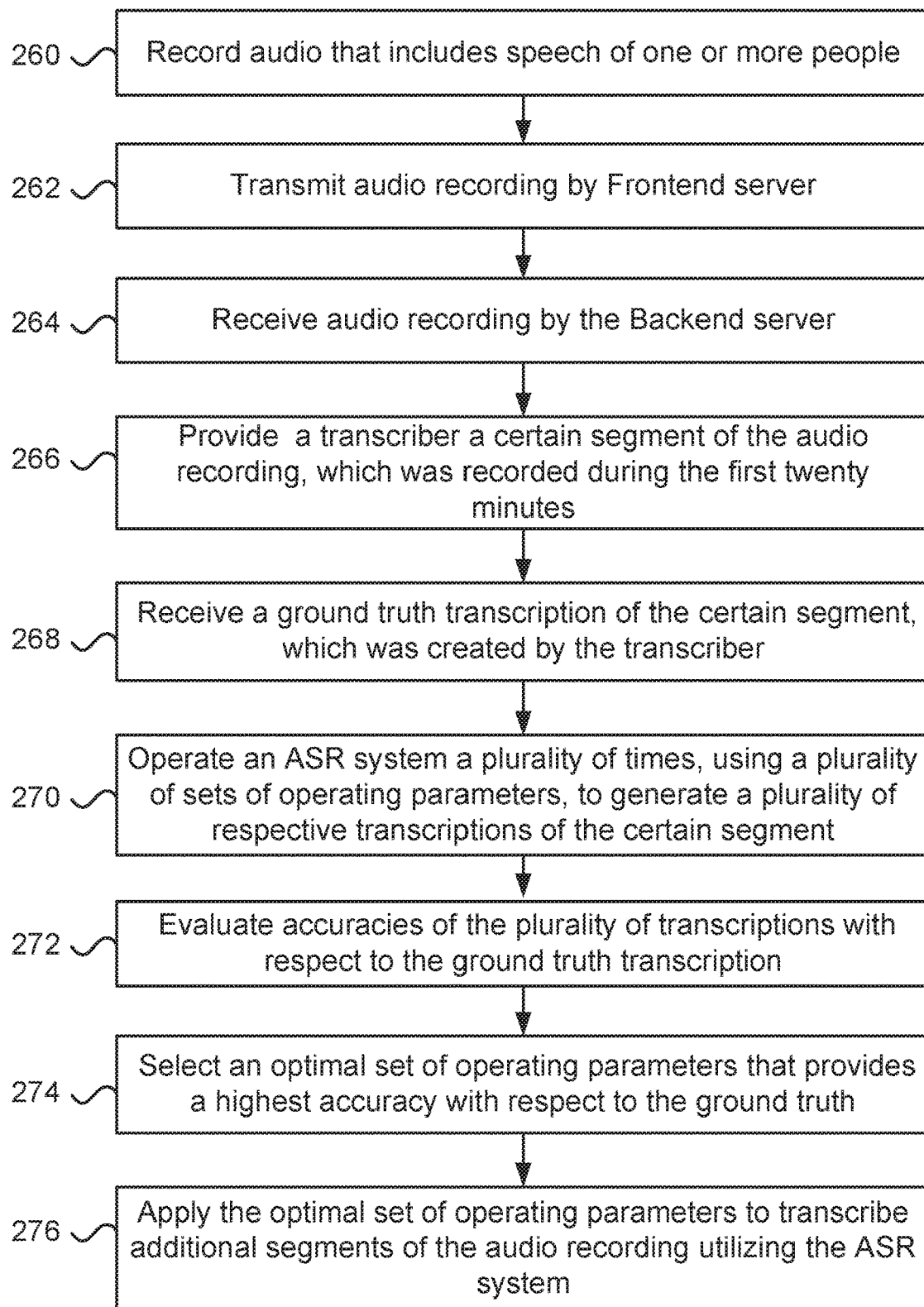
FIG. 12 illustrates steps involved in one embodiment of a method for selecting operating parameters for ASR based on a ground truth transcription.

FIG. 12 illustrates steps involved in one embodiment of a method for selecting operating parameters for ASR based on a ground truth transcription. The steps illustrated in FIG. 12 may be executed, in some embodiments, by systems modeled according to FIG. 10a and FIG. 10b or FIG. 11a and FIG. 11b, which are described above. In some embodiments, instructions for implementing the method may be stored on a computer-readable medium, which may optionally be a non-transitory computer-readable medium. In response to execution by a computer system including a processor and memory (e.g., the backend server 110 described above), the instructions cause the computer system to perform operations of the method.

In one embodiment, the method for curating and utilizing a glossary for rapid transcription of audio includes at least the following steps:

In Step 264, receiving an audio recording that includes speech of multiple people in a room over a period spanning at least two hours.

In Step 266, providing a transcriber a certain segment of the audio recording, which was recorded during the first twenty minutes of the period.

In Step 268, receiving a ground truth transcription of the certain segment, which was created by the transcriber after listening to the certain segment.

In Step 270, operating the ASR system 112 a plurality of times, using a plurality of sets of operating parameters, to generate a plurality of respective transcriptions of the certain segment.

In Step 272, evaluating accuracies of the plurality of transcriptions with respect to the ground truth transcription.

In Step 274, selecting an optimal set of operating parameters evaluated to provide a highest accuracy with respect to the ground truth transcription. In one example, the optimal set of operating parameters include a certain combination of weights for an acoustic model and a language model that are utilized by the ASR system 112.

And in Step 276, applying the optimal set of operating parameters to transcribe additional segments of the audio recording utilizing the ASR system 112. Optionally, applying the optimal set of operating parameters to the ASR system 112 when used to transcribe a segment of audio involves the ASR system 112 using one or more of the following preprocessing procedures: using a certain digital signal processing (DSP) function, applying a certain audio filter, and applying a certain set of equalizer settings.

The method described above may include, in some embodiments, optional Step 260, which involves recording the audio recording that includes speech of the one or more people in the room, e.g., utilizing one or more of the microphones 119-1 to 119-$n$. Additionally the method may optionally include step 262, which involves transmitting the audio recording, e.g., by the frontend server 120.

In one embodiment, the audio recording includes two or more channels of audio, and taken by two or more microphones, at least 40 cm away from each other, which are configured to record the two or more channels, respectively. Optionally, the optimal set of operating parameters comprises a certain weighting of two or more channels of audio (when the audio recording includes two or more channels of audio). Optionally, the certain segment includes a recording from a first channel of audio, from among the two or more channels, recorded by a first microphone from among the two or more microphones, and the method optionally includes the following steps: selecting, for a second channel of audio from among the two or more channels, a second set of operating parameters, which is different from the optimal set of operating parameters, based on a second transcription of a second segment of the audio recording, which includes a recording from the second channel of audio.

In one embodiment, the method of FIG. 12 optionally includes a step of selecting the certain segment from among a plurality of segments based on analysis of vocabularies extracted from transcriptions of the segments. Optionally, a number of words that belong to a precompiled list of keywords is greater in a transcription of the certain segment compared to numbers of words that belong to the precompiled list of keywords in transcriptions of most of the plurality of segments.

Selecting optimal operating parameters, as described herein, can assist to improve the quality of transcription of the audio recording, which can enable the transcription of the audio recording to be completed within a short while. In one embodiment, the method attains such fast turnaround of a transcription by performing the following prior to a target completion time that is less than eight hours after the end of the period: receiving additional transcriptions, generated by transcribers after they listened to the additional segments; and generating a transcription of the speech of the multiple people during the period based on the additional transcriptions.

When working on time-critical fast-turnaround transcription jobs, such as same-day transcription of multi-hour legal depositions, it is important to start working on the transcription as soon as the audio is being recorded. Besides helping to shorten the time until delivery of the audio's transcription, working on transcribing the audio while the audio is being generated has another advantage—it makes it possible to interact with the people who are speaking and clarify certain challenging aspects of the transcription, whose resolution would otherwise be very difficult or require much effort and/or time. For example, a rare foreign name or technical term spoken in a deposition may be extremely difficult to transcribe correctly, even if the audio is clear. In another example, if the audio is unclear because the speaker spoke away from the microphone, coughed, mumbled, etc., it can be extremely difficult, if not downright impossible, for a transcriber to resolve what was said. In these cases, it can be much easier (and more accurate) to simply ask one of the speakers or a person who was present where the audio was generated (e.g., a court reporter at a deposition) what was said, how to spell a certain term, etc. Answers to these questions can result in faster and more accurate transcriptions compared to leaving the transcribers to fend for themselves.

Figure 13:
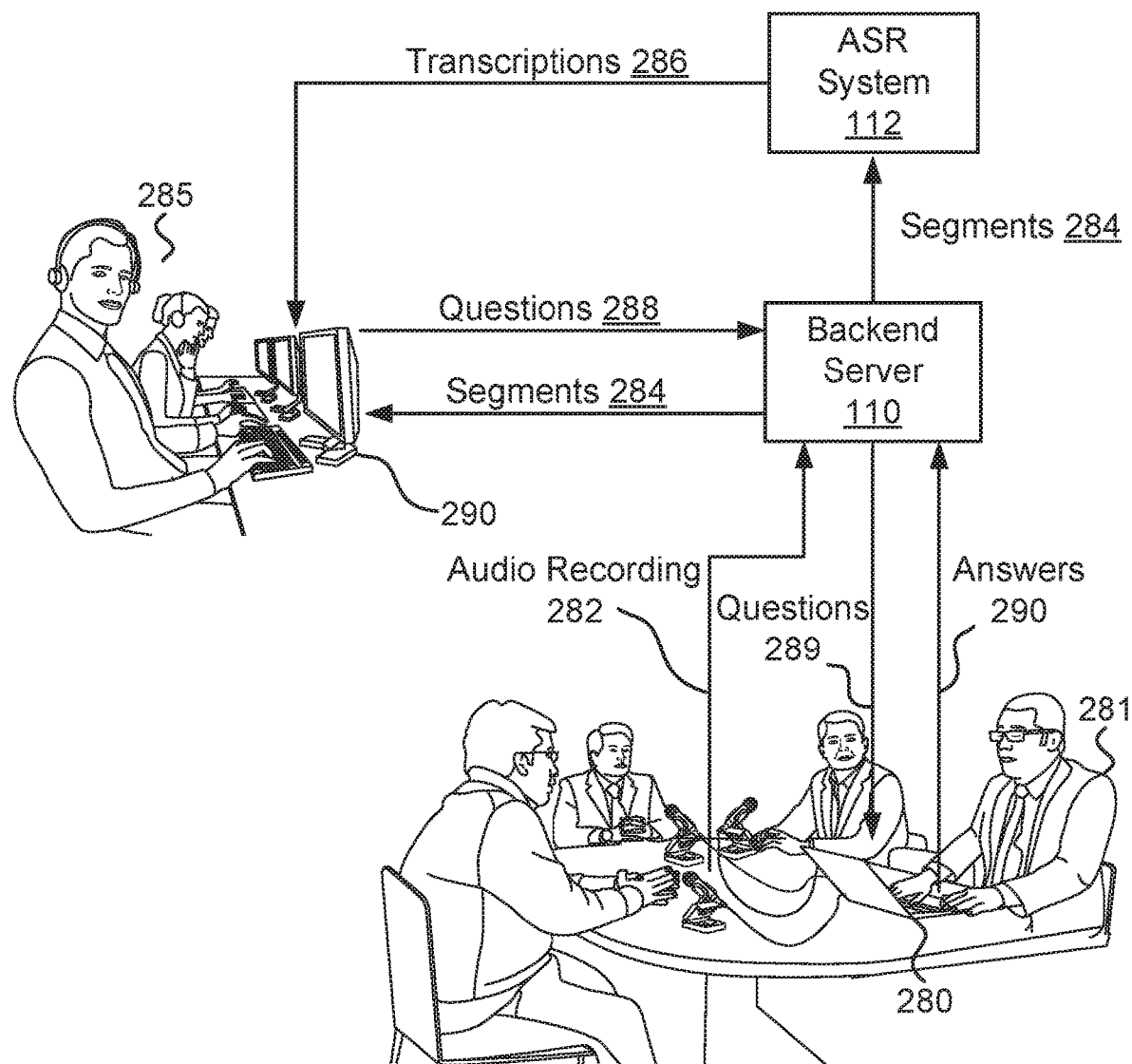
FIG. 13 illustrates one embodiment of a system configured to facilitate rapid resolution of transcription-related inquiries.

FIG. 13 illustrates one embodiment of a system configured to facilitate rapid resolution of transcription-related inquiries. The system includes at least a frontend server 280 and a backend server 110. In one embodiment, the backend server 110 is configured to run one or more computer programs that cause it to perform operations described below (which may correspond to at least some of the steps of the method illustrated in FIG. 14).

The frontend server 280 is configured, in one embodiment, to transmit an audio recording 282 that includes speech of one or more people in a room. Optionally, the audio recording is taken over a period spanning at least two hours. Optionally, the audio recording 282 includes one or more channels of audio recorded using the one or more of microphones 119-1 to 119-$n$ (where n≥1), which are in the room. Optionally, a deposition is being conducted in the room while the audio recording 282 is being recorded. In one embodiment, the audio recording 282 includes two or more channels of audio. Optionally, the two or more channels are recorded utilizing respective two or more microphones, from among the microphones 119-1 to 119-$n$. Optionally, the two or more microphones are at least 40 cm away from each other.

In some embodiments, the frontend server 280 may be operated, at least in part, by a frontend operator 281. Optionally, the frontend server 280 includes a user interface, which may include for example, a screen, keyboard and/or mouse, which may present information to the frontend operator and/or to other people in the room. In the case in which the audio recording 282 is of a deposition, which is being held in the room, the frontend operator 281 may be a court reporter tasked with organizing the recording of the proceedings being held.

In order to improve the quality and speed of a transcription of the audio recording 282, in some embodiments, the backend server 110 provides a mechanism in which transcribers may quickly ask people in the room questions about what was said, and receive answers that can help resolve challenging aspects of the transcription, such as spelling of difficult names or terms, or resolving unclear utterances.

In one embodiment, the backend server 110 receives the audio recording 282 and segments it into segments 284. ASR system 112 is utilized to generate transcriptions 286 of the segments 284, which are provided to one or more transcribers 285. The transcribers 285 listen to the segments 284 in order to review transcriptions 286 of the segments 284, which are generated utilizing the ASR system 112. While the one or more transcribers 285 review the transcriptions 286, various issues requiring clarification may arise.

In some embodiments, an issue that may require clarification can relate to determining a correct spelling of a certain name or term uttered in a segment of audio. For example, a transcription of the segment of audio may include a certain name and/or term, which the ASR system 112 transcribed, however upon reviewing it, it seems incorrect to a transcriber; though the transcriber might not know the exact spelling of the correct name and/or term that were actually uttered. In this example, it may be beneficial to ask someone in the room (e.g., one of the people speaking) what the exact name and/or term are, and even request to provide the exact spelling.

In some embodiments, an issue that may require clarification can relate to an utterance in a segment of audio that was not recorded clearly or the person who uttered it did not speak clearly (e.g., the person whispered, mumbled, or coughed). For example, the segment of audio may include a certain utterance that is unclear, and might have even been marked by the ASR system 112 as being unintelligible, or have a low confidence transcription. In this case, a transcriber reviewing the transcription of the segment may also have difficulty resolving what had been said. In this example, it can be beneficial to ask someone who was in the room, and even the person who uttered the utterance, what was said.

Due to the nature of hybrid transcription and fast turnaround involved in this process, the one or more transcribers 285 may start working on the transcription of the audio recording 282 very close to when it is being recorded. Thus, within minutes, or even less, from the time words are spoken in the room (e.g., where a deposition is being taken), a transcriber from among the one or more transcribers 285 may already be reviewing a transcription of a segment of the audio recording 282 and have questions 288 that require clarification. Thus, a question about the audio recording 282 regarding an utterance uttered in the room a certain time may arise, within less than ten minutes after the certain time, within less than thirty minutes after the certain time, or within some other short period after the certain time.

One advantage of starting to work on a transcription early on, even only minutes after the audio starts being recorded, is that if questions arise about certain issues, it may be possible to contact people in the front end, such as the frontend operator 281 (who may be a court reporter in the case of a deposition) and/or one of the speakers in the room in order to seek clarification. Due to the short time that has passed since the relevant words were spoken, it is likely that people who spoke are still in the room and therefore it may be easy to contact them to seek assistance.

The one or more transcribers 285 may submit the questions 288 they have regarding issues that require clarification to the backend server 110, e.g., via user interfaces used to review the transcriptions 286. Optionally, at least some of the questions 288 may include an indication of a party in the room to whom they are addressed. Optionally, at least some of the questions 288 may include an indication of a subject that they concern. The backend server 110, which receives the questions 288 from the one or more transcribers 285 regarding the transcriptions 286 may deal with them in different ways.

In some embodiments, the backend server 110 may transmit the questions 288 to the frontend server 280, essentially as they are received and/or in the order that they are received. Optionally, the questions 288 are transmitted to the frontend operator 281. For example, the questions 288 may appear on a screen used by the frontend operator 281.

In other embodiments, the backend server 110 may organize, prioritize, and/or filter the questions 288 before transmitting them to the frontend server 280. Thus, the backend server 110 may transmit questions 289 to the frontend server 280, which may be a subset of the questions 288 and/or an edited version of the questions 288. Optionally, this is done to shorten and/or optimize the process of addressing the questions at the frontend side.

In yet other embodiments, the backend server 110 may filter the questions 288. For example, the backend server 110 may evaluate the questions 288 using semantic analysis and/or natural language understanding (NLU), and select from among the questions 288, a subset (the questions 289), such that the questions 289 do not include duplicate questions nor do the questions 289 include questions that have been already resolved.

In still other embodiments, the backend server 110 may utilize a model to order the questions 288 according to an order of importance. Optionally, the order of importance may be different from a chronological order of at which the questions 288 were received. Optionally, the backend server 110 generates feature values based on the questions 288. Optionally, for each question related to an utterance, from among the questions 288, the backend server 110 generates feature values indicative of one or more of the following: an identity and/or role of the person who uttered the utterance, a semantic role of the utterance, the number of times the utterance was repeated and/or referred to, a priority indicated by a transcriber for resolving the utterance, and a confidence level at which the utterance was transcribed by the ASR system 112. To generate the feature values, the backend server 110 may utilize semantic analysis and/or NLU, as well as analyze a transcription in which the utterance was made. For each question, of the questions 288, the backend server 110 may utilize the model to calculate, based on the feature values generated for the question, a merit value indicative of the importance and/or contribution of the question.

The calculated merit values may be utilized in different ways. In one embodiment, the merit values are used to order the questions 288, such that the questions 289 transmitted to the frontend server 280 are essentially the questions 288, but provided in a different order than the one in which the questions 288 were received by the backend server 110. In another embodiment, the backend server 110 may limit the number of questions it transmits to a certain number and/or to a certain level of merit. In one example, the backend server 110 may utilize the merit values to select for the questions 289 questions from among the questions 288 that have the highest merit values. In another example, the backend server may select for the questions 289, questions from among the questions 288 whose merit value reaches a certain threshold.

The model used to calculate the merit values may be generated based on observing how previously asked questions (e.g., raised when transcribing previous audio recordings) contributed to resolution of transcription-related issues that existed when transcribing the previous audio recordings. For example, a merit value assigned to a previously asked question may be indicative of whether an answer to that question led to a correction being made to a transcription and/or the number of corrections made to transcriptions that used a term provided in the answer. In one embodiment, training data used to train the model includes samples, with each sample corresponding to a previously asked question.

Each sample includes feature values (e.g., of the type described above), and a label the merit value assigned to the previously asked question.

The frontend server 280, receives the questions 289, and if it obtains one or more answers 290, which are relevant to at least some of the questions 289, it may transmit the one or more answers 290. This process may be done in various ways in different embodiments.

In one embodiment, the questions 289 appear on a user interface in the room, which presents at least some of the questions 289 to at least one of: the frontend operator 281, and one or more of the multiple people in the room. Optionally, at least some of the presented questions may have an indication of their importance and/or party to whom they are addressed. Optionally, the questions are presented as they are received by the frontend server 280.

In another embodiment, the questions 289 are provided to the frontend operator 281 (e.g., a court reporter in the case of a deposition) who decides how to proceed to ask the questions 289. For example, the frontend operator 281 may decide which of the questions 289 to ask, in what order to ask the questions 289, when to ask the questions 289, and/or whom to ask the questions 289. Optionally, the frontend operator 281 may answer at least some of the questions 289, and ask questions from among the questions 289 for which the answer is not known to him or her.

In some embodiments, the backend server 110 may identify, based on the audio recording 282, an opportune moment to present the questions 289 and/or prompt the frontend operator 281 to ask the questions 289 at that time. For example, if a deposition is being held in the room in which the audio recording 282 is being recorded, the backend server 110 may identify, e.g., using the ASR system 112, a time at which the deposition went off the record, and present the at least some of the questions 289 at that time.

The one or more answers 290 to at least some of the questions 289 are transmitted by the frontend server 280 to the backend server 110, and may take various forms. In some embodiments, the one or more answers 290 may be provided, at least in part, in the form of text, such as answers entered via a computer by the frontend operator 281 and/or some other person in the room. Optionally, the text is provided to the one or more transcribers 285. In other embodiments, the one or more answers 290 may be provided, at least in part, in the form of audio that is transmitted to the backend server 110.

The one or more answers 290 transmitted to the backend server 110 may be used in various ways. In some embodiments, the one or more answers 290 are provided to the one or more transcribers 285. Optionally, transcriptions of the one or more answers 290 may be generated utilizing the ASR system 112 when the one or more answers 290 are provided in the form of audio, and the transcriptions may be provided to the one or more transcribers 285.

In some embodiments, the one or more answers 290 may be utilizes by the backend server 110 to update one or more models utilized by the ASR system 112 to generate transcriptions of the audio recording 282. In one example, an answer from among the one or more answers 290 may include a phrase (e.g., a name or term) which was not in a language model used by the ASR system 112. Thus, this phrase may be added to the language model so it can be more easily transcribed in the future. In another example, an answer from among the one or more answers 290 may clarify what was said in a recorded utterance, which can serve as an example of a pronunciation of a phrase, which can be used to update a phonetic model so the phrase may be identified more accurately in the future. Optionally, following the updating of the one or more models, the backend server 110 may utilize the ASR system 112 to perform an additional pass, and generate transcriptions of at least some of the segments 284 utilizing the updated one or more models.

In some embodiments, the one or more answers 290 are transcribed by the backend server 110 (e.g., using the ASR system 112). The transcription of the answers may be used in different ways. In one embodiment, the backend server 110 utilizes NLU to determine to which of the questions 289 an answer, from among the one or more answers 290, corresponds, and forwards the answer to a transcriber who asked a question to which the answer corresponds. In another embodiment, the backend server 110 utilizes NLU to determine from an answer, from among the one or more answers 290, a correct spelling of a certain phrase. The backend server 110 may then detect in the transcriptions 286 locations in which the certain phrase was spelled incorrectly. Optionally, the backend server 110 may automatically correct the misspelling of the certain phrase at the locations. Alternatively, the backend server 110 may indicate to a transcriber locations of incorrect spelling of the certain phrase and suggest to replace occurrences of the incorrect spelling with the correct spelling of the certain phrase.

Figure 14:
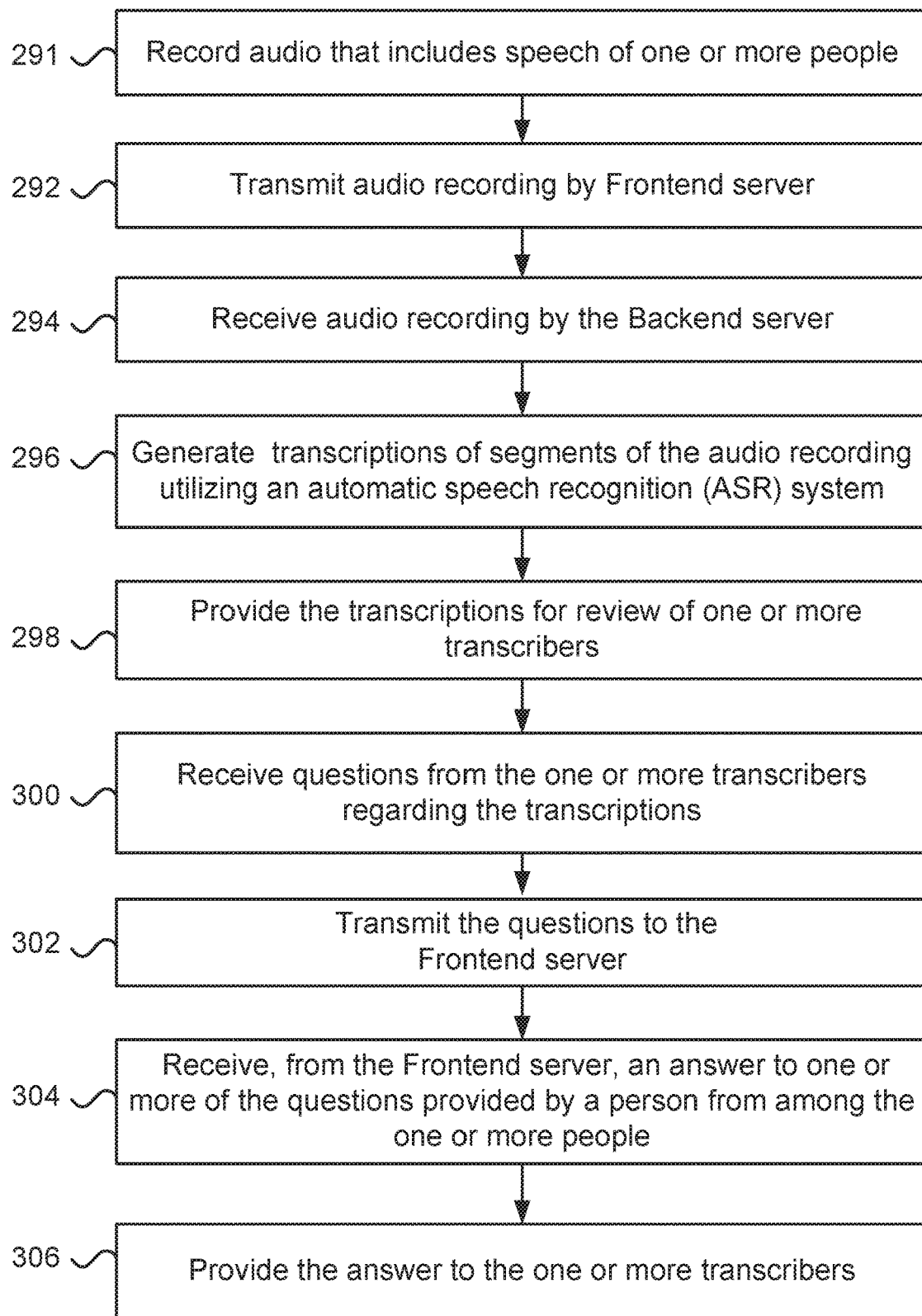
FIG. 14 illustrates steps involved in one embodiment of a method for rapid resolution of transcription-related inquiries.

FIG. 14 illustrates steps involved in one embodiment of a method for rapid resolution of transcription-related inquiries. The steps illustrated in FIG. 14 may be executed, in some embodiments, by a system modeled according to FIG. 13, as described above. In some embodiments, instructions for implementing the method may be stored on a computer-readable medium, which may optionally be a non-transitory computer-readable medium. In response to execution by a computer system including a processor and memory (e.g., the backend server 110 described above), the instructions cause the computer system to perform operations of the method.

In one embodiment, the method for rapid resolution of transcription-related inquiries includes at least the following steps:

In Step 294, receiving an audio recording that includes speech of multiple people in a room.

In Step 296, generating transcriptions of segments of the audio recording utilizing the ASR system 112.

In Step 298, providing the transcriptions for review of one or more transcribers.

In Step 300, receiving questions from the one or more transcribers regarding the transcriptions.

In Step 302, transmitting the questions to the frontend server.

And in Step 304, receiving, from the frontend server, an answer to one or more of the questions provided by a person from among the one or more people in the room. Optionally, this step involves presenting, on a user interface in the room, at least some of the questions to at least one of: a frontend operator, the one or more of the multiple people.

In one embodiment the method includes optional Step 306, which involves forwarding the answer to a transcriber from among the one or more transcribers.

The method described above may include, in some embodiments, optional Step 291, which involves recording the audio recording that includes speech of the one or more people, e.g., utilizing one or more of the microphones 119-1 to 119-n. Additionally the method may optionally include step 292, which involves transmitting the audio recording, e.g., by the frontend server 280.

In one embodiment, the method of FIG. 14 includes optional steps of utilizing a model to order the questions according to an order of importance, and presenting the questions in the order of importance. Optionally, the order of importance is different from a chronological order at which the questions were received. Optionally, the model is generated based on data that includes previously asked questions and indications of the number of transcription-related terms resolved due to receiving answers to the questions.

In one embodiment, a deposition is being held in the room in which the audio recording is taken. Optionally, in this embodiment, the method includes as step of identifying, based on the audio recording, a time at which the deposition went off the record, and presenting the at least some of the questions at that time.

In one embodiment, generating the transcriptions utilizing the ASR system 112 involves utilization of a model. Optionally, in this embodiment, the method includes an optional step of updating the model based on the answer, and updating the transcriptions of the segments based on an additional pass performed by the ASR system 112 on the segments utilizing the updated model.

In one embodiment, the method of FIG. 14 optionally includes the following steps: receiving a plurality of questions from the one or more transcribers, evaluating the plurality of questions, and selecting the questions such that said questions do not include duplicate questions nor do said questions include questions that have been already resolved.

The answer to one or more of the questions that is transmitted by the frontend server may include a segment of audio, in one embodiment. Optionally, if this is the case, the method may include an optional step of utilizing the ASR system 112 to generate a transcription of the answer. Optionally, the method includes step that involve: utilizing natural language understanding (NLU) to determine to which of the one or more of the questions the answer corresponds, and forwarding the answer to a transcriber who asked a question to which the answer corresponds. Additionally or alternatively, the method may include the following steps: utilizing NLU to determine from the answer a correct spelling of a certain phrase, detecting in the transcriptions locations in which the certain phrase was spelled incorrectly, indicating the locations to a transcriber, and suggesting to replace occurrences in which the certain phrase was spelled incorrectly with the correct spelling of the certain phrase.

Figure 15:
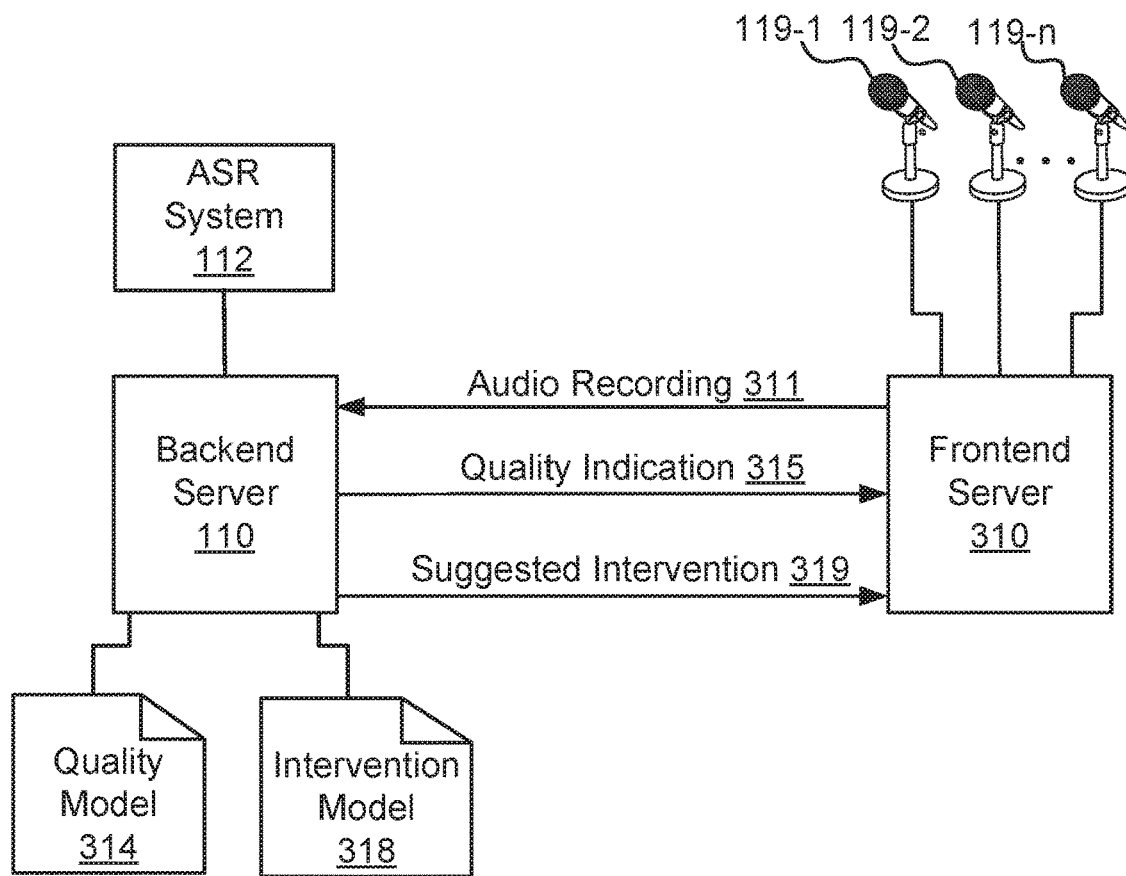
FIG. 15 illustrates an embodiment of a system configured to detect low-quality audio use in hybrid transcription.

FIG. 15 illustrates an embodiment of a system configured to detect low-quality audio use in hybrid transcription. In one embodiment, the system includes at least a frontend server 310 and the backend server 110. The system may optionally include other elements, such as user interfaces and/or the one or more microphones 119-1 to 119-n. In one embodiment, the backend server 110 is configured to run one or more computer programs that cause it to perform operations described below (which may correspond to at least some of the steps of the method illustrated in FIG. 17).

The frontend server 310 is configured, in one embodiment, to transmit an audio recording 311 that includes speech of one or more people. Optionally, the one or more people are in a room. Optionally, the audio recording 311 is taken over a period spanning at least two hours. In one example, the audio recording 311 includes one or more channels of audio recorded using the one or more of microphones 119-1 to 119-n (where n 1), which are in the room. Optionally, a deposition is being conducted in the room while the audio recording 311 is recorded. In one embodiment, the audio recording 311 includes two or more channels of audio. Optionally, the two or more channels are recorded utilizing respective two or more microphones, from among the microphones 119-1 to 119-n. Optionally, the two or more microphones are at least 40 cm away from each other.

In order to improve the quality and speed of a transcription of the audio recording 311, in some embodiments, the backend server 110 detects when the audio recording 311 has a low quality and alerts about it so steps may be taken to address this issue, while the audio recording 311 is still being generated, which can help improve the quality of the rest of the audio recording 311.

In one embodiment, detection of the quality of the audio recording 311 by the backend server 110 is done as follows. The backend server 110 generates feature values based on a segment 313 of the audio recording 311, and utilizes a quality model 314 to calculate, based on the feature values, a quality indication 315, which is a value indicative of expected hybrid transcription quality of the segment 313. Optionally, the quality indication 315, and/or a value calculated based on the quality indication 315, are transmitted to the frontend server 310. The segment 313 may have varying lengths in different embodiments. In one embodiment, the segment 313 may be less than a second long, while in another embodiment the segment 313 may have a certain length that is between one second long and one minute long. In other embodiments, the segment 313 is less than five minutes long.

There are various types of feature values that may be generated based on the segment 313. In one example, one or more of the feature values are indicative of a signal-to-noise ratio of the audio in the segment 313. These feature values may be generated based on acoustic features of the segment 313. In another example, at least one of the feature values is generated by utilizing NLU to calculate a value indicative of intelligibility of a transcription of the segment 313 generated utilizing the ASR system 112. In yet another example, a feature value is generated based on an analysis of a lattice constructed by the ASR system 112 that processed the segment 313. For example, the feature value may be indicative of the maximal probability of a path in the lattice and/or the level of confidence in the transcription corresponding to the most probable path in the lattice.

The quality indication 315 may be indicative of how the quality of the audio may impact hybrid transcription of the audio recording 311, in which transcribers review transcriptions generate by the ASR system 112 of segments of the audio recording 311, in order to correct errors made by the ASR system 112. To obtain a value that reflects this property, in some embodiments, the quality model 314 is generated based on training data that includes results from previous hybrid transcriptions. This data includes samples that include feature values generated based on previously recorded segments of audio (the same type of feature values described above), and labels that are values of transcription-quality metrics generated based on transcriptions of the previously recorded segments. Optionally, the transcription-quality metrics may reflect effort of human transcribers that reviewed transcriptions of the previously recorded segments that were generated by the ASR system 112. For example, the transcription-quality metrics may correspond to the number of errors the human transcribers needed to correct per minute of audio, an average number of times the human transcribers listened to each previously recorded segment, and/or the amount of time spent processing each previously recorded segment (e.g., the ratio between the length of a segment and the time spent reviewing it).

Evaluation of the quality of the audio recording 311 may be done periodically, for example, calculation of the quality indication 315 may be performed every second, every few second, or every minute, in order to quickly detect when the quality deteriorates in order to enable a timely intervention. Optionally, each calculation of the quality indication 315 that is performed at a certain time, is performed utilizing a different segment of the audio recording 311, which ends up to a few seconds before the certain time (and thus may offer a representation of the quality of the audio recording 311 at the certain time).

In addition to calculating the quality indication 315, the backend server 110 may actively alert about incidents of low audio quality of the audio recording 311. In one embodiment, a user interface located in the room (e.g., a screen or speaker of the frontend server 310), may be used to present an alert about low quality audio responsive to the quality indication 315 being below a threshold. In one example, the alert may be in the form of a graphical icon and/or a numerical indication. In another example, the alert may be in the form of a beeping sound when the quality falls too low.

The backend server 110 may alert about a fall in the quality of the audio recording 311 by comparing the quality indication 315 with previously calculated quality indications calculated for previous segments (e.g., segments of the audio that ended seconds or minutes before the segment 313 ended). A fall in the quality may indicate that a certain event took place, which possibly can be reversed. For example, a window or door in the room might have been opened, a microphone might have fallen over, etc. Thus, in some embodiments, the backend server 110 generates an alert about a fall in the audio quality responsive to determining that the value the quality indication 315 has fallen below a threshold, while an earlier quality indication, indicative of the expected hybrid transcription quality of a previous segment of the audio recording 311, was above the threshold. Optionally, the previous segment includes speech of the one or more people in the room, and was recorded at least one minute prior to the time the segment 313 was recorded.

Additionally, in some embodiments, the backend server 110 may follow the quality of audio of a certain person, by calculating the aforementioned values for segments that include speech of the certain person. Thus, if the quality of a certain person falls, after it was at a higher level a short while before, this may mean that some event took place that caused the fall in quality. For example, the certain person might have moved away from a microphone or turned away from a microphone, started speaking unclearly (e.g., due to an emotional outburst), and the like.

In addition to providing the quality indication 315, in some embodiments, the backend server 110 may analyze the segment 313 and suggest some intervention 319 that may be performed in order to improve the quality of the audio recording 311.

In one embodiment, the backend server 110 utilizes an intervention model 318 to suggest, based on the segment 313, the suggested intervention 319, which may be a technical intervention to be performed by a person in the room. Optionally, the backend server 110 generates feature values indicative of acoustic properties of the segment 313, and utilizes the intervention model 318 to calculate a value indicative of which technical intervention should be performed. Some examples of technical interventions that may be suggested include one or more of the following: suggesting to shut a door in the room, suggesting to shut a window in the room, and suggesting a person in the room move closer to a microphone. Optionally, in this embodiment, the intervention model 318 is generated based on samples that include feature values generated from previous segments of audio and indications of technical interventions that led to an improvement in audio quality of channels of audio, from which the prior segments of audio were taken.

Figure 16:
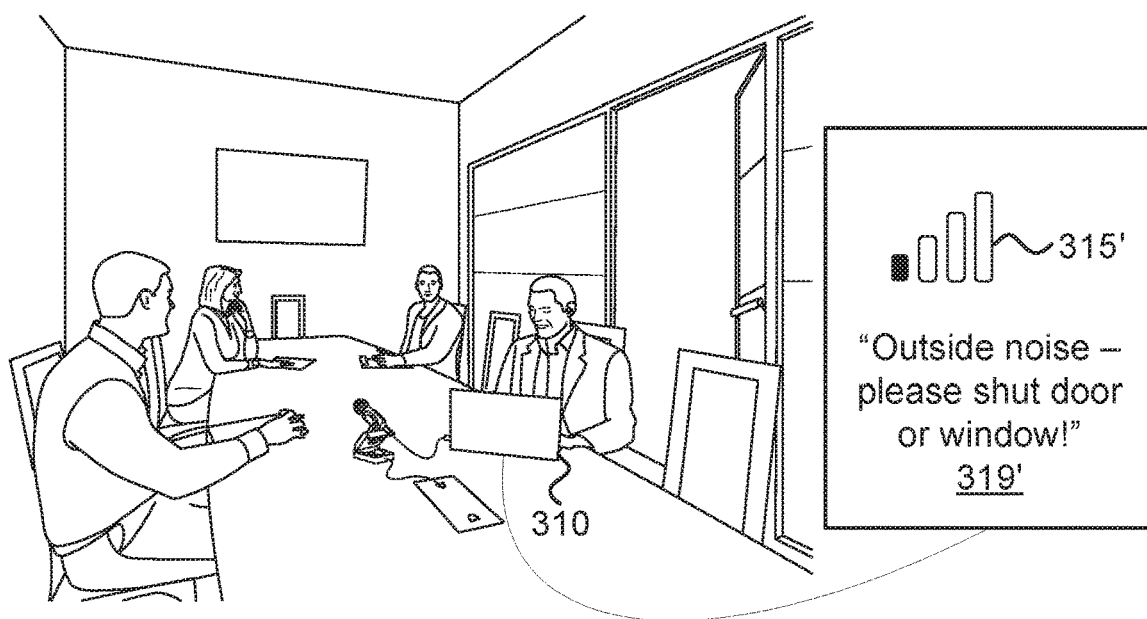
FIG. 16 illustrates an example of a scenario in which a quality indication and suggested intervention are provided to a frontend server.

FIG. 16 illustrates an example of a scenario in which a quality indication 315' is provided to the frontend server 310, which in this example is in a room in which a deposition is being held. The quality indication 315' indicates low audio quality. Additionally, the backend server 110 sends a suggested intervention 319' to close the door in the room, which based on the acoustic properties of a segment of audio recorded in the room, may be the reason for the low quality (e.g., due to noise coming from outside the room).

In another embodiment, the backend server 110 may utilize the intervention model 318 to suggest, based on the segment 313, the suggested intervention 319, which may be an intervention related to one of the speakers in the room. Optionally, the backend server 110 utilizes the intervention model 318 to identify, based on the segment 313, a problematic speech characteristic by a person in the room and to provide an indication thereof (in the form of the suggested intervention 319). Optionally, in this embodiment, the suggested intervention 319 may be indicative of one or more of the following speech characteristics: excessive interruptions of another speaker, overlapping speech, speaking fast, speaking in a low volume, and insufficient annunciation. Optionally, the suggested intervention 319 is a request to the speaker to cease from such behavior that reduces the quality of the audio for transcription. Optionally, the backend server 110 generates feature values indicative of acoustic properties of the segment 313, and utilizes the intervention model 318 to calculate a value indicative of an extent to which speech in the segment 313 has a problematic characteristic (from among the characteristics mentioned above). Optionally, in this embodiment, the intervention model 318 is generated based on prior segments of audio and indications of types of problematic speech identified is the prior segments of audio (e.g., by a human transcriber).

Figure 17:
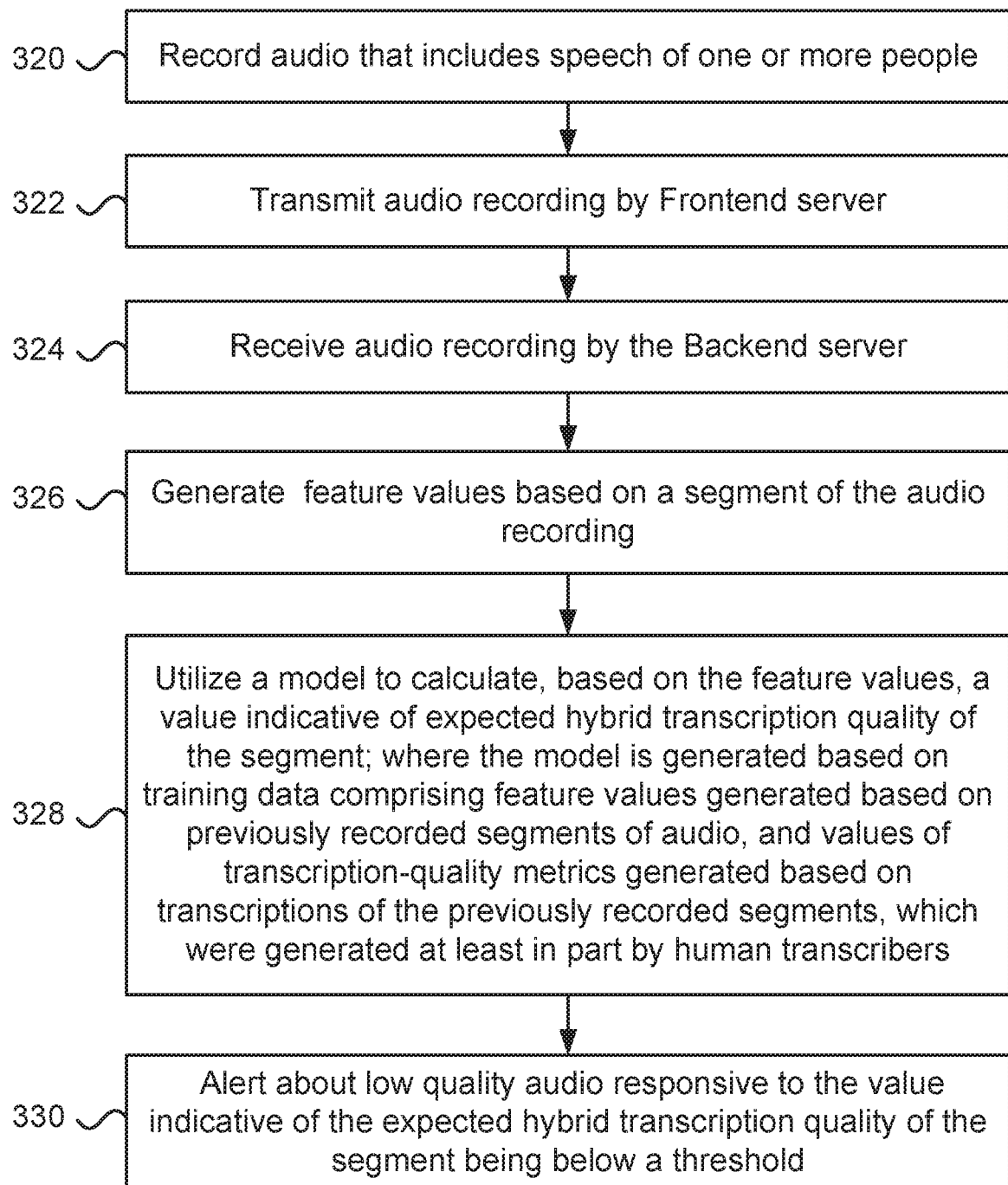
FIG. 17 illustrates steps involved in one embodiment of a method for detecting low-quality audio used for hybrid transcription.

FIG. 17 illustrates steps involved in one embodiment of a method for detecting low-quality audio used for hybrid transcription. The steps illustrated in FIG. 17 may be executed, in some embodiments, by a system modeled according to FIG. 15, as described above. In some embodiments, instructions for implementing the method may be stored on a computer-readable medium, which may optionally be a non-transitory computer-readable medium. In response to execution by a computer system including a processor and memory (e.g., the backend server 110 described above), the instructions cause the computer system to perform operations of the method.

In one embodiment, the method for detecting low-quality audio used for hybrid transcription includes at least the following steps:

In Step 324, receiving an audio recording that includes speech of one or more people. Optionally, the one or more people are in a room.

In Step 326, generating feature values based on a segment of the audio recording.

And in Step 328, utilizing a model to calculate, based on the feature values, a value indicative of expected hybrid transcription quality of the segment. Optionally, the model is generated based on training data that includes feature values generated based on previously recorded segments of audio, and values of transcription-quality metrics generated based on transcriptions of the previously recorded segments, which were generated at least in part by human transcribers (i.e., the transcriptions of the previously recorded segments were generated utilizing a hybrid transcription approach).

The method described above may include, in some embodiments, optional Step 320, which involves recording the audio recording that includes speech of the one or more people, e.g., utilizing one or more of the microphones 119-1 to 119-n. Additionally the method may optionally include step 322, which involves transmitting the audio recording, e.g., by the frontend server 310.

In one embodiment, the method may optionally include Step 330, which involves alerting about low quality audio responsive to the value indicative of the expected hybrid transcription quality of the segment being below a threshold. Optionally, the alerting is done responsive to determining that the value indicative of the expected hybrid transcription quality of the segment has fallen below the threshold, while an earlier value indicative of an expected hybrid transcription quality of a previous segment of audio was above the threshold. Optionally, the previous segment of audio includes speech of the one or more people and was recorded at least one minute prior to the time the segment was recorded.

Various types of feature values may be generated based on the segment of the audio recording. In one embodiment, Step 326 may optionally involve generating one or more of the feature values based on a signal-to-noise ratio of the audio in the segment. In another embodiment, Step 326 may optionally involve generating at least one of the feature values utilizing natural language understanding (NLU), which is used to calculate a value indicative of intelligibility of a transcription of the segment generated utilizing an ASR system. In yet another embodiment, Step 326 may optionally involve generating one or more of the feature values based on a lattice constructed by an ASR system that processed the segment.

In some embodiments, a cause for low quality audio may be detected and an intervention may be suggested in order to improve the quality of the audio. Optionally, the method of FIG. 17 may include the following step: utilizing a second model to suggest, based on the segment, a technical intervention to be performed by a person in the room. Optionally, the second model is generated based on prior segments of audio and indications of technical interventions that led to an improvement in audio quality of channels of audio, from which the prior segments of audio were taken. Optionally, suggesting the technical intervention involves one or more of the following: suggesting to shut a door in the room, suggesting to shut a window in the room, and suggesting a person in the room move closer to a microphone.

In other embodiments, a cause for low quality audio may involve problematic speech. Optionally, the method of FIG. 17 may include the following steps: utilizing a third model to identify, based on the segment, a problematic speech characteristic by a person in the room, and providing an indication thereof. Optionally, the problematic speech characteristic includes one or more of the following: excessive interruptions of another speaker, overlapping speech, speaking fast, speaking in a low volume, and insufficient annunciation.

Certain phrases may be difficult to transcribe, especially if they include names and/or infrequently used terms. However, often such phrases may be repeated multiple times throughout an audio recording. Enabling a transcriber to review the multiple occurrences of a repeated phrase by listening to its different utterances, and examining the different contexts in which the repeated phrase was uttered, can assist the transcriber to resolve what the repeated phrase is. This assistance is provided by embodiments described below.

Figure 18:
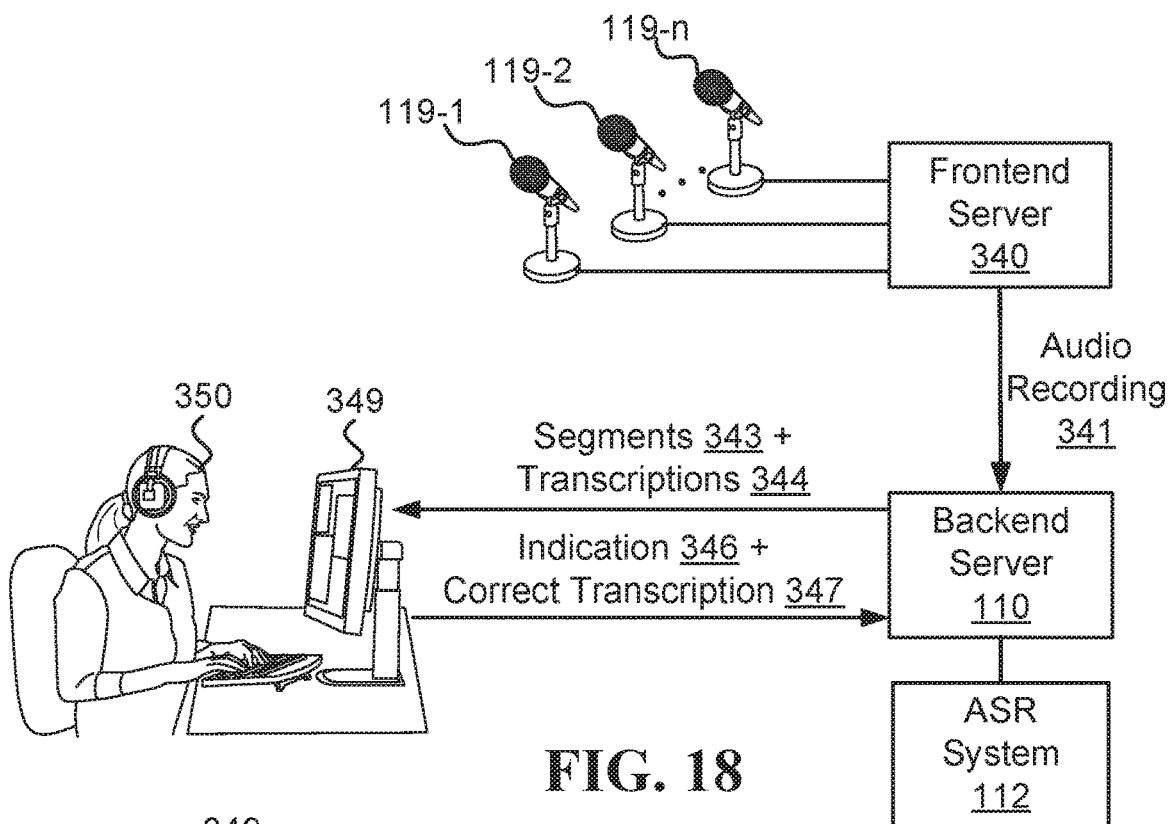
FIG. 18 illustrates an embodiment of a system configured to assist in transcription of a repeated phrase.

FIG. 18 illustrates an embodiment of a system configured to assist in transcription of a repeated phrase. In one embodiment, the system includes at least the frontend server 340 and the backend server 110. The system may optionally include other elements such as user interfaces and/or the one or more microphones 119-1 to 119-n. In one embodiment, the backend server 110 is configured to run one or more computer programs that cause it to perform operations described below (which may correspond to at least some of the steps of the method illustrated in FIG. 20).

The frontend server 340 is configured, in one embodiment, to transmit an audio recording 341 that includes speech of one or more people. Optionally, the audio recording 341 is taken over a period spanning at least two hours. In one example, the audio recording 341 includes one or more channels of audio recorded using the one or more of microphones 119-1 to 119-n (where n≥1), which are in a room. Optionally, a deposition is being conducted in the room while the audio recording 341 is recorded. In one embodiment, the audio recording 341 includes two or more channels of audio. Optionally, the two or more channels are recorded utilizing respective two or more microphones, from among the microphones 119-1 to 119-n. Optionally, the two or more microphones are at least 40 cm away from each other.

In order to present a transcriber with information about likely occurrences of a repeated phrase in the audio recording 341, in some embodiments, the backend server 110 utilizes the ASR system 112 to generate a transcription of the audio recording 341 and then analyzes it as follows.

The backend server 110 selects from the audio recording 341 segments and clusters them into clusters of similar utterances. Optionally, the selected segments have a similar length. For example, the selected segments are between t and 2t seconds long; where various values of t may be used. In one example, t=0.5 seconds. In another example t=second and in still another example, t=2 seconds. Other values of t may be used in different embodiments, and other ranges of lengths may be used (e.g., segments fall within a range of t and 3t seconds, etc.) However, generally, the clustering involves segments of similar length, which should typically include a phrase that comprises a word or several words.

Clustering the segments of audio may be done in various ways. In one embodiment, the backend server 110 clusters the segments utilizing dynamic time warping (DTW) of acoustic feature representations of the segments (e.g., time series of acoustic features). Since DTW is a method for aligning two distinct time series of possibly a different length, DTW may be useful for aligning segments in which phrases may be spoken at different speeds and/or using different accents and/or intonations. Some examples of DTW-based approaches that may be utilized by the backend server 110 to cluster the segments are described in Park, et al., "Unsupervised pattern discovery in speech", IEEE Transactions on Audio, Speech, and Language Processing 16.1 (2007): 186-197, which present a segmental variant of a dynamic programming technique, which enables matching acoustic patterns between spoken utterances. Another DTW-based clustering approach that may be utilized by the backend server 110 is described in Jansen, et al., "Towards spoken term discovery at scale with zero resources," in the Eleventh Annual Conference of the International Speech Communication Association, 2010, who describe an efficient algorithm the speed up segmental DTW.

Another clustering approach that may be used by the backend server 110 relies on utilization of the lattice that is generated as part of the transcription process. The same phrases often have similar paths in the lattice, which can be utilized to identify repeated utterances of a phrase. In one embodiment, the backend server 110 clusters the segments based on similarity of paths corresponding to the segments in a lattice constructed by the ASR system 112. Some examples of clustering that are based on analysis of the lattice, which may utilized by the backend server 110, are described in Saraclar, et al., "Lattice-based search for spoken utterance retrieval", Proceedings of the Human Language Technology Conference of the North American Chapter of the Association for Computational Linguistics: HLT-NAACL 2004, which describes an indexing approach for ASR lattices which used both word level and sub-word level indexing. Another approach that may be utilized when clustering segments using the lattice is described in Petrovska-Delacrétaz, et al. "Detecting Acoustic Morphemes in Lattices for Spoken Language Understanding", Sixth International Conference on Spoken Language Processing, 2000, which describes and advantage offered by detecting morphemes in the lattice as compared to searching only in the best paths (i.e., searching the transcriptions).

Other approaches that be used by the backend server involve representing segments in a feature space that takes into account both acoustic properties and properties of the ASR performed on the segment. In one embodiment, the backend server 110 represents each segment of audio and a product of ASR of the segment using a feature values that include: one or more feature values indicative of acoustic properties of the segment, and at least some feature values indicative of phonetic transcription properties calculated by the ASR system 112. The clustering of the segments may utilize one or more clustering algorithms that may operate on vectors of features using a distance function, such as k-means. Expectation-Maximization (EM), clustering using Gaussian Mixture Models (GMM), or agglomerative hierarchical clustering.

The backend server 110 may provide a transcriber 350 with segments 343 of the audio recording 341, which comprise similar utterances belonging to a certain cluster, along with transcriptions 344 of the segments 343. Optionally, the segments 343 and the transcriptions 344 are provided via a user interface 349, as discussed in more detail below. Optionally, the transcriptions 344 are extracted from the transcription of the audio recording 341.

The segments 343 in the certain cluster may have different characteristics. In one embodiment, the audio recording 341 includes first and second channels, recorded by respective first and second microphones configured to record the first and second channels, respectively. In this embodiment, the segments 343 include: (i) a first segment, from the first channel, in which a phrase is uttered by a first speaker, and (ii) a second segment, from the second channel, in which the phrase is uttered by a second user. Thus, identifying the repeated phrase in the segments 343 may involve listening to different people pronouncing the phrase.

Besides being able to listen to a repeated phrase multiple times, in some embodiments, the transcriber 350 may also be presented with additional context for at least some of the segments 343 in the form of portions of a transcription of the audio recording 341 that appear directly before the transcriptions 344 of the segments 343 and/or portions of the transcription of the audio recording 341 that appear directly after the transcriptions 344. Thus, the transcriber 350 may be given context, which can assist in interpreting what is said in the segments 343.

The backend server 110 may receive from the transcriber 350: an indication 346 of which of the certain segments comprise repetitions of a phrase (the "repeated phrase"), and a correct transcription 347 of the phrase. Optionally, the indication 346 and/or the correct transcription 347 are provided via the user interface 349 after the transcriber 350 listens to at least some of the segments 343. Optionally, the indication 346 is indicative of the segments 343 including at least two utterances of the phrase (hence the phrase may be referred to herein as the "repeated phrase", to indicate that the transcriber 350 will typically find it multiple times when presented with segments 343 that come from a certain cluster). Optionally, the backend server 110 utilizes the indication 346 and the correct transcription 347 to update a transcription of the audio recording 341 to include the correct transcription 347 at locations indicated in the indications 346. Optionally, updating the transcription of the audio recording 341 is done responsive to the indication 346 indicating that a number of the segments 343 that include an utterance of the phrase is greater than a threshold, and the threshold is at least two. Optionally, if the indication 346 indicates that the number does not reach the threshold, the transcription of the audio recording 341 is not updated.

In some embodiments, the backend server 110 utilizes the indication 346 and/or the correct transcription 347 to update models utilized by the ASR system 112 in order to improve transcriptions generated for additional segments of the audio recording 341. In one example, the backend server 110 may utilize the indication 346 to update a phonetic model utilized by the ASR system 112 to reflect one or more pronunciations of the repeated phrase in the correct transcription 347. In another example, the backend server 110 utilizes the correct transcription 347 to update a language model utilized by the ASR system 112 to include the repeated phrase in the correct transcription 347.

Figure 19:
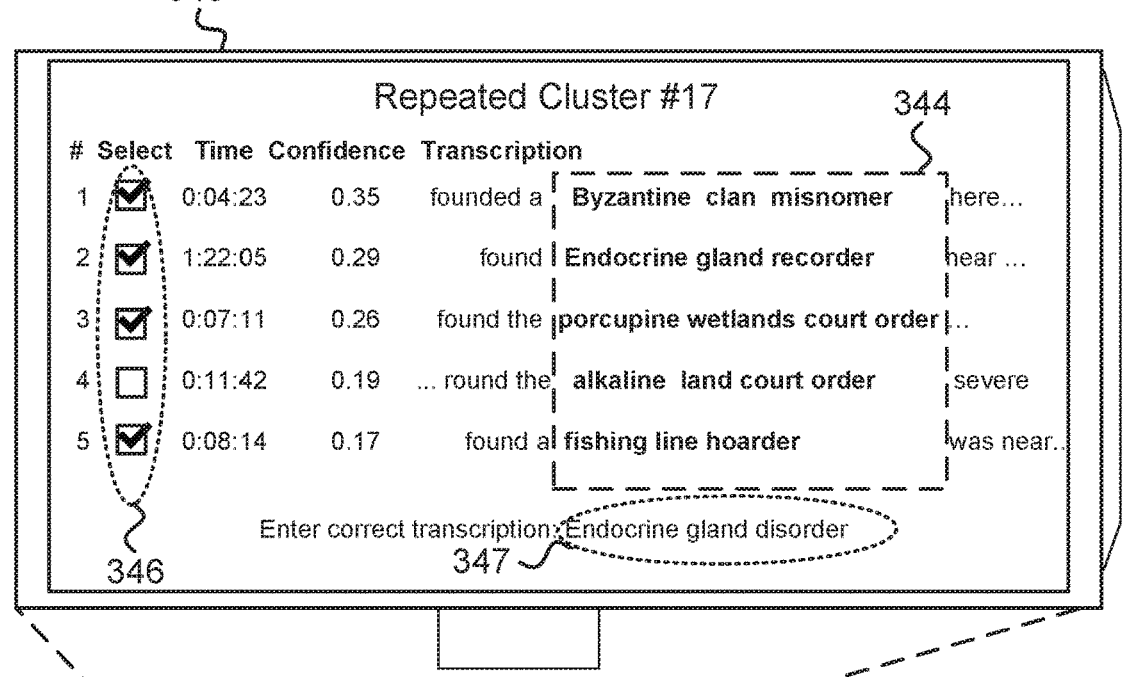
FIG. 19 illustrates an interaction with a system configured to assist in transcription of a repeated phrase.

FIG. 19 illustrates the user interface 349, which is a computer monitor depicting an interaction of transcriber 350, presented with the segments 343 that may include a repeated phrase. The screen depicts presentation five of the segments 343 (not illustrated), their start time, a confidence in their transcription, and transcriptions 344 of the segments. The transcriber 350 may provide the indication 346 by selecting certain segments that include the repeated phrase. Additionally, the transcriber 350 can enter the correct transcription 347. FIG. 19 also illustrates that some context may be given by providing portions of the transcription of the audio recording 341 that appear before or after the transcriptions 344 of the segments 343. Optionally, the transcriber 350 may listen to different segments from among the segments 343 by clicking their respective regions on the computer monitor (e.g., using a mouse).

FIG. 19 illustrates a possible interaction of the transcriber 350 with an embodiment of the system illustrated in FIG. 18 in order to resolve a repeated phrase (e.g., a name, technical term, or some combination of words). Optionally, resolving the repeated phrase involves determining the correct transcription of the repeated phrase and/or identifying which segments of a certain cluster include an utterance of the repeated phrase, and which do not. In one embodiment, the aforementioned interaction is done utilizing a computer (e.g., the backend server 110), which is configured to perform operations described below.

In one embodiment, the computer (e.g., the backend server 110), plays the segments 343 of the audio recording 341 to the transcriber 350. Optionally, each segment that is played after receiving an indication from the transcriber 350 (e.g., the transcriber 350 may click an icon corresponding to the segment, hit a key that causes the segment to play, etc.). Optionally, the segment is played through headphones and/or a speaker connected to the computer. Optionally, at least some of the segments 343 include an utterance of the repeated phrase, though the system may not have sufficient confidence in this fact, and thus may require assistance from the transcriber 350 to ascertain whether its transcription is true. Optionally, the segments 343 include utterances of the repeated phrase by different speakers.

In addition to playing the segments 343, the computer presents, to the transcriber 350, the transcriptions 344 of the segments 343. Optionally, one or more of the transcriptions 344 do not include a correct wording of the repeated phrase. Optionally, none of the transcriptions 344 include the correct wording of the repeated phrase. Optionally, at least one transcription of one of the segments 343 includes a correct wording of the repeated phrase.

Some additional information may be provided to the transcriber when listening to the segments 343 and/or reviewing the transcriptions 344. In one embodiment, the computer presents for each segment, from among the segments 343, an indication of at least one of: a similarity of the segment to a consensus of the segments, a similarity of the segment to the other segments (from among the segments 343), a similarity of a transcription of the segment to transcriptions of the other segments. In one example, segments may represented as time series of vectors of acoustic features, and the consensus of segments may be generated by averaging multiple vectors of different segments (e.g., using DTW).

In one embodiment, the computer may present the transcriptions 344 of the segments 343 in an order based on audio quality of the segments 343, such that a transcription of a first segment with a higher signal-to-noise ratio is presented ahead of a transcription of second segment with a lower signal-to-noise ratio. In another embodiment, the computer may present the transcriptions 344 in an order based on confidence in the transcriptions of the segments, such that a first transcription that has a high confidence is presented ahead of a second transcription that has a lower confidence.

After listening to at least some of the segments 343 and/or reading the transcriptions 344, the transcriber 350 may provide the indication 346, indicating which of the segments 343 the transcriber 350 believes include an utterance of the repeated phrase. Optionally, the indication 346 indicates that at least two of the segments 343 include an utterance of the repeated phrase. Additionally, the transcriber 350 may provide the correct transcription 347 for the repeated phrase. For example, the transcriber may use a keyboard and/or mouse, or some other form of input, such as a microphone and text-to-speech, to provide the correct transcription 347. Optionally, in an event that a transcription from among the transcriptions 344 includes the wording of the correct transcription 347, the transcriber 350 may select this transcription, by indicating that it is correct, in order to provide the correct transcription 347 to the system, without, for example, explicitly typing it or dictating it.

The indication 346 and correct transcription 347 are received by the computer, which may utilize them in various ways. In one embodiment, the computer may update the transcriptions 344 and/or a transcription of the audio recording 341 based on the indication, such that portions of these transcriptions will include the correct transcription 347 at places corresponding to the selected segments from among the segments 343. Optionally, the computer updates the transcription of the audio recording 341 responsive to the indication 346 indicating that at least a certain number (greater than one) of the segments 343 include an utterance of the repeated phrase. Optionally, if the indication does not indicate that at least the certain number of the segments 343 include an utterance of the repeated phrase, the computer does not update the transcription of the audio recording 341.

In another embodiment, the computer may utilize the indication 346 and/or the correct transcription 347 to update one or more models utilized by the ASR system 112. In one example, the correct transcription 347 of the repeated phrase includes a term that is not represented in a language model utilized by the ASR system 112 to generate the transcriptions 344 of the segments 343. Optionally, the computer updates the language model to include representation of the term.

Figure 20:
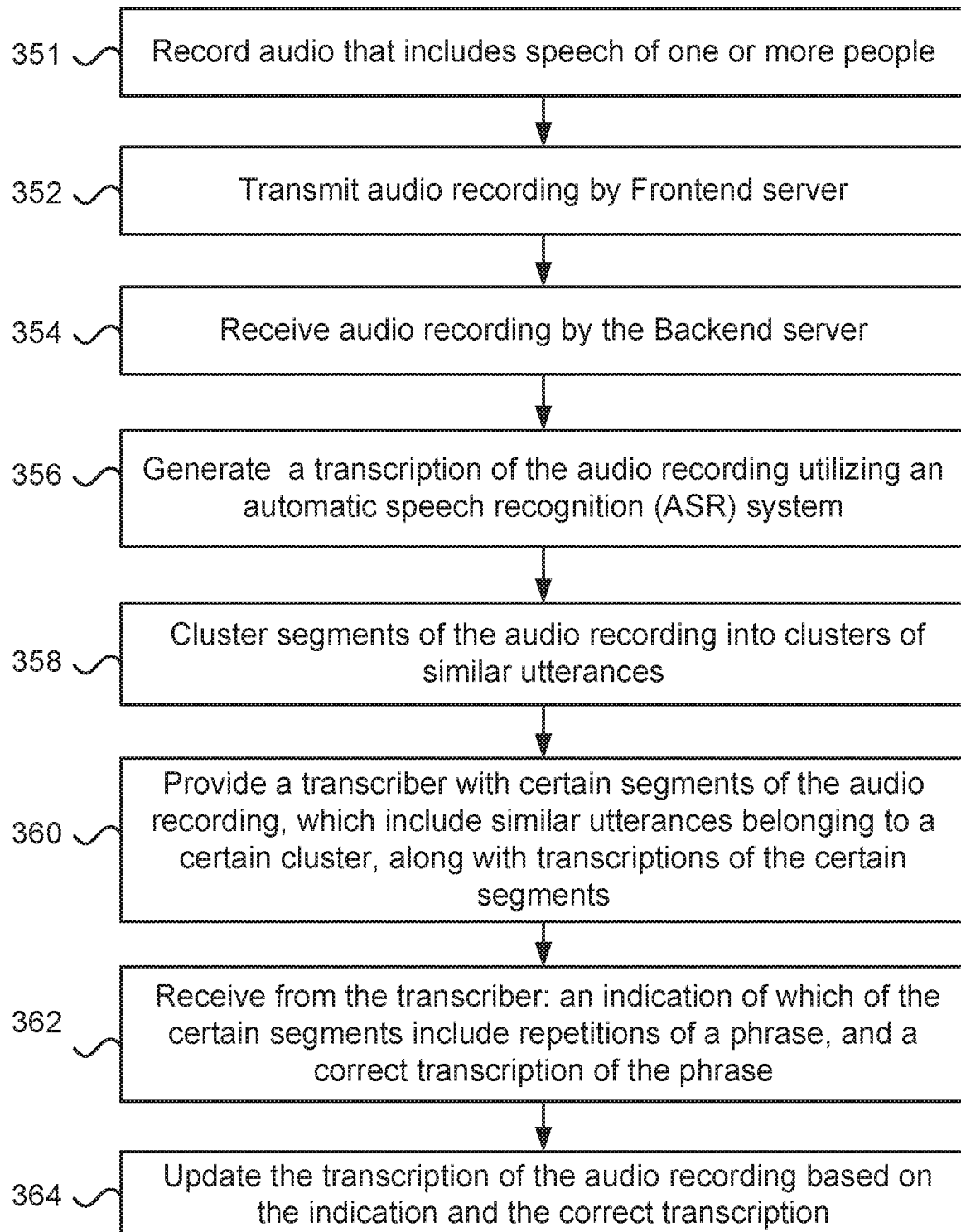
FIG. 20 illustrates steps involved in one embodiment of a method for assisting in transcription of a repeated phrase.

FIG. 20 illustrates steps involved in one embodiment of a method for assisting in transcription of a repeated phrase. The steps illustrated in FIG. 20 may be executed, in some embodiments, by a system modeled according to FIG. 18, as described above. In some embodiments, instructions for implementing the method may be stored on a computer-readable medium, which may optionally be a non-transitory computer-readable medium. In response to execution by a computer system including a processor and memory (e.g., the backend server 110 described above), the instructions cause the computer system to perform operations of the method.

In one embodiment, the method for assisting in transcription of a repeated phrase includes at least the following steps:

In Step 354, receiving an audio recording that includes speech of one or more people. Optionally, the one or more people are in a room. Optionally, a deposition is being held in the room.

In Step 356, generating a transcription of the audio recording utilizing the ASR system 112.

In Step 358, clustering segments of the audio recording into clusters of similar utterances. Optionally, clustering the segments is done utilizing dynamic time warping (DTW) of acoustic feature representations of the segments. Optionally, clustering the segments is done based on similarity of paths corresponding to the segments in a lattice constructed by the ASR system 112.

In Step 360, providing a transcriber with certain segments of the audio recording, which include similar utterances belonging to a certain cluster, along with transcriptions of the certain segments. Optionally, the transcriptions of the certain segments are extracted from the transcription of the audio recording generated in Step 356. Optionally, one or more of the transcriptions of the certain segments do not include the correct transcription of the phrase. Optionally, two or more of the transcriptions of the certain segments do include the correct transcription of the phrase.

In Step 362, receiving from the transcriber: an indication of which of the certain segments include repetitions of a phrase, and a correct transcription of the phrase.

And in Step 364, updating the transcription of the audio recording (which was generated in Step 356) based on the indication and the correct transcription. Optionally, updating the transcription of the audio recording is done responsive to the indication indicating that a number of the certain segments that include an utterance of the phrase is greater than a threshold that is at least two. Optionally, if the indication indicates that the number does not reach the threshold, the transcription of the audio recording is not updated.

The method described above may include, in some embodiments, optional Step 351, which involves recording the audio recording that includes speech of the one or more people, e.g., utilizing one or more of the microphones 119-1 to 119-*n*. Additionally the method may optionally include a step 352, which involves transmitting the audio recording, e.g., by the frontend server 340.

In one embodiment, the method illustrated in FIG. 20 optionally includes a step that involves utilizing the indication received in Step 362 to update a phonetic model utilized by the ASR system 112 to reflect one or more pronunciations of the phrase.

In one embodiment, the method illustrated in FIG. 20 optionally includes a step that involves updating a language model utilized by the ASR system 112 to include the correct transcription of the phrase.

In one embodiment, a transcription of a segment belonging to the certain cluster includes the correct transcription of the phrase. Optionally, in this embodiment, the method illustrated in FIG. 20 includes a step that involves receiving a selection, of the transcriber, of the correct transcription of the phrase from among several options that include at least some incorrect transcriptions of the phrase.

Figure 21:
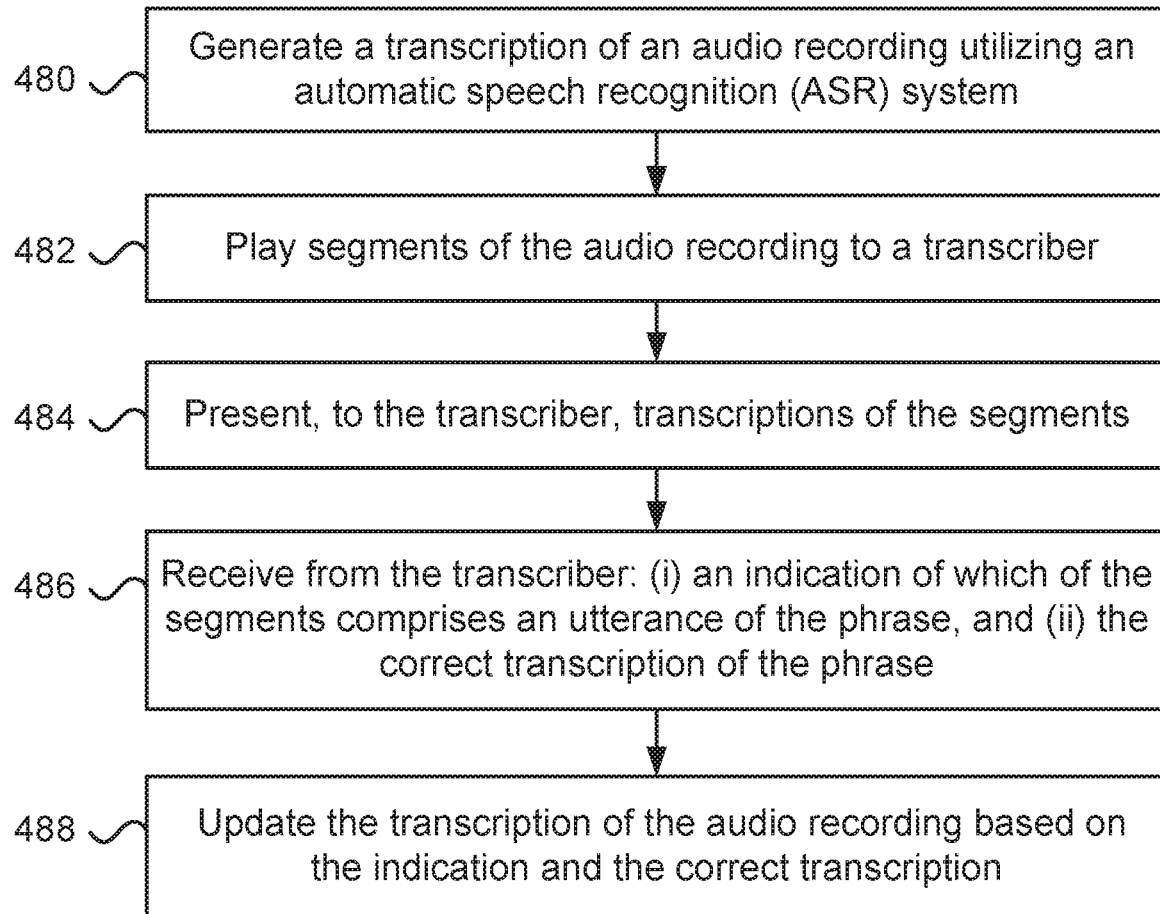
FIG. 21 illustrates steps involved in one embodiment of a method for interacting with a transcriber to resolve a repeated phrase.

FIG. 21 illustrates steps involved in one embodiment of a method for interacting with a transcriber to resolve a repeated phrase. The steps illustrated in FIG. 21 may be executed, in some embodiments, by a system modeled according to FIG. 18, as described above. In some embodiments, instructions for implementing the method may be stored on a computer-readable medium, which may optionally be a non-transitory computer-readable medium. In response to execution by a computer system including a processor and memory (e.g., the backend server 110 described above), the instructions cause the computer system to perform operations of the method.

In one embodiment, the method for interacting with a transcriber to resolve a repeated phrase includes at least the following steps:

In Step 482, playing segments of an audio recording to the transcriber. Optionally, at least some of the segments include an utterance of a phrase.

In Step 484, presenting, to the transcriber, transcriptions of the segments. Optionally, at least some of the transcriptions do not include a correct transcription of the phrase. Optionally, this step also involves presenting for each segment, from among the segments, a value indicative of at least one of: a similarity of the segment to a consensus of the segments, a similarity of the segment to the other segments, and a similarity of a transcription of the segment to transcriptions of the other segments.

In Step 486, receiving from the transcriber: (i) an indication of which of the segments includes an utterance of the phrase, and (ii) the correct transcription of the phrase.

And in Step 488, updating a transcription of the audio recording based on the indication and the correct transcription. Optionally, updating the transcription of the audio recording is done based on the indication indicating that a number of the segments that comprise an utterance of the phrase is greater than a threshold that is at least two.

In one embodiment, the method may optionally include Step 480 that involves generating the transcription of the audio recording utilizing the ASR system 112. Optionally, the method includes a step of generating the transcriptions of the segments utilizing the ASR system 112. Optionally, the correct transcription of the phrase includes a term that is not represented in a language model utilized by the ASR system 112 to generate the transcriptions of the segments, and the method optionally includes a step of updating the language model to include representation of the term.

In one embodiment, a transcription of one of the segments includes the correct transcription of the phrase, and the method illustrated in FIG. 21 includes a step of receiving a selection by the transcriber of the correct transcription of the phrase, from among the transcriptions of the segments.

Presenting the transcriptions of the segments in Step 484 may be done in various orders. In one embodiment, presenting the segments is done in an order based on audio quality of the segments, such that a first segment with a higher signal-to-noise ratio is presented ahead of a second segment with a lower signal-to-noise ratio. In another embodiment, presenting the segments is done in an order based on confidence in the transcriptions of the segments, such that a first segment with a transcription that has a high confidence is presented ahead of a second segment with a transcription that has a lower confidence.

Figure 22:
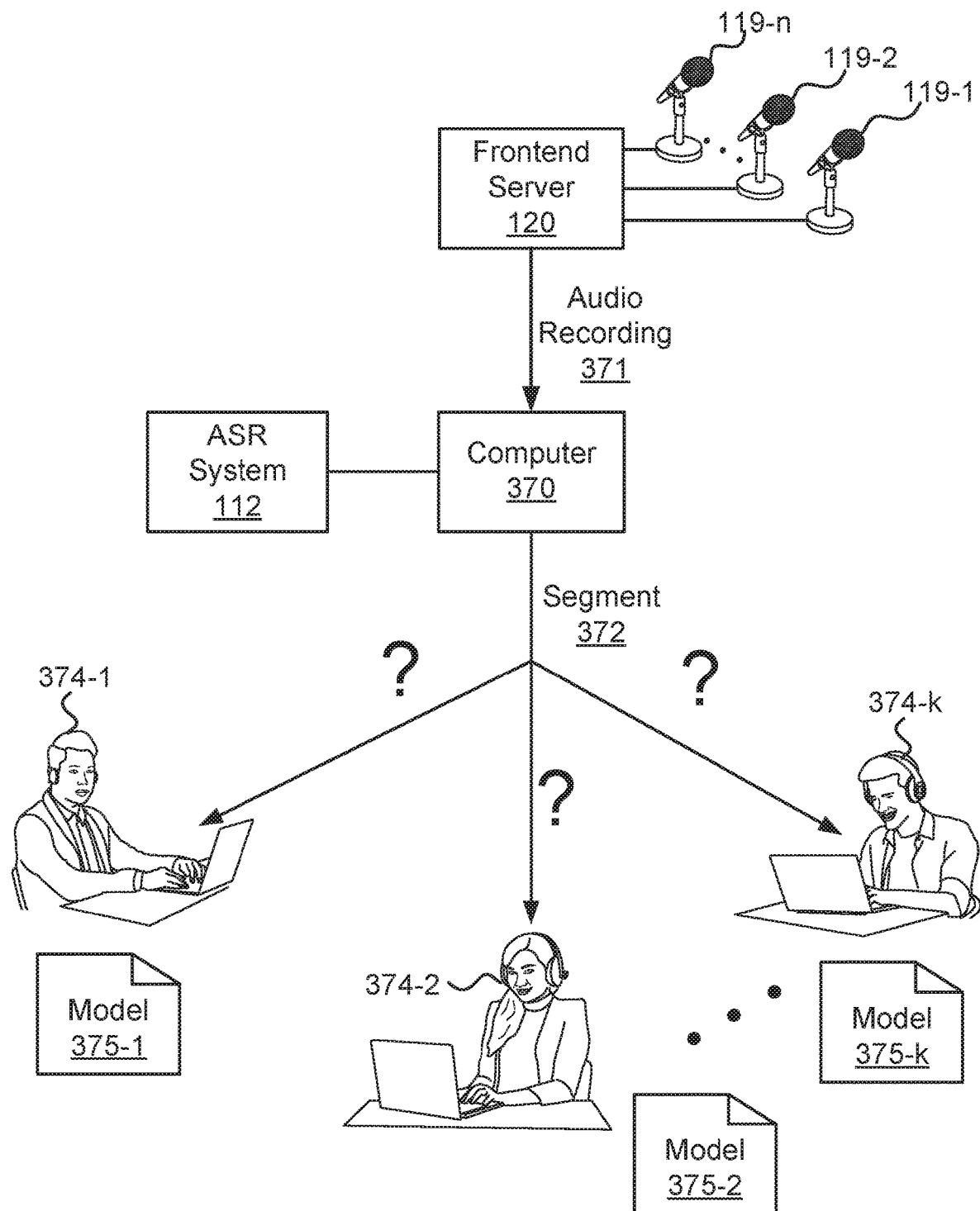
FIG. 22 illustrates an embodiment of a system configured to calculate an expected accuracy of a transcription by a certain transcriber.

FIG. 22 illustrates an embodiment of a system configured to calculate an expected accuracy of a transcription by a certain transcriber. In one embodiment, the system includes at least the frontend server 120 and a computer 370, which may be the backend server 110, or some other computer described herein. The system may optionally include other elements such as user interfaces and/or the one or more microphones 119-1 to 119-*n*. In one embodiment, the computer 370 is configured to run one or more computer programs that cause it to perform operations described below (which may correspond to at least some of the steps of the method illustrated in FIG. 23).

The frontend server 120 is configured, in one embodiment, to transmit an audio recording 371 that includes speech of one or more people. Optionally, the audio recording 371 is taken over a period spanning at least two hours. In one example, the audio recording 371 includes one or more channels of audio recorded using the one or more of microphones 119-1 to 119-*n* (where n≥1), which are in a room. Optionally, a deposition is being conducted in the room while the audio recording 371 is recorded. In one embodiment, the audio recording 371 includes two or more channels of audio. Optionally, the two or more channels are recorded utilizing respective two or more microphones, from among the microphones 119-1 to 119-*n*. Optionally, the two or more microphones are at least 40 cm away from each other.

Selecting the right transcriber is important for receiving an accurate transcription in a timely manner. In some embodiments, the computer 370 may perform this task by calculating values indicative of expected accuracies of transcriptions by various transcribers (the various transcribers 374-1 to 374-*k*, where k>1), were they to be tasked with transcribing a segment 372 of the audio recording 371.

In one embodiment, the computer 370 receives the segment 372. Optionally, the segment 372 is received within a short time from the start of the period during which the audio recording 371 is recorded, such as within the first twenty minutes of that period. Optionally, the computer 370 segments the audio recording 371 in order to obtain the segment 372. Optionally, the segment 372 has a certain duration that is greater than a minimal duration, such as a duration of at least 10 seconds, at least 30 seconds, or at least two minutes. Optionally, the segment 372 includes speech of at least one person.

In some embodiments, the computer 370 receives information about various characteristics related to the segment 372 and/or the various transcribers 374-1 to 374-*k*, and generates feature values based on this information. These feature values may be utilized to calculate values indicative of an expected accuracy of transcriptions of the segment 372 by each of the k transcribers 374-1 to 374-k (were they tasked with transcribing the segment 372), as described below.

One type of feature value that may be utilized by the computer 370 involves an identification of an accent spoken in the segment 372. Such a feature value may be useful because some transcribers may be better at understanding certain accents than other transcribers. In one embodiment, the computer 370 identifies, based on the segment 372, an accent of a person speaking in the segment 372. Optionally, the computer 370 utilizes one or more of the algorithmic approaches mentioned herein in the discussion related to embodiments modeled according to FIG. 2. Optionally, the computer 370 utilizes a classifier to identify the accent spoken in the segment 372, and responsive to confidence in an identification of the accent being below a threshold, the computer 370 provides the segment 372 to a certain transcriber to listen to, and the computer 370 receives an identification of the accent from the certain transcriber.

Another type of feature value that may be utilizing in some embodiments by the computer 370 involves identification of a topic of speech in the segment 372. Such a feature value may be useful because some transcribers may be more knowledgeable about certain topics, and thus may find it easier to identify correctly certain names and/or terms that are related to the certain topics. In one embodiment, the computer 370 identifies a topic of speech in the segment 372 based on a transcription of the segment 372, which is generated utilizing the ASR system 112. Optionally, the computer 370 utilizes one or more of the algorithmic approaches mentioned herein in the discussion related to embodiments modeled according to FIG. 5. Optionally, the computer 370 utilizes a classifier to identify the topic from the transcription of the segment 372, and responsive to confidence in an identification of the topic being below a threshold, the computer 370 provides the segment 372 and/or the transcription of the segment 372, to a certain transcriber to listen to and/or read, and the computer 370 receives an identification of the topic from the certain transcriber.

In some embodiments, one or more of the feature values may relate to various properties of the segment 372. For example, a feature value generated by the computer 370 may be indicative of one or more of the following: the duration of the segment 372, and the number of speakers in the segment 372. In some embodiments, such a feature value may be useful because some transcribers may be better than others at keeping their attention when faced with long transcription jobs and/or transcriptions that involve many changes of speakers, which might be hard to follow.

In other embodiments, feature values may relate to a state of a certain transcriber for whom the expected accuracy is calculated. Optionally, one or more of the feature values may be generated based on data related to recent transcription activity of the certain transcriber during that day. For example, a feature value that is generated by the computer 370 may be indicative of one or more of the following: a number of hours the certain transcriber has been working that day, a number of different speakers the certain transcriber has been transcribing. Additionally or alternatively, some feature values may relate to a relationship of the segment 372 to other segments of the audio recording 371. For example, if the segment 372 belongs to a set of segments comprising speech of a certain person, the data utilized to generate feature values may also include information related to other segments in the set. Optionally, the computer 370 generates a feature value indicative of one or more of the following: a number of segments that preceded the segment 372, a duration of the segments that preceded the segment 372, a number of the segments already transcribed by the certain transcriber, and a duration of the segments already transcribed by the certain transcriber.

In yet other embodiments, one or more of the feature values may be indicative of a signal-to-noise ratio of the audio in the segment 372. For example, the computer 370 may calculate such values based on acoustic features derived from the segment 372. Such features may be useful in some cases because different transcribers may have different abilities to handle noisy and/or low-quality audio.

In still other embodiments, one or more of the feature values generated by the computer 370 may be indicative of intelligibility of the segment 372, which reflects how well an ASR-generated transcription of the segment 372 may be understood. Optionally, at least one of these one or more feature values is generated by utilizing NLU to calculate a value indicative of intelligibility of a transcription of the segment 372 utilizing the ASR system 112. Optionally, at least one of these one or more feature values is generated based on probabilities of paths in a lattice generated by the ASR system 112 to transcribe the segment 372.

The computer 370 may utilize various combinations of the feature values described above (and possibly additional feature values not mentioned above) to calculate values indicative of an expected accuracy of a transcription of the segment 372 by a transcriber (were that transcriber to be tasked with transcribing the segment 372). In one embodiment, the computer 370 generate feature values based on data that includes at least an indication of an accent spoken in the segment 372 and an indication of a topic of speech in the segment 372.

Once feature values are generated, the computer 370 may utilize a model to calculate, based on the feature values, a value indicative of expected accuracy of a transcription of the segment by a certain transcriber. Optionally, the model utilized to calculate the aforementioned value for the certain transcriber is calculated based on training data that includes samples, where each sample includes feature values (of the types mentioned above), generated based on segments of previous audio recordings. Additionally, each sample has a label, where the samples' labels are based on values of accuracies of transcriptions by the certain transcriber of the segments. Optionally, the accuracies are determined based on "ground truth" transcriptions of the segments, as discussed below. Optionally, the previous audio recordings include recordings of a plurality of speakers speaking in different accents.

Expected accuracies of transcriptions refer to a quality metric of the transcriptions. In some embodiments, the expected accuracy of a transcription (which has not yet been transcribed) is indicative of a word error rate (WER) that is expected to be in the certain transcription (once it is transcribed). Similarly, accuracy of a specific transcription (which has been transcribed) may be a value indicative of the WER in the specific transcription. Optionally, the WER of the specific transcription of a specific segment of audio may be obtained by comparing the specific transcription to a "ground truth" transcription of the specific segment. In one example, the "ground truth" transcription is a transcription that underwent rigorous review and/or was generated by very experienced transcriber(s). In another example, a script may be available for the specific segment (e.g., when the specific segment includes a person reading portions of the script), and thus the script may serve as the ground truth transcription.

In other embodiments, a value indicative of an accuracy of a transcription may be some other value. For example, this value may be a score provided by a human evaluator who read the transcription (e.g., a grade given to the transcription by the human evaluator). In another example, the value may be provided by using a machine learning algorithm trained on the task of evaluating accuracy of transcriptions (e.g., using training data that includes human provided scores to transcriptions).

When values indicative of an expected accuracy of a transcription of a segment are calculated for different transcribers, this information may be utilized to decide which of the transcribers to use. Such a scenario is illustrated in FIG. 22 where the computer 370 may provide the segment 372 to k different transcribers 374-1 to 374-k. Each of these transcribers has a model (respective models 375-1 to 375-k). Each model corresponding to a specific transcriber is generated based on training data that includes feature values generated based on certain segments of previous audio recordings, and values of accuracies of transcriptions, by the specific transcriber, of the certain segments.

In one example, the computer 370 calculates values (v1, . . . , vk) indicative of expected accuracies of transcriptions of the segment 372 by k respective transcribers. Based on the values v1, . . . , vk the computer 370 selects a certain transcriber to transcribe the segment 372; for example, the certain transcriber may be transcriber 734-1. Optionally, the selection is based on the fact that the value calculated for transcriber 734-1 (v1) is greater than the values (v2, . . . , vk), which were calculated for the other transcribers. Such a selection reflects a fact that based on the characteristics of the segment 372, the models of the transcribers indicate that transcriber 734-1 is likely to do a better job transcribing the segments 372, compared to the job the other transcribers are expected to do.

Figure 23:
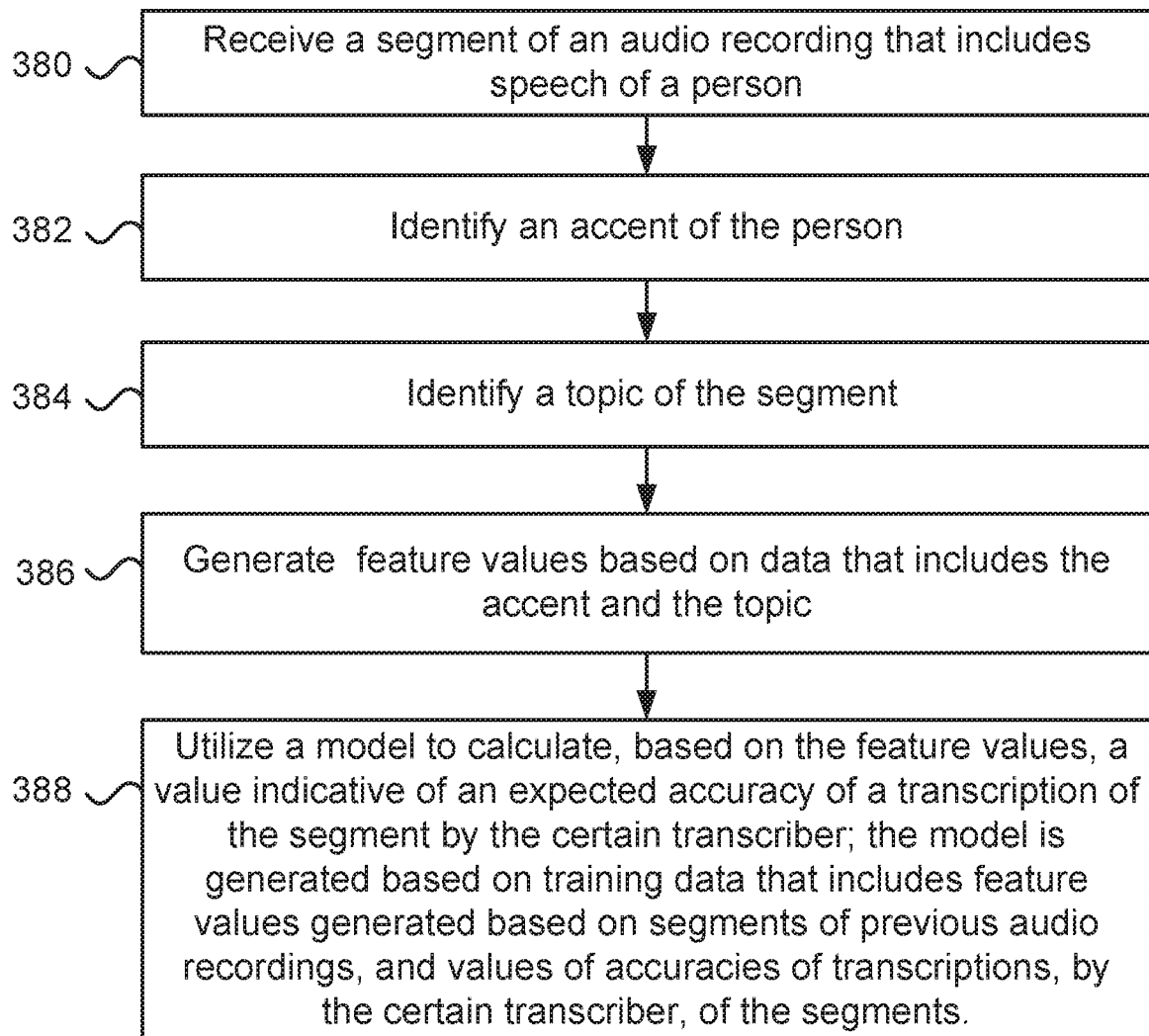
FIG. 23 illustrates steps involved in one embodiment of a method for calculating an expected accuracy of a transcription by a certain transcriber.

FIG. 23 illustrates steps involved in one embodiment of a method for calculating an expected accuracy of a transcription by a certain transcriber. The steps illustrated in FIG. 23 may be executed, in some embodiments, by a system modeled according to FIG. 22, as described above. In some embodiments, instructions for implementing the method may be stored on a computer-readable medium, which may optionally be a non-transitory computer-readable medium. In response to execution by a computer system including a processor and memory (e.g., the computer 370 or the backend server 110), the instructions cause the computer system to perform operations of the method.

In one embodiment, the method for calculating an expected accuracy of a transcription by a certain transcriber includes at least the following steps:

In Step 380, receiving a segment of an audio recording, which includes speech of a person.

In Step 382, identifying, based on the segment, an accent of the person.

In Step 384, identifying, based on a transcription of the segment generated using the ASR system 112, a topic of the segment.

In Step 386, generating feature values based on data that includes an indication of the accent and an indication of the topic.

And in Step 388, utilizing a model to calculate, based on the feature values, a value indicative of an expected accuracy of a transcription of the segment by the certain transcriber. Optionally, the model is generated based on training data that includes feature values generated based on segments of previous audio recordings, and values of accuracies of transcriptions, by the certain transcriber, of the segments. Optionally, the value indicative of the expected accuracy is indicative of an expected word error rate (WER) for the transcription of the segment, were it transcribed by the certain transcriber.

Calculation of values indicative of expected accuracy may be utilized to guide the selection of transcribers to work on certain segments of audio. In one embodiment, the method illustrated in FIG. 23 may optionally include the following steps: calculating additional values indicative of expected accuracies of transcriptions of the segment by respective additional transcribers, and selecting the certain transcriber to transcribe the segment based on the value (calculated for the certain transcriber) being greater than most of the additional values.

Generating feature values may involve utilization additional sources of data and/or calculation of additional types of values than the ones mentioned above in Step 386. In one embodiment, method illustrated in FIG. 23 may optionally include a step involving generating a feature value, from among the feature values, which is indicative of one or more of the following: a duration of the segment, and a number of speakers in the segment. In another embodiment, the method may optionally include a step involving generating a feature value, from among the feature values, by utilizing natural language understanding (NLU) to calculate a value indicative of intelligibility of a transcription of the segment generated utilizing the ASR system 112. In still another embodiment, the method may optionally include steps involving: utilizing a classifier to identify the accent, and responsive to confidence in an identification of the accent being below a threshold, providing the segment to another transcriber to listen to and provide an identification of the accent.

In one embodiment, the segment received in Step 380 belongs to a set of segments that include speech of the person, and the data utilized to generate the feature values may also include information related to other segments in the set. In this embodiment, the method may optionally include a step that involves generating a feature value, from among the feature values, which is indicative of one or more of the following: a number of segments that preceded the segment, a duration of the segments that preceded the segment, a number of the segments already transcribed by the certain transcriber, and a duration of the segments already transcribed by the certain transcriber.

In another embodiment, the data utilized to generate the feature values may also include data related to recent transcription activity of the certain transcriber during that day. Optionally, the method may include a step of generating a feature value, from among the feature values, which is indicative of one or more of the following: a number of hours the certain transcriber has been working that day, a number of different speakers the certain transcriber has been transcribing.

Figure 24:
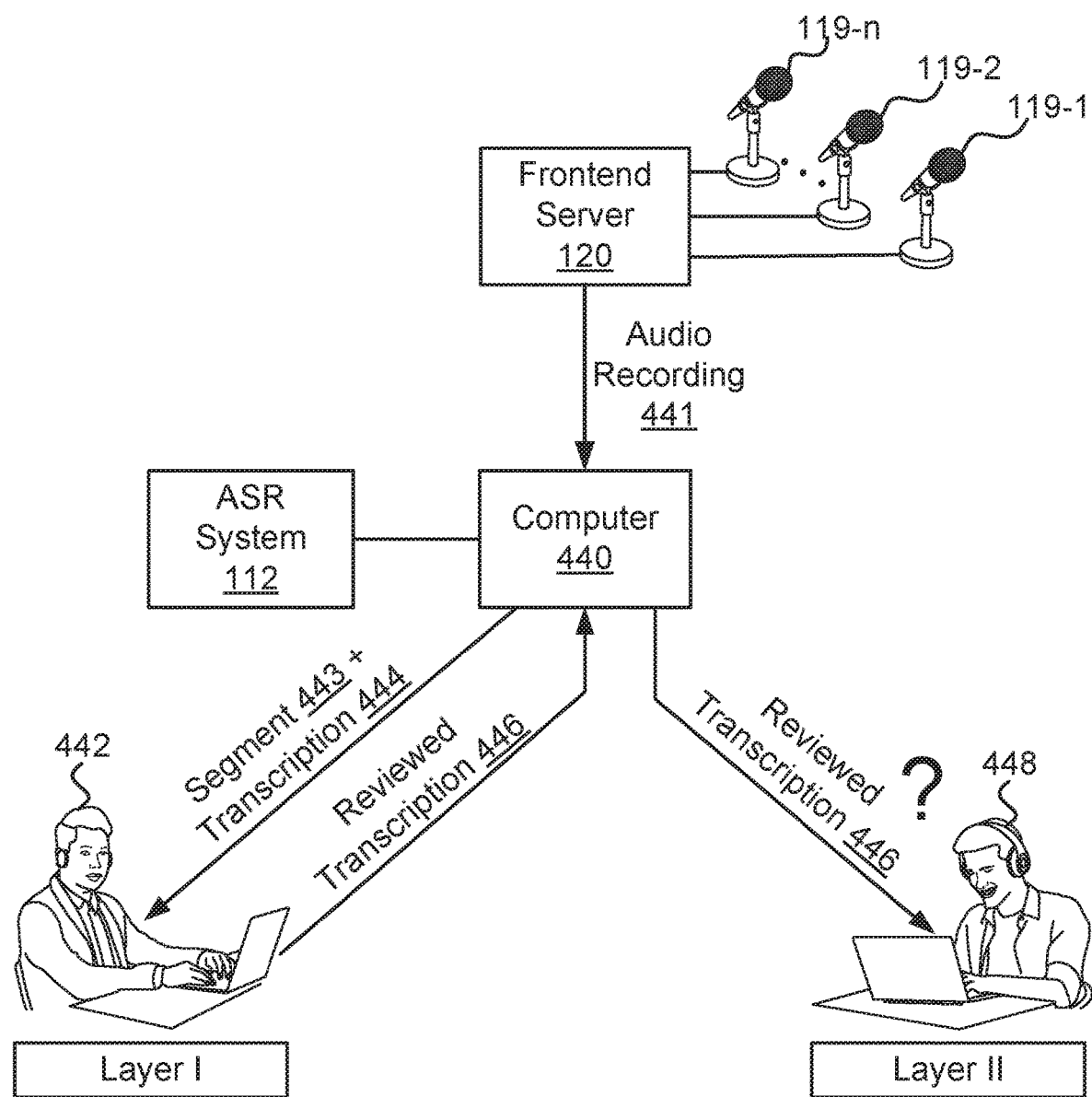
FIG. 24 illustrates an embodiment of a system configured to estimate quality of hybrid transcription of audio.

FIG. 24 illustrates an embodiment of a system configured to estimate quality of hybrid transcription of audio. In one embodiment, the system includes at least the frontend server 120 and a computer 440, which may be the backend server 110, or some other computer described herein. The system may optionally include other elements such as user interfaces and/or the one or more microphones 119-1 to 119-n. In one embodiment, the computer 440 is configured to run one or more computer programs that cause it to perform operations described below (which may correspond to at least some of the steps of the method illustrated in FIG. 25).

The frontend server 120 is configured, in one embodiment, to transmit an audio recording 441 that includes speech of one or more people. Optionally, the audio recording 441 is taken over a period spanning at least two hours. In one example, the audio recording 441 includes one or more channels of audio recorded using the one or more of microphones 119-1 to 119-$n$ (where $n \geq 1$), which are in a room. Optionally, a deposition is being conducted in the room while the audio recording 441 is recorded. In one embodiment, the audio recording 441 includes two or more channels of audio. Optionally, the two or more channels are recorded utilizing respective two or more microphones, from among the microphones 119-1 to 119-$n$. Optionally, the two or more microphones are at least 40 cm away from each other.

The computer 440 receives the audio recording 441 and segments it to one or more segments. In one embodiment, the one or more segments are provided to the ASR system 112 in order to generate one or more transcriptions of the one or more segments, respectively. The one or more segments may then be provided to a transcriber or several transcribers for review (in which they fill in missing portions and/or correct mistakes in the one or more transcriptions). For example, FIG. 24 illustrates transcriber 442 who receives segment 443, from among the one or more segments of the audio recording 441, and a transcription 444 of the segment 443, which is generated by the ASR system 112.

The transcriber 442 goes over the transcription 444, possibly correcting some mistakes in the transcription 444 and/or filling in some missing words in the transcription 444. This process may be considered a "review" of the transcription 444. A modified version of the transcription 444, which reflects the changes made by the transcriber 442, is a reviewed transcription 446, which is sent to the computer 440. At this stage, the computer 440 may have several options. The computer 440 may utilize the reviewed transcription 446 as is, e.g., by incorporating it into a full transcription of the audio recording 441. However, there may be scenarios where the quality of the reviewed transcription 446 may be called to question. For example, the transcriber 442 may be new, inexperienced, or have an unproven or somewhat weak track record when it comes to transcribing.

In some embodiments, the transcriber 442 is considered a "first layer" of review, and the reviewed transcription 446 may be provided by the computer 440 for another review by a second transcriber 448, which may be considered a "second layer" of review. The second transcriber 448 may be a more experienced transcriber (e.g., a supervisor) who may have a proven track record as far as accuracy of transcriptions is concerned. In one example, the additional review by the second transcriber 448 involves making fewer corrections compared to the number of corrections made by the transcriber 442, since many of the mistakes made by the ASR system 112 in the transcription 444 were already corrected by the transcriber 442.

Letting additional, possibly more experienced, transcribers review transcriptions of other transcribers may be beneficial in terms of increasing the accuracy of the transcriptions, but it involves a tradeoff. Additional reviews both increase the expense involved in the transcription process and also increase the time it takes to complete a transcription job (e.g., the turnaround time until delivery of the full transcription of the audio recording 441). Thus, in some embodiments, the computer 440 calculates an expected accuracy of the reviewed transcription 446 in order to determine whether the reviewed transcription 446 is sufficiently accurate and/or whether the reviewed transcription 446 should be submitted for an additional layer of review.

It is to be noted that this calculation does not require having a "ground truth" of the reviewed transcription 446, rather, it relies on analysis of data that includes aspects of the process of the review performed by the transcriber 442. It is further to be noted that the teachings provided herein may be generalized to a decision regarding the necessity of an additional layer of review (after a certain number of previous layers), and are not limited to two layers of review. Thus, in some embodiments, more than one layer of review may be considered the "first layer" discussed herein.

In order to estimate the accuracy of the reviewed transcription 446, in some embodiments, the computer 440 may utilize a machine learning-based approach, which is described below.

In one embodiment, the computer 440 receives various types of data, and generates feature values based on the received data. Optionally, the data used to generate the feature values includes information about a review of the transcription 444, which was conducted by the transcriber 442, and resulted in the reviewed transcription 446 (after corrections were made to a transcription it may be referred to herein as a "reviewed transcription"). Optionally, this information includes certain properties of the review of the transcription 444.

In one example, the properties are indicative of at least one of the following: an extent of corrections made by the transcriber 442 to the transcription 444 during the review, and a duration of the review. Optionally, the extent of the corrections may be indicative of the number of corrections, a normalized number of corrections (e.g., a number of corrections per 1000 words or per minute of audio), and/or complexity of corrections. For example, the extent of corrections may be indicative of whether the transcriber replaced single words or phrases with multiple words. Optionally, the duration of the review may be an absolute value (e.g., the number of minutes spent reviewing the segment). Optionally, the duration of the review may be a relative value, such as the time spent reviewing per 100 words of the transcription or the time spent in the review per minute of audio.

In another example, the properties received by the computer 440 may optionally include additional information related to the review, such as an indication of a speed at which the audio of the segment 443 was listened to by the transcriber 442 during the review, or an attention level of the transcriber 442 during the review. Various values may be indicative of the attention level of the transcriber 442. For example, an attention level may be obtained based on eye tracking or gaze tracking, which measure how long and/or how often the transcriber 442 looked at the text of the transcription 444. In another example, the attention level may be determined based on an activity profile of use of apps on a mobile device by the transcriber 442, during the time of the review. Frequent use of apps during the review may be indicative of a low attention level.

The data utilized by the computer 440 to generate feature values may also include properties related the segment 443. In one embodiment, the computer 440 may generate one or more of the feature values based on an indication of an accent spoken by a person in the segment 443. Optionally, the indication about the accent is provided by the transcriber 442 and/or some other transcriber, or using an algorithmic approach, as described elsewhere herein. In another embodiment, the computer 440 may generate one or more of the feature values based on an indication of topic of the segment 443. Optionally, the indication about the topic is provided by the transcriber 442 and/or some other transcriber, or using an algorithmic approach, as described elsewhere herein. In yet another embodiment, the computer 440 may generate one or more of the feature values based on an indication of audio quality of segment (e.g., a signal-to-noise ratio). Optionally, the indication of the audio quality is calculated based on acoustic features of the segment 443.

Another source of data that may be utilized by the computer 440 is data generated by the ASR system 112 for the generation of the transcription 444. In one embodiment, the computer 440 calculates a value indicative of intelligibility of speech in the segment 443 based on a lattice constructed by the ASR system 112, and generates at least one of the feature values based on the value indicative of intelligibility.

Another source of data, which may be utilized by the computer 440 to generate one or more of the feature values, pertains to the experience or capabilities of the transcriber 442. For example, this data may include one or more of the following: a certification level of the transcriber 442, a number transcriptions already performed by the transcriber 442, and values of scores or quality reviews of previous transcriptions performed by the transcriber 442.

The computer 440 utilizes at least some of the data mentioned above to generate the feature values. These, in turn, are used by the computer 440 to calculate a value indicative of an expected accuracy of the reviewed transcription 446. Optionally, the computer 440 utilizes a model to calculate, based on the feature values, the value indicative of the expected accuracy of the reviewed transcription 446. Optionally, the model includes parameters that are calculated using one or more of the machine learning approaches described in this disclosure.

The value indicative of the expected accuracy of the reviewed transcription 446 may refer to a quality metric of the reviewed transcription 446. In some embodiments, the expected accuracy of the reviewed transcription 446 is indicative of a word error rate (WER) in the reviewed transcription 446, were it compared to a "ground truth". In other embodiments, the value indicative of the accuracy of the corrected transcription 446 may be some other value. For example, the value may be an expected score given by a human evaluator (were the evaluator to review the corrected transcription 446). In another example, the value may be provided by using a machine learning algorithm trained on the task of evaluating accuracy of transcriptions (e.g., using training data that includes human provided scores for accuracy of transcriptions).

The model utilized by the computer 440 may be generated based on different sources of data. In one embodiment, the model is generated based on data corresponding to multiple transcribers, which includes at least: properties of reviews of transcriptions of segments of previous audio recordings by the multiple transcribers, and values indicative of the accuracies of reviewed transcriptions that resulted from these reviews. Optionally, the data used to generate the model may include additional information related to the reviews, the segments of the previous audio recordings, the transcription process of the segments by the ASR system 112, and/or properties of the transcribers (e.g., indications of the experience levels of the transcribers). Optionally, the values indicative of the accuracies are obtained by comparing the reviewed transcriptions to ground truth transcriptions of their corresponding segments of audio.

The aforementioned data is used to generate training samples, that each includes feature values corresponding to a certain reviewed transcription (these feature values are of the same type described above, which are used to calculate the expected accuracy of the reviewed transcription 446), and label that is indicative of the accuracy of the certain reviewed transcription.

In another embodiment, the model utilized by the computer 440 is generated based on: properties of reviews of the transcriber 442 of transcriptions of certain previously recorded segments of audio, and values indicative of accuracies of certain reviewed transcriptions resulting from these reviews by the transcriber 442. Optionally, the data used to generate the model may include additional information related to the reviews, the segments of the previous audio recordings, the transcription process of the segments by the ASR system 112, and/or properties of the transcriber 442.

After calculating the value indicative of the expected accuracy of the reviewed transcription 446, the computer 440 may utilize this value to make a decision regarding whether the reviewed transcription 446 is likely to be sufficiently accurate and/or what should be done with the reviewed transcription 446. In one embodiment, the computer suggests a second transcriber review the reviewed transcription 446 responsive to the value indicative of the expected accuracy being below a threshold. Optionally, the computer 440 transfers a task involving reviewing the reviewed transcription 446 to a task queue of the second transcriber. Optionally, the second transcriber is selected by the computer 370, based on the fact that the expected accuracy of the second transcriber on the segment 443 is above the threshold.

It is to be noted that results obtained from the segment 443, may be generalized to other transcriptions of segments of the audio recording 441. For example, if a certain number of the transcriptions of segments reviewed by the transcriber 442 are deemed to have a low expected accuracy, then the computer 440 may direct all transcriptions of segments of the audio recording 441 reviewed by the transcriber 442 to receive an additional layer of review.

In some embodiments, the computer 440 may determine that certain transcriptions of segments of the audio recording 441 may warrant an additional layer of review, while transcriptions of other segments of the audio recording 441 do not. Optionally, if a certain segment included speech that is clear, its transcription which was reviewed by the transcriber 442 may be considered sufficiently accurate, and it may not require an additional review. In one example, the computer 440 receives a second segment of the audio recording 441, which includes speech of a second person (who is different from the person speaking in the segment 443). The computer 440 generates a second transcription of the second segment utilizing the ASR system 112. The computer receives data that includes second properties of a second review of the second transcription by the transcriber 442, which produced a second reviewed transcription. Optionally, the second properties are indicative of at least one of the following: an extent of corrections made by the transcriber 442 to the second transcription during the second review, and a duration of the second review. The computer 440 generates second feature values based on data that includes the second properties, and utilizes the model to calculate, based on the second feature values, a second value indicative of an expected accuracy of the second reviewed transcription. Optionally, the second value indicative of the expected accuracy of the second reviewed transcription is above the threshold (as opposed to the expected accuracy of the reviewed transcription 446 being below the threshold). Optionally, the computer 440 does not suggest the second transcription receive an additional layer of review.

Reviewed transcriptions, such as the reviewed transcription 446, may be utilized in some embodiments, in order to expand models utilized by the ASR system 112. In one example, a language model utilized by the ASR system 112 may be expanded by adding a phrase that appeared in the reviewed transcription 446. In another example, a phonetic model utilized by the ASR system 112 may be expanded to reflect a pronunciation of a certain phrase based on its utterance in the segment 443 (as determined based on its appearance in at a corresponding position in the reviewed transcription 446). However, in some embodiments, learning from the reviewed transcription 446 may be dependent on the expected accuracy of the reviewed transcription 446. For example, if the expected accuracy is below a certain threshold, then the reviewed transcription 446 is not deemed accurate enough to learn from, and models utilized by the ASR system 112 are not updated based on it.

Figure 25:
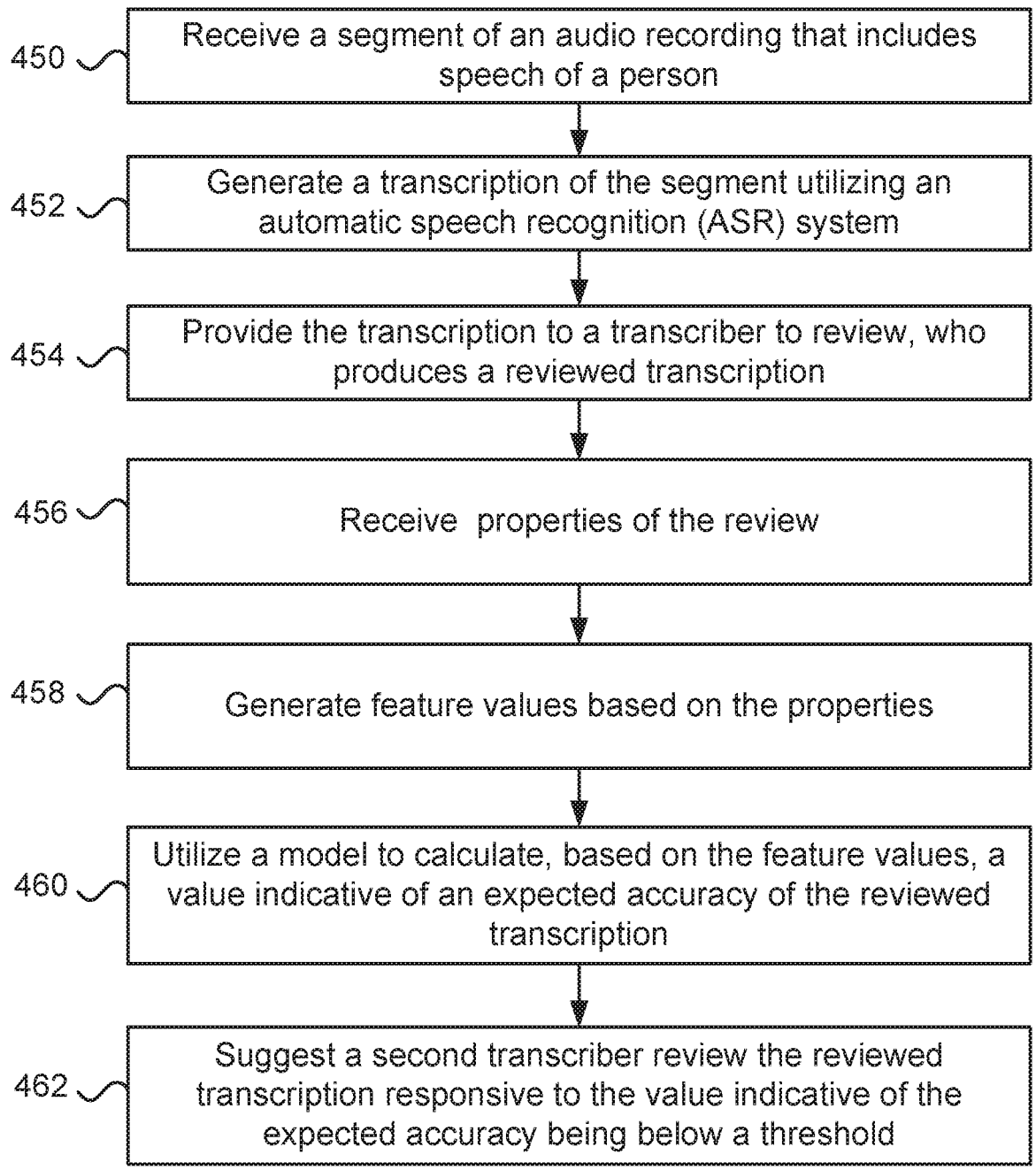
FIG. 25 illustrates steps involved in one embodiment of a method for estimating quality of hybrid transcription of audio.

FIG. 25 illustrates steps involved in one embodiment of a method for estimating quality of hybrid transcription of audio. The steps illustrated in FIG. 25 may be executed, in some embodiments, by a system modeled according to FIG. 24, as described above. In some embodiments, instructions for implementing the method may be stored on a computer-readable medium, which may optionally be a non-transitory computer-readable medium. In response to execution by a computer system including a processor and memory (e.g., the computer 440 or the backend server 110), the instructions cause the computer system to perform operations of the method.

In one embodiment, the method for estimating quality of hybrid transcription of audio includes at least the following steps:

In Step 450, receiving a segment of an audio recording that includes speech of a person. Optionally, the audio recording is transmitted to the computer 440 by the frontend server 120.

In Step 452, generating a transcription of the segment utilizing the ASR system 112.

In optional Step 454, providing the transcription to a transcriber who produces a reviewed transcription. For example, during the process of the review the transcriber listened to the segment and made one or more corrections to the transcription (this modified version of the transcription is the reviewed transcription).

In Step 456, receiving properties of the review of the transcription, by the transcriber, which produced the reviewed transcription. Optionally the properties are indicative of at least one of the following: an extent of corrections made by the transcriber to the transcription during the review, and a duration of the review.

In Step 458, generating feature values based on data that includes the properties.

And in Step 460, utilizing a model to calculate, based on the feature values, a value indicative of an expected accuracy of the reviewed transcription. Optionally, the value indicative of the expected accuracy of the reviewed transcription is indicative of an expected word error rate (WER) in the reviewed transcription.

In one embodiment, the method may include optional Step 462, which involves suggesting a second transcriber review the reviewed transcription responsive to the value indicative of the expected accuracy being below a threshold.

In one embodiment, the method illustrated in FIG. 25 optionally includes a step of generating the model used in Step 460 based on data corresponding to multiple transcribers. Optionally, this data includes properties of reviews of transcriptions of segments of audio by the multiple transcribers, and values indicative of reviewed transcriptions resulting from the reviews. Additionally or alternatively, the model may be generated based on data corresponding to the transcriber for whom the value is calculated in Step 460. Thus, in one embodiment, the method illustrated in FIG. 25 optionally includes a step of generating the model based on: properties of reviews of the transcriber of transcriptions of certain previously recorded segments of audio, and values indicative of accuracies of certain reviewed transcriptions resulting from the reviews.

In addition to the feature values mentioned in Step 458, embodiments of the method illustrated in FIG. 25 may include steps for generating additional types of feature values. In one embodiment, the method optionally includes the following steps: receiving additional properties of the review, which include an indication of a speed at which the audio was listened to by the transcriber during the review and/or an attention level of the transcriber during the review, and generating at least one of the feature values based on the additional properties. In another embodiment, the method optionally includes the following steps: receiving an indication of an accent spoken by the person in the segment, and generating at least one of the feature values based on the indication. In yet another embodiment, the method optionally includes the following steps: receiving an indication of a topic of speech in the segment, and generating at least one of the feature values based on the indication. In still another embodiment, the method optionally includes the following steps: receiving an indication of audio quality of segment, and generating at least one of the feature values based on the indication.

Various embodiments described herein involve utilization of machine learning methods. Herein. "machine learning" methods refers to learning from examples using one or more approaches. Examples of machine learning approaches include: decision tree learning, association rule learning, regression models, nearest neighbors classifiers, artificial neural networks, deep learning, inductive logic programming, support vector machines, clustering, Bayesian networks, reinforcement learning, representation learning, similarity and metric learning, sparse dictionary learning, genetic algorithms, rule-based machine learning, and/or learning classifier systems.

Herein, a "machine learning-based model" is a model trained using machine learning methods. For brevity's sake, at times, a "machine learning-based model" may simply be called a "model". Referring to a model as being "machine learning-based" is intended to indicate that the model is trained using machine learning methods (otherwise. "model" may also refer to a model generated by methods other than machine learning).

Herein, feature values may be considered input to a computer that utilizes a model to perform the calculation of a value, such as a value indicative of the blood pressure of a user. It is to be noted that the terms "feature" and "feature value" may be used interchangeably when the context of their use is clear. However, a "feature" typically refers to a certain type of value, and represents a property, while "feature value" is the value of the property with a certain instance (sample).

It is to be noted that when it is stated that feature values are generated based on data comprising multiple sources, it means that for each source, there is at least one feature value that is generated based on that source (and possibly other data).

Figure 26:
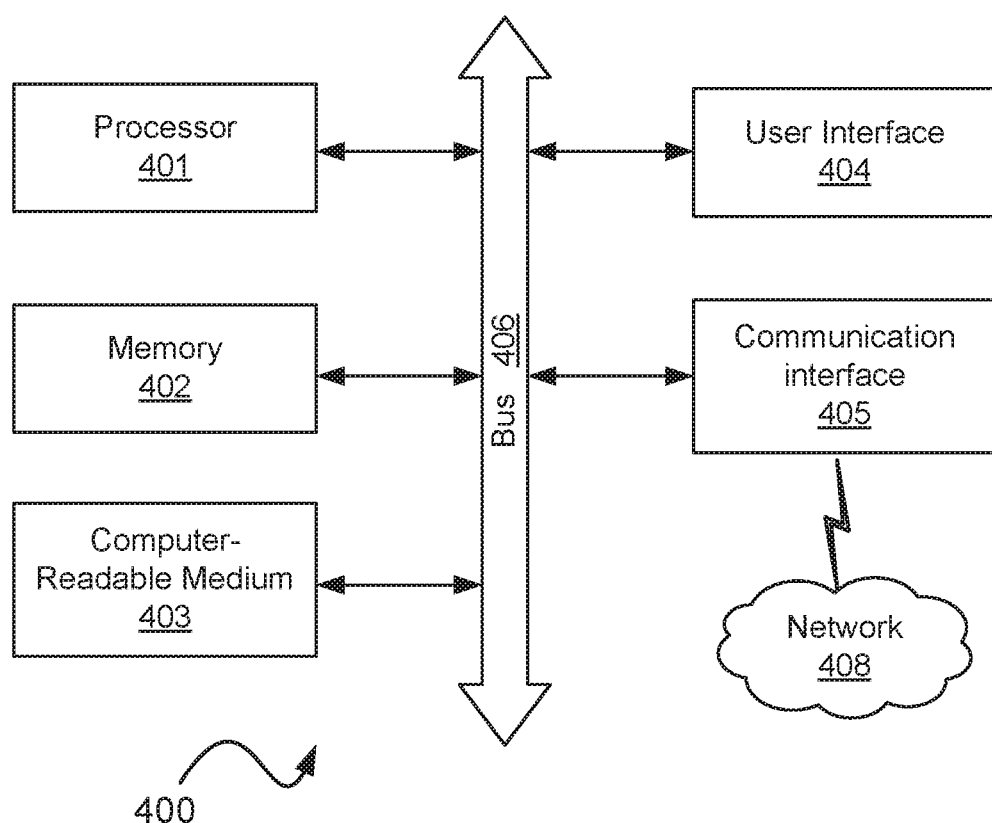
FIG. 26 is a schematic illustration of possible embodiments for a computer.

FIG. 26 is a schematic illustration of possible embodiments for a computer that is able to realize one or more of the embodiments discussed herein that include a "computer" or a server (such as the backend server 110, or various front end servers described herein). The computer 400 may be implemented in various ways, such as, but not limited to, a server, a client, a personal computer, a network device, and/or any other computer form capable of executing a set of computer instructions. The computer 400 includes one or more of the following components: a processor 401, memory 402, computer-readable medium 403, user interface 404, communication interface 405, and bus 406. Additionally, reference to a computer may include additional peripheral components (e.g., a screen, speakers, a keyboard, and/or a mouse), which may be used as a user interface to provide various inputs to the computer and/or receive outputs from the computer (e.g., images and/or audio).

Herein, references to a computer or processor may include any collection of one or more computers and/or processors, which may be at different locations, that individually or jointly execute one or more sets of computer instructions. For example, reference to "a computer" may involve a cloud-based server and one or more computing devices of one or more transcribers located at various locations.

Functionality of various embodiments may be implemented in hardware, software, firmware, or any combination thereof. If implemented at least in part in software, implementing the functionality may involve a computer program that includes one or more instructions or code stored or transmitted on a computer-readable medium and executed by one or more processors. Computer-readable media may include computer-readable storage media, which corresponds to a tangible medium such as data storage media, or communication media including any medium that facilitates transfer of a computer program from one place to another. Computer-readable medium may be any media that can be accessed by one or more computers to retrieve instructions, code, data, and/or data structures for implementation of the described embodiments. A computer program product may include a computer-readable medium. In one example, the computer-readable medium 403 may include one or more of the following: RAM, ROM, EEPROM, optical storage, magnetic storage, biologic storage, flash memory, or any other medium that can store computer readable data.

A computer program (also known as a program, software, software application, script, program code, or code) can be written in any form of programming language, including compiled or interpreted languages, declarative or procedural languages. The program can be deployed in any form, including as a standalone program or as a module, component, subroutine, object, or another unit suitable for use in a computing environment. A computer program may correspond to a file in a file system, may be stored in a portion of a file that holds other programs or data, and/or may be stored in one or more files that may be dedicated to the program. A computer program may be deployed to be executed on one or more computers that are located at one or more sites that may be interconnected by a communication network.

References to computer-readable medium may refer to a single medium and/or multiple media (e.g., a centralized or distributed database, and/or associated caches and servers) that store one or more sets of instructions. In various embodiments, a computer program, and/or portions of a computer program, may be stored on a non-transitory computer-readable medium, and may be updated and/or downloaded via a communication network, such as the Internet. Optionally, the computer program may be downloaded from a central repository, such as Apple App Store, Google Play, or a repository of a hardware manufacturer (e.g., of a medical device). Optionally, the computer program may be downloaded from a repository, such as an open source and/or community run repository (e.g., GitHub).

At least some of the methods described herein that are methods implemented on a computer (also referred to as "computer-implemented methods"). Implementing these methods may involve utilizing a computer, such as the computer 400, by executing instructions on the processor 401. Additionally, at least some of these instructions may be stored on a non-transitory computer-readable medium.

As used herein, references to "one embodiment" (and its variations) mean that the feature being referred to may be included in at least one embodiment of the invention. Moreover, separate references to "one embodiment", "some embodiments", "another embodiment", "other embodiments", "still another embodiment", etc., may refer to the same embodiment, may illustrate different aspects of an embodiment, and/or may refer to different embodiments.

Some embodiments may be described using the verb "indicating", the adjective "indicative", and/or using variations thereof. Herein, sentences in the form of "X is indicative of Y" mean that X includes information correlated with Y, up to the case where X equals Y. Stating that "X indicates Y" or "X indicating Y" may be interpreted as "X being indicative of Y". Additionally, sentences in the form of "provide/receive an indication indicating whether X happened" may refer herein to any indication method, including but not limited to: sending/receiving a signal when X happened and not sending/receiving a signal when X did not happen, not sending/receiving a signal when X happened and sending/receiving a signal when X did not happen, and/or sending/receiving a first signal when X happened and sending/receiving a second signal when X did not happen.

The terms "comprises," "comprising," "includes," "including," "has," "having", or any other variation thereof, indicate an open-ended claim language that does not exclude additional limitations. The "a" or "an" is employed to describe one or more, and the singular also includes the plural unless it is obvious that it is meant otherwise.

The phrase "based on" is intended to mean "based, at least in part, on". Additionally, stating that a value is calculated "based on X", and following that, in a certain embodiment, that the value is calculated "also based on Y", means that in the certain embodiment the value is calculated based on X and Y.

The terms "first", "second" and so forth are to be interpreted merely as ordinal designations, and shall not be limited in themselves. A predetermined value is a fixed value and/or a value determined any time before performing a calculation that compares a certain value with the predetermined value. A value is also considered to be a predetermined value when the logic, used to determine whether a threshold that utilizes the value is reached, is known before start performing computations to determine whether the threshold is reached.

The embodiments of the inventions described herein may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the order of steps of the methods, or to details of implementation of the devices, set in the description, drawings, or examples. Moreover, individual blocks illustrated in the figures may be functional in nature and therefore may not necessarily correspond to discrete hardware elements.

Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

We claim:

1. A system configured to calculate an expected accuracy of a transcription by a certain transcriber, comprising:
   a computer configured to:
   receive a segment of an audio recording, which comprises speech of a person;
   identify, based on the segment, an accent of the person;
   identify, based on a transcription of the segment generated using an automatic speech recognition (ASR) system, a topic of the segment;
   generate feature values based on data comprising an indication of the accent and an indication of the topic; and
   utilize a model to calculate, based on the feature values, a value indicative of an expected accuracy of a transcription of the segment by the certain transcriber;
   wherein the model is generated based on training data comprising feature values generated based on segments of previous audio recordings, and values of accuracies of transcriptions, by the certain transcriber, of the segments.

2. The system of claim 1, wherein the value indicative of the expected accuracy is indicative of an expected word error rate (WER) for the transcription of the segment were it transcribed by the certain transcriber.

3. The system of claim 1, wherein the computer is further configured to utilize additional models to calculate additional values indicative of expected accuracies of transcriptions of the segment by respective additional transcribers, and to select the certain transcriber to transcribe the segment based on the value being greater than most of the additional values.

4. The system of claim 3, wherein each of the additional models corresponds to a specific transcriber from among the additional transcribers, and is generated based on segments of additional previous audio recordings, and additional values of accuracies of transcriptions by the specific transcriber of the segments of the additional previous audio recordings.

5. The system of claim 1, wherein the feature values comprise a feature value indicative of one or more of the following: a duration of the segment, and a number of speakers in the segment.

6. The system of claim 1, wherein the segment belongs to a set of segments comprising speech of the person, the data utilized to generate the feature values further comprises information related to other segments in the set, and the feature values comprise a feature value indicative of one or more of the following: a number of segments that preceded the segment, a duration of the segments that preceded the segment, a number of the segments already transcribed by the certain transcriber, and a duration of the segments already transcribed by the certain transcriber.

7. The system of claim 1, wherein the data utilized to generate the feature values further comprises data related to recent transcription activity of the certain transcriber during that day, and the feature values comprise a feature value indicative of one or more of the following: a number of hours the certain transcriber has been working that day, a number of different speakers the certain transcriber has been transcribing.

8. The system of claim 1, wherein one or more of the feature values are indicative of a signal-to-noise ratio of the audio in the segment.

9. The system of claim 1, wherein at least one of the feature values is generated by utilizing natural language understanding (NLU) to calculate a value indicative of intelligibility of a transcription of the segment generated utilizing the ASR system.

10. The system of claim 1, wherein the computer is further configured to utilize a classifier to identify the accent, and responsive to confidence in an identification of the accent using the classifier being below a threshold, the computer provides the segment to another transcriber to listen to, and the computer receives an identification of the accent from the other transcriber.

11. The system of claim 1, wherein the segments of the previous audio recordings comprise recordings of a plurality of speakers speaking in different accents.

12. A method for calculating an expected accuracy of a transcription by a certain transcriber, comprising:
   receiving a segment of an audio recording, which comprises speech of a person;
   identifying, based on the segment, an accent of the person;
   identifying, based on a transcription of the segment generated using an automatic speech recognition (ASR) system, a topic of the segment;
   generating feature values based on data comprising an indication of the accent and an indication of the topic; and
   utilizing a model to calculate, based on the feature values, a value indicative of an expected accuracy of a transcription of the segment by the certain transcriber;
   wherein the model is generated based on training data comprising feature values generated based on segments of previous audio recordings, and values of accuracies of transcriptions, by the certain transcriber, of the segments.

13. The method of claim 12, wherein the value indicative of the expected accuracy is indicative of an expected word error rate (WER) for the transcription of the segment were it transcribed by the certain transcriber.

14. The method of claim 12, further comprising: calculating additional values indicative of expected accuracies of transcriptions of the segment by respective additional transcribers, and selecting the certain transcriber to transcribe the segment based on the value being greater than most of the additional values.

15. The method of claim 12, further comprising generating a feature value, from among the feature values, which is indicative of one or more of the following: a duration of the segment, and a number of speakers in the segment.

16. The method of claim 12, wherein the segment belongs to a set of segments comprising speech of the person, the data utilized to generate the feature values further comprises information related to other segments in the set, and further comprising generating a feature value, from among the feature values, which is indicative of one or more of the following: a number of segments that preceded the segment, a duration of the segments that preceded the segment, a number of the segments already transcribed by the certain transcriber, and a duration of the segments already transcribed by the certain transcriber.

17. The method of claim 12, wherein the data utilized to generate the feature values further comprises data related to recent transcription activity of the certain transcriber during that day, and further comprising generating a feature value, from among the feature values, which is indicative of one or more of the following: a number of hours the certain transcriber has been working that day, a number of different speakers the certain transcriber has been transcribing.

18. The method of claim 12, further comprising generating a feature value, from among the feature values, by utilizing natural language understanding (NLU) to calculate a value indicative of intelligibility of a transcription of the segment generated utilizing the ASR system.

19. The method of claim 12, further comprising: utilizing a classifier to identify the accent, and responsive to confidence in an identification of the accent using the classifier being below a threshold, providing the segment to another transcriber to listen to and provide an identification of the accent.

20. A non-transitory computer-readable medium having instructions stored thereon that, in response to execution by a system including a processor and memory, causes the system to perform operations comprising:

receiving a segment of an audio recording, which comprises speech of a person;

identifying, based on the segment, an accent of the person;

identifying, based on a transcription of the segment generated using an automatic speech recognition (ASR) system, a topic of the segment;

generating feature values based on data comprising an indication of the accent and an indication of the topic; and utilizing a model to calculate, based on the feature values, a value indicative of an expected accuracy of a transcription of the segment by a certain transcriber;

wherein the model is generated based on training data comprising feature values generated based on segments of previous audio recordings, and values of accuracies of transcriptions, by the certain transcriber, of the segments.

\* \* \* \* \*